(12) United States Patent
Grafi

(10) Patent No.: US 10,331,889 B2
(45) Date of Patent: Jun. 25, 2019

(54) PROVIDING A FASTLANE FOR DISARMING MALICIOUS CONTENT IN RECEIVED INPUT CONTENT

(71) Applicant: VOTIRO CYBERSEC LTD., Tel-Aviv (IL)

(72) Inventor: Aviv Grafi, Ramat Gan (IL)

(73) Assignee: VOTIRO CYBERSEC LTD., Tel-Aviv (IL)

( * ) Notice: Subject to any disclaimer, the term of this patent is extended or adjusted under 35 U.S.C. 154(b) by 0 days.

(21) Appl. No.: 15/926,976

(22) Filed: Mar. 20, 2018

(65) Prior Publication Data

US 2018/0218155 A1     Aug. 2, 2018

Related U.S. Application Data

(63) Continuation-in-part of application No. 15/441,904, filed on Feb. 24, 2017, now Pat. No. 10,015,194, and
(Continued)

(51) Int. Cl.
*G06F 21/56*     (2013.01)
*G06F 21/55*     (2013.01)
*G06Q 10/10*     (2012.01)

(52) U.S. Cl.
CPC .......... *G06F 21/564* (2013.01); *G06F 21/554* (2013.01); *G06F 21/565* (2013.01); *G06F 21/568* (2013.01); *G06Q 10/107* (2013.01)

(58) Field of Classification Search
CPC .................................................... G06F 21/564
(Continued)

(56) References Cited

U.S. PATENT DOCUMENTS 4,654,484 A    3/1987   Reiffel et al.
5,164,839 A    11/1992   Lang
(Continued)

FOREIGN PATENT DOCUMENTS

WO    WO 2011014623     2/2011

OTHER PUBLICATIONS

"Building a Decoder for the CVE-2014-0502 Shellcode", Volatility Labs, https://volatility-labs.blogspot.co.il/2014/building-decoder-for-cve-2014-0502.html (Apr. 8, 2014).
(Continued)

*Primary Examiner* — Jacob Lipman
(74) *Attorney, Agent, or Firm* — Finnegan, Henderson, Farabow, Garrett & Dunner, LLP

(57) ABSTRACT

The disclosed embodiments include a method for disarming malicious content in a computer system. The method includes accessing input content intended for a recipient of a network, automatically modifying at least a portion of digital values of the input content to render inactive code that is included in the input content intended for malicious purpose, the modified input content being of the same type as the accessed input content, enabling access to the modified input content by the intended recipient, analyzing the input content according to at least one malware detection algorithm configured to detect malicious content, and enabling access to the input content by the intended recipient when no malicious content is detected according to the at least one malware detection algorithm.

28 Claims, 15 Drawing Sheets

Related U.S. Application Data a continuation-in-part of application No. 15/441,860, filed on Feb. 24, 2017, now Pat. No. 10,013,557, and a continuation-in-part of application No. 15/616,577, filed on Jun. 7, 2017, now Pat. No. 9,858,424, and a continuation-in-part of application No. 15/672,037, filed on Aug. 8, 2017, now Pat. No. 9,922,191, and a continuation-in-part of application No. 15/795,021, filed on Oct. 26, 2017, now Pat. No. 9,923,921, and a continuation-in-part of application No. 15/926,484, filed on Mar. 20, 2018.

(60) Provisional application No. 62/442,452, filed on Jan. 5, 2017, provisional application No. 62/450,605, filed on Jan. 26, 2017, provisional application No. 62/473,902, filed on Mar. 20, 2017.

(58) Field of Classification Search
USPC .......................................................... 726/23
See application file for complete search history.

(56) References Cited

U.S. PATENT DOCUMENTS

| | | |
|---|---|---|
| 6,324,334 B1 | 11/2001 | Morioka et al. |
| 7,185,017 B1 | 2/2007 | Cauvin et al. |
| 7,263,561 B1 | 8/2007 | Green et al. |
| 7,797,743 B2 | 9/2010 | Treacy et al. |
| 8,180,837 B2 | 5/2012 | Lu et al. |
| 8,185,954 B2 | 5/2012 | Scales |
| 8,239,950 B1 | 8/2012 | Huang et al. |
| 8,316,459 B2 | 11/2012 | Shani |
| 8,533,824 B2 | 9/2013 | Hutton |
| 8,627,458 B2 | 1/2014 | Muttik |
| 8,745,742 B1 | 6/2014 | Satish et al. |
| 8,763,123 B2 | 6/2014 | Lim et al. |
| 8,869,283 B2 | 10/2014 | Scales |
| 9,038,174 B2 | 5/2015 | Hutton |
| 9,047,293 B2 | 6/2015 | Grafi et al. |
| 9,195,636 B2 | 11/2015 | Smith et al. |
| 9,301,128 B2 | 3/2016 | Roundtree et al. |
| 9,330,264 B1 | 5/2016 | Hutton |
| 9,342,521 B2 | 5/2016 | Isobe |
| 9,407,653 B2 | 8/2016 | Kuskov et al. |
| 9,495,188 B1 | 11/2016 | Ettema et al. |
| 9,516,045 B2 | 12/2016 | Scales |
| 9,521,133 B2 | 12/2016 | Chu et al. |
| 9,582,665 B2 | 2/2017 | Eytan et al. |
| 9,736,147 B1 | 8/2017 | Mead |
| 9,832,223 B2 | 11/2017 | Eytan et al. |
| 9,858,424 B1 | 1/2018 | Grafi |
| 9,922,191 B1 | 3/2018 | Grafi |
| 9,923,921 B1 | 3/2018 | Grafi |
| 9,946,877 B2 | 4/2018 | Eytan et al. |
| 9,977,901 B2 | 5/2018 | Eytan et al. |
| 2003/0145213 A1* | 7/2003 | Carbone ............... G06F 21/563 713/188 |
| 2003/0229810 A1 | 12/2003 | Bango |
| 2005/0149726 A1 | 7/2005 | Joshi et al. |
| 2005/0154900 A1 | 7/2005 | Muttik |
| 2005/0183143 A1 | 8/2005 | Anderhollm et al. |
| 2005/0257045 A1 | 11/2005 | Bushman et al. |
| 2006/0056353 A1 | 3/2006 | McBride |
| 2006/0149735 A1 | 7/2006 | DeBie et al. |
| 2006/0277433 A1* | 12/2006 | Largman ............. G06F 11/1456 714/15 |
| 2007/0056035 A1 | 3/2007 | Copley |
| 2007/0087766 A1 | 4/2007 | Hardy et al. |
| 2007/0168285 A1 | 7/2007 | Girtakovskis et al. |
| 2008/0086506 A1 | 4/2008 | DeBie et al. |
| 2008/0209551 A1 | 8/2008 | Treacy et al. |
| 2009/0138729 A1 | 5/2009 | Hashimoto et al. |
| 2009/0150419 A1 | 6/2009 | Kim et al. |
| 2009/0282484 A1 | 11/2009 | Wiseman et al. |
| 2010/0115620 A1 | 5/2010 | Alme |
| 2010/0223366 A1 | 9/2010 | Ebreo et al. |
| 2010/0333079 A1 | 12/2010 | Sverdlov et al. |
| 2011/0083181 A1 | 4/2011 | Nazarov |
| 2011/0131636 A1* | 6/2011 | Shani ................... H04L 63/02 726/5 |
| 2012/0110626 A1 | 5/2012 | Wendelrup |
| 2012/0167206 A1 | 6/2012 | Reetz-Lamour et al. |
| 2013/0081065 A1 | 3/2013 | Sharan et al. |
| 2013/0263226 A1 | 10/2013 | Sudia |
| 2013/0290729 A1 | 10/2013 | Pettigrew et al. |
| 2014/0032505 A1 | 1/2014 | Grafi et al. |
| 2014/0208426 A1 | 7/2014 | Natarajan et al. |
| 2014/0283056 A1 | 9/2014 | Bachwani et al. |
| 2015/0110131 A1 | 4/2015 | Roskind |
| 2015/0172305 A1 | 6/2015 | Dixon et al. |
| 2015/0222657 A1 | 8/2015 | Chu et al. |
| 2016/0065571 A1 | 3/2016 | Hoyos et al. |
| 2016/0173506 A1 | 6/2016 | Bank et al. |
| 2016/0191531 A1 | 6/2016 | Perlmutter et al. |
| 2016/0313896 A1 | 10/2016 | Liang et al. |
| 2016/0337400 A1 | 11/2016 | Gupta |
| 2017/0039168 A1 | 2/2017 | Hassan et al. |
| 2017/0098065 A1 | 4/2017 | Vaughn et al. |
| 2017/0142156 A1 | 5/2017 | Shiraishi et al. |
| 2017/0353475 A1 | 12/2017 | Hutton |
| 2018/0253554 A1 | 9/2018 | Eytan et al. |

OTHER PUBLICATIONS

"Dissecting the Newest IE10 0-day Exploit (CVE-2014-0322)" by Vadim Kotov, Bromium Labs, https://labs.bromium.com/2014/02/25/dissecting-the-newest-ie10-0-day-exploit-cve-2014/0322/ (Feb. 25, 2014).

An Analysis of Windows Zero-Day Vulnerability 'CVE-2014-4114' aka "Sandworm", TrendLabs Security Intelligence Blog, http://blog.trendmicro.com/trendlabs-security-intelligence/an-analysis-of-windows-zero-day-vulnerability-cve-2014-4114-aka-sandworm, posted Oct. 14, 2014.

Lanjia Wang et al., "Thwarting Zero-Day Polymorphic Worms With Network-Level Length-Based Signature Generation", Feb. 2010, IEEE/ACM Transactions on Networking, vol. 18, No. 1, pp. 53-66.

"A Different Exploit Angle on Adobe's Recent Zero-Day" by Dan Caselden et al., (Jan. 2015) https://www.fireeye.com/blog/threat-research/2015/01/a_different_exploit.html.

"Advanced Heap Spraying Techniques", Recognize—Security, Security by Moshe Ben Abu (Jan. 2010) https://www.owasp.org/images/0/01/OWASL_IL_2010_Jan-Moshe_Ben_Abu-Advanced_Heapspray.pdf.

"Punk Ode Hiding Shellcode in Plain Sight" by Greg MacManus et al., https://www.blackhat.com/presentations/bh-usa-06/BH-US-06-Sutton.pdf accessed Aug. 14, 2016.

National Security Agency, "Hidden Data and Metadata in Adobe PDF Files: Publication Risks and Countermeasures" (Jul. 27, 2008).

U.S. Appl. No. 15/441,904 to Aviv Grafi et al. entitled "System and Method for Protecting Systems from Malicious Attacks" filed Feb. 24, 2017.

U.S. Appl. No. 15/441,860 to Aviv Grafi et al. entitled "System and Method for Disarming Malicious Code" filed Feb. 24, 2017.

Reissue U.S. Appl. No. 15/604,273 to Aviv Grafi et al. entitled "Systems and Methods for Neutralizing File-Based Attacks" filed May 24, 2017.

U.S. Appl. No. 15/858,440 to Aviv Grafi entitled "System and Method for Protecting Systems from Active Content" filed Dec. 29, 2017.

U.S. Appl. No. 15/926,484 to Aviv Grafi entitled "Disarming Malware in Protected Content" filed Mar. 20, 2018.

U.S. Appl. No. 15/926,862 to Aviv Grafi entitled "Determining Malware Prevention Based on Retrospective Content Scan" filed Mar. 20, 2018.

U.S. Appl. No. 15/926,878 to Aviv Grafi entitled "Disarming Malware in Digitally Signed Content" filed Mar. 20, 2018.

YazamTech, captured on Aug. 22, 2010, https://web.archive.org/web/20100822155839/http://yazamtech.com:80/en, 3 pages.

(56) References Cited

OTHER PUBLICATIONS

Products, YazamTech, captured on Aug. 23, 2010, https://web.archive.org/web/20100823005723/http://yazamtech.com:80/en/products, 3 pages.
YazamTech, captured on Oct. 7, 2010, https://web.archive.org/web/20101007160034/http://yazamtech.com:80/en?phpMyAdmin=2pTp23a-YBGPpnaPAXvSkgjFO71, 2 pages.
ShuttleIT, YazamTech, captured on Dec. 29, 2010, https://web.archive.org/web/20101229174141/http://yazamtech.com:80/en/shuttleit, 3 pages.
About Us, YazamTech, captured on Dec. 31, 2010, https://web.archive.org/web/20101231084709/http://yazamtech.com:80/en/about-us, 2 pages.
Contact Us, YazamTech, captured on Dec. 31, 2010, https://web.archive.org/web/20101231084713/http://yazamtech.com:80/en/contact, 1 page.
Distributors, YazamTech, captured on Dec. 31, 2010, https://web.archive.org/web/20101231123316/http://yazamtech.com:80/en/distributor_en, 2 pages.
Docs, YazamTech, captured on Dec. 31, 2010, https://web.archive.org/web/20101231123319/http://yazamtech.com:80/en/docs, 1 page.
Documentation, YazamTech, captured on Dec. 31, 2010, https://web.archive.org/web/20101231123344/http://yazamtech.com:80/en/documentation, 1 page.
InjectorIT, YazamTech, captured on Dec. 31, 2010, https://web.archive.org/web/20101231123352/http://yazamtech.com:80/en/injectorit, 2 pages.
Products, YazamTech, captured on Dec. 31, 2010, https://web.archive.org/web/20101231084723/http://yazamtech.com:80/en/products, 2 pages.
Research, YazamTech, captured on Dec. 31, 2010, https://web.archive.org/web/20101231123359/http://yazamtech.com:80/en/research, 1 page.
SelectorIT, YazamTech, captured on Dec. 31, 2010, https://web.archive.org/web/20101231084740/http://yazamtech.com:80/en/selectorit, 4 pages.
YazamTech, captured on Dec. 31, 2010, https://web.archive.org/web/20101231084707/http://yazamtech.com:80/en, 2 pages.
ShuttleIT, YazamTech, captured on Feb. 3, 2011, https://web.archive.org/web/20110203153113/http://yazamtech.com:80/en/shuttleit, 3 pages.
YazamTech, captured on Mar. 6, 2011, https://web.archive.org/web/20110306123449/http://yazamtech.com:80/en, 2 pages.
Products, YazamTech, captured on Mar. 15, 2011, https://web.archive.org/web/20110315193104/http://yazamtech.com:80/en/products, 2 pages.
Research, YazamTech, captured on Mar. 15, 2011, https://web.archive.org/web/20110315193112/http://yazamtech.com:80/en/research, 1 page.
White-listing Beyond Anti-Virus, YazamTech, captured on Mar. 15, 2011, https://web.archive.org/web/20110315175925/http://yazamtech.com:80/en/white-listing-beyond-anti-virus, 1 page.
White-listing Server or Station, YazamTech, captured on Mar. 15, 2011, https://web.archive.org/web/20110315193118/http://yazamtech.com:80/en/white-listing-server-or-station, 1 page.
YazamTech, captured on Mar. 15, 2011, https://web.archive.org/web/20110315193058/http://yazamtech.com/en , 2 pages.
A single ShuttleIT system can now handle multiple directories, YazamTech, captured on Sep. 27, 2013, https://web.archive.org/web/20130927194536/http://yazamtech.com/en/single-shuttleit-system-can-now-handle-multiple-directories, 1 page.
About Us, YazamTech, captured on Sep. 27, 2013, https://web.archive.org/web/20130927194226/http://yazamtech.com/en/about-us, 3 pages.
ActualIT, YazamTech, captured on Sep. 27, 2013, https://web.archive.org/web/20130927194433/http://yazamtech.com/en/actualit, 2 pages.
ActualIT, YazamTech, captured on Sep. 27, 2013, https://web.archive.org/web/20130927195119/http://yazamtech.com/en/actualit-1, 1 page.
Contact Us, YazamTech, captured on Sep. 27, 2013, https://web.archive.org/web/20130927194337/http://yazamtech.com/en/contact, 1 page.
Distributors, YazamTech, captured on Sep. 27, 2013, https://web.archive.org/web/20130927195025/http://yazamtech.com/en/distributor_en, 1 page.
Docs, YazamTech, captured on Sep. 27, 2013, https://web.archive.org/web/20130927194307/http://yazamtech.com/en/docs, 1 page.
File Slack, YazamTech, captured on Sep. 27, 2013, https://web.archive.org/web/20130927195132/http://yazamtech.com/en/file-slack, 1 page.
Frequently Asked Questions—English, YazamTech, captured on Sep. 27, 2013, https://web.archive.org/web/20130927195242/http://yazamtech.com/en/category/faq/english, 2 pages.
Frequently Asked Questions—English, YazamTech, captured on Sep. 27, 2013, https://web.archive.org/web/20130927195230/http://yazamtech.com/en/faq/english, 3 pages.
Frequently Asked Questions, YazamTech, captured on Sep. 27, 2013, https://web.archive.org/web/20130927195218/http://yazamtech.com/en/faq, 3 pages.
InjectorIT allows the usage of a secure server, YazamTech, captured on Sep. 27, 2013, https://web.archive.org/web/20130927194459/http://yazamtech.com/en/injectorit-allows-usage-secure-server, 1 page.
New Features in SelectorIT 1.1.0, YazamTech, captured on Sep. 27, 2013, https://web.archive.org/web/20130927194511/http://yazamtech.com/en/new-features-selectorit-110, 1 page.
Products, YazamTech, captured on Sep. 27, 2013, https://web.archive.org/web/20130927194241/http://yazamtech.com/en/products, 1 page.
Research, YazamTech, captured on Sep. 27, 2013, https://web.archive.org/web/20130927194321/http://yazamtech.com/en/research, 1 page.
SelectorIT, YazamTech, captured on Sep. 27, 2013, https://web.archive.org/web/20130927195041/http://yazamtech.com/en/selectorit-0, 1 page.
SelectorIT, YazamTech, captured on Sep. 27, 2013, https://web.archive.org/web/20130927194123/http://yazamtech.com/en/selectorit, 4 pages.
SelectorIT, YazamTech, captured on Sep. 27, 2013, https://web.archive.org/web/20130927195012/http://yazamtech.com/en/selectorit?phpMyAdmin=2pTp23a-YBGPpnaPAXvSkgjFO71, 4 pages.
SelectorIT: a security solution beyond anti-virus, YazamTech, captured on Sep. 27, 2013, https://web.archive.org/web/20130927194524/http://yazamtech.com/en/selectorit-security-solution-beyond-anti-virus, 1 page.
ShuttleIT, YazamTech, captured on Sep. 27, 2013, https://web.archive.org/web/20130927195054/http://yazamtech.com/en/node/37, 1 page.
ShuttleIT, YazamTech, captured on Sep. 27, 2013, https://web.archive.org/web/20130927194354/http://yazamtech.com/en/node/9, 4 pages.
Updates, YazamTech, captured on Sep. 27, 2013, https://web.archive.org/web/20130927194253/http://yazamtech.com/en/updates_en, 1 page.
VectorIT, YazamTech, captured on Sep. 27, 2013, https://web.archive.org/web/20130927195108/http://yazamtech.com/en/injectorit-0, 1 page.
VectorIT, YazamTech, captured on Sep. 27, 2013, https://web.archive.org/web/20130927194948/http://yazamtech.com/en/vectorit, 3 pages.
White-listing Beyond Anti-Virus, YazamTech, captured on Sep. 27, 2013, https://web.archive.org/web/20130927195143/http://yazamtech.com/en/white-listing-beyond-anti-virus, 1 page.
White-listing Server or Station, YazamTech, captured on Sep. 27, 2013, https://web.archive.org/web/20130927195155/http://yazamtech.com/en/white-listing-server-or-station, 1 page.
YazamTech, captured on Sep. 27, 2013, https://web.archive.org/web/20130927193714/http://yazamtech.com/en, 2 pages.
Zip Bomb, YazamTech, captured on Sep. 27, 2013, https://web.archive.org/web/20130927195206/http://yazamtech.com/en/zip-bomb, 1 page.
YazamTech, captured on Jan. 7, 2014, https://web.archive.org/web/20140107212727/http://yazamtech.com/en, 2 pages.
YazamTech, captured on Jan. 11, 2014, https://web.archive.org/web/20140111182504/http://yazamtech.com/en, 2 pages.
About Us, YazamTech, captured on Jan. 24, 2014, https://web.archive.org/web/20140124145938/http://yazamtech.com/en/about-us, 3 pages.

(56) References Cited

OTHER PUBLICATIONS

Distributors, YazamTech, captured on Jan. 24, 2014, https://web.archive.org/web/20140124145954/http://yazamtech.com/en/distributor_en, 1 page.
VectorIT, YazamTech, captured on Jan. 25, 2014, https://web.archive.org/web/20140125221917/http://yazamtech.com/en/vectorit, 3 pages.
YazamTech, captured on Jan. 25, 2014, https://web.archive.org/web/20140125161656/http://yazamtech.com/en , 2 pages.
Contact Us, YazamTech, captured on Jan. 27, 2014, https://web.archive.org/web/20140127013125/http://yazamtech.com/en/contact, 1 page.
Docs, YazamTech, captured on Jan. 27, 2014, https://web.archive.org/web/20140127013132/http://yazamtech.com/en/docs, 1 page.
Research, YazamTech, captured on Jan. 27, 2014, https://web.archive.org/web/20140127013151/http://yazamtech.com/en/research, 1 page.
Updates, YazamTech, captured on Jan. 27, 2014, https://web.archive.org/web/20140127013214/http://yazamtech.com/en/updates_en, 1 page.
A single ShuttleIT system can now handle multiple directories, YazamTech, captured on Aug. 1, 2014, https://web.archive.org/web/20140801204953/http://yazamtech.com/en/single-shuttleit-system-can-now-handle-multiple-directories, 1 page.
About Us, YazamTech, captured on Aug. 1, 2014, https://web.archive.org/web/20140801204634/http://yazamtech.com/en/about-us, 3 pages.
ActualIT, YazamTech, captured on Aug. 1, 2014, https://web.archive.org/web/20140801204843/http://yazamtech.com/en/actualit, 2 pages.
ActualIT, YazamTech, captured on Aug. 1, 2014, https://web.archive.org/web/20140801205619/http://yazamtech.com/en/actualit-1, 1 page.
Contact Us, YazamTech, captured on Aug. 1, 2014, https://web.archive.org/web/20140801204744/http://yazamtech.com/en/contact, 1 page.
Distributors, YazamTech, captured on Aug. 1, 2014, https://web.archive.org/web/20140801205513/http://yazamtech.com/en/distributor_en, 1 page.
Docs, YazamTech, captured on Aug. 1, 2014, https://web.archive.org/web/20140801204715/http://yazamtech.com/en/docs, 1 page.
File Slack, YazamTech, captured on Aug. 1, 2014, https://web.archive.org/web/20140801205632/http://yazamtech.com/en/file-slack, 1 page.
Frequently Asked Questions—English, YazamTech, captured on Aug. 1, 2014, https://web.archive.org/web/20140801205754/http://yazamtech.com/en/category/faq/english, 2 pages.
Frequently Asked Questions—English, YazamTech, captured on Aug. 1, 2014, https://web.archive.org/web/20140801205740/http://yazamtech.com/en/faq/english, 3 pages.
Frequently Asked Questions, YazamTech, captured on Aug. 1, 2014, https://web.archive.org/web/20140801205726/http://yazamtech.com/en/faq, 3 pages.
InjectorIT allows the usage of a secure server, YazamTech, captured on Aug. 1, 2014, https://web.archive.org/web/20140801204911/http://yazamtech.com/en/injectorit-allows-usage-secure-server, 1 page.
New Features in SelectorIT 1.1.0, YazamTech, captured on Aug. 1, 2014, https://web.archive.org/web/20140801204925/http://yazamtech.com/en/new-features-selectorit-110, 1 page.
Products, YazamTech, captured on Aug. 1, 2014, https://web.archive.org/web/20140801204646/http://yazamtech.com/en/products, 1 page.
Research, YazamTech, captured on Aug. 1, 2014, https://web.archive.org/web/20140801204731/http://yazamtech.com/en/research, 1 page.
SelectorIT, YazamTech, captured on Aug. 1, 2014, https://web.archive.org/web/20140801204521/http://yazamtech.com/en/selectorit, 4 pages.
SelectorIT, YazamTech, captured on Aug. 1, 2014, https://web.archive.org/web/20140801205500/http://yazamtech.com/en/selectorit?phpMyAdmin=2pTp23a-YBGPpnaPAXvSkgjFO71, 4 pages.
SelectorIT, YazamTech, captured on Aug. 1, 2014, https://web.archive.org/web/20140801205537/http://yazamtech.com/en/selectorit-0, 1 page.
SelectorIT: a security solution beyond anti-virus, YazamTech, captured on Aug. 1, 2014, https://web.archive.org/web/20140801204940/http://yazamtech.com/en/selectorit-security-solution-beyond-anti-virus, 1 page.
ShuttleIT, YazamTech, captured on Aug. 1, 2014, https://web.archive.org/web/20140801205552/http://yazamtech.com/en/node/37, 1 page.
ShuttleIT, YazamTech, captured on Aug. 1, 2014, https://web.archive.org/web/20140801204802/http://yazamtech.com/en/node/9, 4 pages.
Updates, YazamTech, captured on Aug. 1, 2014, https://web.archive.org/web/20140801204702/http://yazamtech.com/en/updates_en, 1 page.
VectorIT, YazamTech, captured on Aug. 1, 2014, https://web.archive.org/web/20140801205606/http://yazamtech.com/en/injectorit-0, 1 page.
VectorIT, YazamTech, captured on Aug. 1, 2014, https://web.archive.org/web/20140801205431/http://yazamtech.com/en/vectorit, 3 pages.
White-listing Beyond Anti-Virus, YazamTech, captured on Aug. 1, 2014, https://web.archive.org/web/20140801205647/http://yazamtech.com/en/white-listing-beyond-anti-virus, 1 page.
White-listing Server or Station, YazamTech, captured on Aug. 1, 2014, https://web.archive.org/web/20140801205659/http://yazamtech.com/en/white-listing-server-or-station, 1 page.
YazamTech, captured on Aug. 1, 2014, https://web.archive.org/web/20140801204051/http://yazamtech.com/en, 2 pages.
Zip Bomb, YazamTech, captured on Aug. 1, 2014, https://web.archive.org/web/20140801205712/http://yazamtech.com/en/zip-bomb, 1 page.
YazamTech, captured on Mar. 20, 2015, https://web.archive.org/web/20150320024752/http://www.yazamtech.com:80/en, 2 pages.
A single ShuttleIT system can now handle multiple directories, YazamTech, captured on Mar. 21, 2015, https://web.archive.org/web/20150321022719/http://www.yazamtech.com:80/en/single-shuttleit-system-can-now-handle-multiple-directories, 1 page.
About Us, YazamTech, captured on Mar. 21, 2015, https://web.archive.org/web/20150321060726/http://www.yazamtech.com:80/en/about-us, 3 pages.
ActualIT, YazamTech, captured on Mar. 21, 2015, https://web.archive.org/web/20150321022658/http://www.yazamtech.com:80/en/actualit, 2 pages.
InjectorIT allows the usage of a secure server, YazamTech, captured on Mar. 21, 2015, https://web.archive.org/web/20150321022704/http://www.yazamtech.com:80/en/injectorit-allows-usage-secure-server, 1 page.
New Features in SelectorIT 1.1.0, YazamTech, captured on Mar. 21, 2015, https://web.archive.org/web/20150321022709/http://www.yazamtech.com:80/en/new-features-selectorit-110, 1 page.
SelectorIT, YazamTech, captured on Mar. 21, 2015, https://web.archive.org/web/20150321060700/http://www.yazamtech.com:80/en/selectorit, 4 pages.
SelectorIT: a security solution beyond anti-virus, YazamTech, captured on Mar. 21, 2015, https://web.archive.org/web/20150321022714/http://www.yazamtech.com:80/en/selectorit-security-solution-beyond-anti-virus, 1 page.
ShuttleIT, YazamTech, captured on Mar. 21, 2015, https://web.archive.org/web/20150321060625/http://www.yazamtech.com:80/en/node/9, 4 pages.
Updates, YazamTech, captured on Mar. 21, 2015, https://web.archive.org/web/20150321022726/http://www.yazamtech.com:80/en/updates_en, 1 page.
VectorIT, YazamTech, captured on Mar. 21, 2015, https://web.archive.org/web/20150321060706/http://www.yazamtech.com:80/en/vectorit, 3 pages.
YazamTech, captured on Mar. 21, 2015, https://web.archive.org/web/20150321060721/http://www.yazamtech.com:80/en, 2 pages.
YazamTech, captured on Apr. 6, 2015, https://web.archive.org/web/20150406175817/http://www.yazamtech.com:80/en, 2 pages.
YazamTech, captured on Apr. 23, 2015, https://web.archive.org/web/20150423110533/http://www.yazamtech.com:80/en, 2 pages.
Updates, YazamTech, captured on Jun. 28, 2015, https://web.archive.org/web/20150628122651/http://www.yazamtech.com:80/en/updates_en, 1 page.
YazamTech, captured on Jun. 28, 2015, https://web.archive.org/web/20150628122630/http://www.yazamtech.com:80/en, 2 pages.

(56) References Cited

OTHER PUBLICATIONS

Products, YazamTech, captured on Jul. 1, 2015, https://web.archive.org/web/20150701010841/http://www.yazamtech.com:80/en/products, 1 page.
SelectorIT, YazamTech, captured on Jul. 2, 2015, https://web.archive.org/web/20150702095314/http://www.yazamtech.com:80/en/selectorit-0, 1 page.
YazamTech, captured on Jul. 11, 2015, https://web.archive.org/web/20150711093404/http://www.yazamtech.com:80/en, 2 pages.
Additional Products, YazamTech, captured on Aug. 30, 2016, https://web.archive.org/web/20160830010641/http://www.yazamtech.com/#!additional-products/cy7, 2 pages.
Company, YazamTech, captured on Aug. 30, 2016, https://web.archive.org/web/20160830010641/http://www.yazamtech.com/#!company/hl4mz, 1 page.
Contact us, YazamTech, captured on Aug. 30, 2016, https://web.archive.org/web/20160830010641/http://www.yazamtech.com/#!contact/c24vq, 1 page.
Distributors, YazamTech, captured on Aug. 30, 2016, https://web.archive.org/web/20160830010641/http://www.yazamtech.com/#!distributors/cohj, 2 pages.
FAQ, YazamTech, captured on Aug. 30, 2016, https://web.archive.org/web/20160830010641/http://www.yazamtech.com/#!faq/cirw, 1 page.
Which actions can be expected from the content filtering system?, YazamTech, captured on Aug. 30, 2016, https://web.archive.org/web/20160830010641/http://www.yazamtech.com/#!faqs-11/c148p, 1 page.
What are the advantages of YazamTech SelectorIT?, YazamTech, captured on Aug. 30, 2016, https://web.archive.org/web/20160830010641/http://www.yazamtech.com/#!faqs-12/c18iv, 1 page.
What are the YazamTech values?, YazamTech, captured on Aug. 30, 2016, https://web.archive.org/web/20160830010641/http://www.yazamtech.com/#!faqs-14/cg8a, 1 page.
Who are the applicable customers for YazamTech products?, YazamTech, captured on Aug. 30, 2016, https://web.archive.org/web/20160830010641/http://www.yazamtech.com/#!faqs-15/c1xmc, 1 page.
Home, YazamTech, captured on Aug. 30, 2016, https://web.archive.org/web/20160830010641/http://www.yazamtech.com/, 2 pages.
YazamTech Updates, YazamTech, captured on Aug. 30, 2016, https://web.archive.org/web/20160830010641/http://www.yazamtech.com/#!new-post-updates-page/c1gp0, 4 pages.
Our Team, YazamTech, captured on Aug. 30, 2016, https://web.archive.org/web/20160830010641/http://www.yazamtech.com/#!our_team/cqn6, 2 pages.
Products, YazamTech, captured on Aug. 30, 2016, https://web.archive.org/web/20160830010641/http://www.yazamtech.com/#!products/c5ro, 2 pages.
SelectorIT, YazamTech, captured on Aug. 30, 2016, https://web.archive.org/web/20160830010641/http://www.yazamtech.com/#!selectorit/ccz3, 1 page.
ShuttleIT, YazamTech, captured on Aug. 30, 2016, https://web.archive.org/web/20160830010641/http://www.yazamtech.com/#!shuttelit/cv2j, 1 page.
Solutions, YazamTech, captured on Aug. 30, 2016, https://web.archive.org/web/20160830010641/http://www.yazamtech.com/#!solutions/c1mbk, 2 pages.
MetaDefender Email Security—4.7 Support for password protected attachments, OPSWAT, retrieved Sep. 27, 2018, https://onlinehelp.opswat.com/emailv4/4.7_Support_for_password_protected_attachments.html, 9 pages.
בלמ"ס (Hebrew-language document A), 11 pages.
דו"ח בדיקות ביטחון למערכת הלבנה SelectorIT (Hebrew-language document B), Sep. 11, 2011, 6 pages.
English Translation of בלמ"ס (Hebrew-language document A), 14 pages.
English Translation of SelectorIT דו"ח בדיקות ביטחון למערכת הלבנה (Hebrew-language document B), 8 pages.

* cited by examiner

PROVIDING A FASTLANE FOR DISARMING MALICIOUS CONTENT IN RECEIVED INPUT CONTENT

PRIORITY CLAIM

This application is a continuation-in-part of, and claims the benefit of priority to, U.S. patent application Ser. No. 15/441,904, filed on Feb. 24, 2017, and U.S. patent application Ser. No. 15/441,860, filed on Feb. 24, 2017, each of which claims priority under 35 U.S.C. § 119 to U.S. provisional patent application No. 62/442,452, filed on Jan. 5, 2017. This application is also a continuation-in-part of, and claims the benefit of priority to, U.S. patent application Ser. No. 15/616,577 filed on Jun. 7, 2017, now U.S. Pat. No. 9,858,424, U.S. patent application Ser. No. 15/672,037, filed on Aug. 8, 2017, now U.S. Pat. No. 9,922,191, and U.S. patent application Ser. No. 15/795,021, filed on Oct. 26, 2017, now U.S. Pat. No. 9,923,921, each of which claims priority under 35 U.S.C. § 119 to U.S. provisional patent application No. 62/442,452, filed on Jan. 5, 2017, U.S. provisional patent application No. 62/450,605, filed on Jan. 26, 2017, and U.S. provisional patent application No. 62/473,902, filed on Mar. 20, 2017. This application is also a continuation-in-part of, and claims the benefit of priority to U.S. patent application Ser. No. 15/926,484, filed Mar. 20, 2018, which claims priority under 35 U.S.C. § 119 to U.S. provisional patent application No. 62/473,902, filed on Mar. 20, 2017. Each of the aforementioned applications is incorporated herein by reference in its entirety.

BACKGROUND

Attackers are known to use several file or document based techniques for attacking a victim's computer. Known file-based attacks may exploit a structure of a file or document and/or vulnerabilities in a platform or document specification. Some file-based attacks include the use of active content embedded in a document, file, or communication to cause an application to execute malicious code or enable other malicious activity on a victim's computer upon rendering the file. Active content may include any content embedded in an electronic file or document configured to carry out an action or trigger an action. Common forms of active content include word processing and spreadsheet macros, formulas, or scripts, JavaScript code within Portable Document Format (PDF) documents, web pages including plugins, applets or other executable content, browser or application toolbars and extensions, etc. Some malicious active content can be automatically invoked to perform the intended malicious functions when a computer runs a program or application to render (e.g., open or read) the received content, such as a file or document. One such example includes the use of a macro embedded in a spreadsheet, where the macro is configured to be automatically executed to take control of the victimized computer upon the user opening the spreadsheet, without any additional action by the user. Active content used by hackers may also be invoked responsive to some other action taken by a user or computer process.

Another file-based attack includes the use of embedded shellcode in a file to take control of a victim's computer when the computer runs a program to open or read the file. A shellcode is a small piece of program code that may be embedded in a file that hackers can use to exploit vulnerable computers. Hackers typically embed shellcode in a file to take control of a computer when the computer runs a program to open or read the file. It is called "shellcode" because it typically starts a "command shell" to take control of the computer, though any piece of program code or software that performs any malicious task, like taking control of a computer, can be called "shellcode."

Most shellcode is written in a low-level programming language called "machine code" because of the low level at which the vulnerability being exploited gives an attacker access to a process executing on the computer. Shellcode in an infected or malicious file is typically encoded or embedded in byte level data—a basic data unit of information for the file. At this data unit level of a file, actual data or information for the file (e.g., a pixel value of an image) and executable machine code are indistinguishable. In other words, whether a data unit (i.e., a byte(s) or bit(s)) represents a pixel value for an image file or executable shellcode cannot typically be readily determined by examination of the byte level data.

Indeed, shellcode is typically crafted so that the infected or malicious file appears to be a legitimate file and in many cases functions as a legitimate file. Additionally, an infected or malicious file including embedded shellcode may not be executable at all by some software applications, and thus the infected file may appear as a legitimate file imposing no threat to a computer. That is, an infected or malicious image file, for example, may be processed by an application executed on a computer to display a valid image and/or to "execute" the byte level data as "machine code" to take control of a computer or to perform other functions dictated by the shellcode. Thus, whether a process executing on a computer interprets a byte or sequence of bytes of a file to represent information of the file, or instead to execute malicious machine code, depends on a vulnerability in a targeted application process executed on the computer.

Shellcode is therefore often created to target one specific combination of processor, operating system and service pack, called a platform. Additionally, shellcode is often created as the payload of an exploit directed to a particular vulnerability of targeted software on a computer, which in some cases may be specific to a particular version of the targeted software. Thus, for some exploits, due to the constraints put on the shellcode by the target process or target processor architecture, a very specific shellcode must be created. However, it is possible for one shellcode to work for multiple exploits, service packs, operating systems and even processors.

Attackers typically use shellcode as the payload of an exploit targeting a vulnerability in an endpoint or server application, triggering a bug that leads to "execution" of the byte level machine code. The actual malicious code may be contained within the byte level payload of the infected file, and to be executed, must be made available in the application process space, e.g., memory allocated to an application for performing a desired task. This may be achieved by loading the malicious code into the process space, which can be done by exploiting a vulnerability in an application known to the shellcode developer. A common technique includes performing a heap spray of the malicious byte level shellcode, which includes placing certain byte level data of the file (e.g., aspects of the embedded shellcode) at locations of allocated memory of an application process. This may exploit a vulnerability of the application process and lead the processor to execute the shellcode payload.

Other file-based attacks are known and are generally characterized by the ability to control a victim's computer or perform malicious activity on the victim's computer upon a user opening, executing, or rendering a malicious document or file on the user's computer. More commonly, the user receives the malicious document or file via electronic communication, such as downloading from a remote repository, via the internet or via an e-mail communication. Attackers are becoming increasingly more sophisticated to disguise the nature of the attack, making such attacks increasingly more difficult to prevent using conventional techniques.

Computer systems are known to implement various protective tools at end-user computer devices and/or gateways or access points to the computer system for screening or detecting malicious content before the malicious content is allowed to infect the computer system. Conventional tools commonly rely on the ability to identify or recognize a particular malicious threat or characteristics known to be associated with malicious content or activity. For example, conventional techniques include attempts to identify malicious files or malicious content by screening incoming files at a host computer or server based on a comparison of the possibly malicious code to a known malicious signature. These signature-based malware detection techniques, however, are incapable of identifying malicious files or malicious content for which a malicious signature has not yet been identified. Accordingly, it is generally not possible to identify new malicious exploits using signature-based detection methods, as the technique lags behind the crafty hacker. Furthermore, in most cases, malicious content is embedded in otherwise legitimate files having proper structure and characteristics, and the malicious content may also be disguised to hide the malicious nature of the content, so that the malicious content appears to be innocuous. Thus, even upon inspection of a document according to known malware scanning techniques, it may be difficult to identify malicious content.

Another conventional technique is based on the use of behavior-based techniques or heuristics to identify characteristics of known malicious exploits or other suspicious activity or behavior, such as that based on a heap spray attack. One such technique implements a "sandbox," (e.g., a type of secured, monitored, or virtual operating system environment) which can be used to virtually execute untested or untrusted programs, files, or code without risking harm to the host machine or operating system. That is, conventional sandbox techniques may execute or detonate a file while monitoring the damage or operations post-detonation such as writing to disk, network activity, spawn of new processes etc. and monitor for suspicious behaviors. This technique, however, also suffers from the inability to identify new exploits for which a (software) vulnerability has not yet been identified, e.g., so called zero-day exploits. Some sophisticated malware have also been developed to evade such "sandbox" techniques by halting or skipping if it detects that it is running in such a virtual execution or monitored environment. Furthermore, clever hackers consistently evolve their code to include delayed, or staged attacks that may not be detected from evaluation of a single file, for example, or may lay in wait for a future unknown process to complete an attack. Thus, in some situations it may be too computationally intensive or impracticable to identify some shellcode exploits using conventional sandbox techniques.

Furthermore, because some malicious attacks are often designed to exploit a specific vulnerability of a particular version of an application program, it is very difficult to identify a malicious file if that vulnerable version of the application program is not executed at a screening host computer or server. This creates additional problems for networks of computers that may be operating different versions of application or operating system software. Thus, while a shellcode attack, for example, may be prevented or undetected at a first computer because its application software does not include the target vulnerability, the malicious file may then be shared within the network where it may be executed at a machine that is operating the targeted vulnerable version of application software.

The present disclosure includes embodiments directed to solving problems rooted in the use of embedded or referenced malicious content generally, without regard to a specific vulnerability or how the malicious content is configured to be invoked. The present disclosure includes embodiments directed to solving problems and risks posed by malicious content generally, whether such malicious content may be considered active content or shellcode or any other form of malicious content.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

An embodiment of the present disclosure includes a method for disarming malicious content in a computer system having a processor. The method includes accessing input content intended for a recipient of a network, automatically modifying at least a portion of digital values of the input content to render inactive code that is included in the input content intended for malicious purpose, the modified input content being of the same type as the accessed input content, enabling access to the modified input content by the intended recipient, analyzing the input content according to at least one malware detection algorithm configured to detect malicious content, and enabling access to the input content by the intended recipient when no malicious content is detected according to the at least one malware detection algorithm.

The method may include applying a signature-based malware detection algorithm to the input content, and automatically modifying at least a portion of digital values only if the signature-based malware detection algorithm does not detect malicious code in the input content. In some embodiments, the signature-based malware detection algorithm includes a first set of signatures of known malicious content, and the at least one malware detection algorithm is configured to evaluate the input content based on a second set of signatures of known malicious content. The second set of signatures may include at least one signature not included in the first set of signatures. In some embodiments, the at least one malware detection algorithm includes a behavior-based malware detection algorithm.

In some embodiments, the input content includes a plurality of data units having digital values representing media content, and wherein the at least a portion of digital values and an adjustment of the digital values are determined so as not to interfere with an intended use of the input content. In some embodiments, the at least a portion of digital values are determined without knowing a location of data units in the input content including malicious code. In some embodiments, the portion of digital values are determined randomly or pseudo-randomly based on a data value alteration model configured to disarm malicious code included in the input content. In some embodiments, the data value alteration model is configured to determine the portion of digital values based on determining that at least one of the digital values of the portion is statistically likely to include any malicious code.

In some embodiments, the automatically modifying at least a portion of digital values of the input content includes adjusting a bit depth of the portion of digital values. Additionally, in some embodiments, the input content includes an input file of a file type indicative of at least one media content type. In some embodiments, the automatically modifying is performed based on a configurable parameter associated with the intended recipient, the parameter indicating a rule that the intended recipient is to access the modified input content, wherein the parameter may be configurable by the intended recipient, and further wherein, the automatically modifying and enabling access to the modified input content is not performed when the parameter indicates a rule that the intended recipient is to access input content.

In some embodiments, enabling access to the input content includes replacing the modified input content with the input content, wherein replacing the modified input content may include replacing a pointer to the modified input content in a file server with a pointer to corresponding input content. In some embodiments, the method further comprises storing the modified input content at an electronic mail server in association with an electronic mail of the intended recipient, wherein replacing the modified input content includes replacing the modified input content stored in association with the electronic mail with the input content, such that the input content is accessible to the intended recipient via the electronic mail server. In some embodiments, enabling access to the input content includes providing a notification to the intended recipient indicating that the input content is accessible to the intended recipient, the notification including an electronic link to the input content. In some embodiments, enabling access to the input content includes forwarding the input content in an electronic mail to the intended recipient.

Another embodiment of the present disclosure includes a method for disarming malicious content in a computer system having a processor. The method includes accessing, by the computer system, input content intended for a recipient of a network and enabling the intended recipient to select to access the input content or modified input content. Wherein upon receipt of a request to access modified input content, the method includes modifying, by the processor, at least a portion of digital values of the input content to render inactive code that is included in the input content intended for malicious purpose, the modified input content being of the same type as the accessed input content, and enabling access to the modified input content by the intended recipient. Wherein upon receipt of a request to access the input content, the method includes analyzing, by the processor, the input content according to at least one malware detection algorithm configured to detect malicious content, and enabling access to the input content by the intended recipient when no malicious content is detected according to the at least one malware detection algorithm.

In some embodiments, enabling the intended recipient to select to access the input content or modified input content includes enabling selection to access both the input content and the modified input content, wherein upon receipt of a request to access both the input content and modified input content the method further comprises first performing the modifying to render inactive code that is included in the input content intended for malicious purpose and enabling access to the modified input content, then performing the analyzing and enabling access to the input content. In some embodiments, upon receipt of a request to access both the input content and modified input content, the enabling access to the input content includes replacing the modified input content with the input content. In some embodiments, the method includes, before enabling the intended recipient to select to access the input content or modified input content, applying a signature-based malware detection algorithm to the input content, and enabling the intended recipient to select to access the input content only if the signature-based malware detection algorithm does not detect malicious code in the input content. In some embodiments, the at least one malware detection algorithm includes a behavior-based malware detection algorithm.

Another embodiment include a system for disarming malicious content, the system comprising a memory device storing a set of instructions, and a processor configured to execute the set of instructions to access input content intended for a recipient of a network, modify at least a portion of digital values of the input content to render inactive code that is included in the input content intended for malicious purpose, the modified input content being of the same type as the accessed input content, enable access to the modified input content by the intended recipient, analyze, by the processor, the input content according to at least one malware detection algorithm configured to detect malicious content, and enable access to the input content by the intended recipient when no malicious content is detected according to the at least one malware detection algorithm. The processor of the system may also be configured to execute the instructions to modify the at least a portion of digital values of the input content based on a received request from the intended recipient to access modified input content. In some embodiments, the processor may also be configured to execute the instructions to modify the at least a portion of digital values of the input content based on a configurable parameter associated with the intended recipient, the parameter indicating a rule that the intended recipient is to access the modified input content.

According to another embodiment, a method of disarming malicious code is included. The method includes receiving input content and modifying, according to a data value alteration model, at least a portion of digital values of the input content to render any malicious code in the input content inactive for its intended malicious purpose, which may result in modified input content. The method also includes receiving an instruction to create adjusted modified input content, and responsive to receiving the instruction, modifying, according to an adjusted data value alteration model, at least a portion of the digital values of the input content, which may result in adjusted modified input content that renders any malicious code in the input content inactive for its intended malicious purpose.

According to another embodiment, a method of disarming malicious code is included for receiving input content and modifying, according to a data value alteration model, at least a portion of digital values of the input content to render any malicious code in the input content inactive for its intended malicious purpose, which may result in modified input content. The method also includes enabling modification of a parameter of the data value alteration model for an adjusted modification of at least a portion of the digital values of the input content to create adjusted modified input content that renders any malicious code in the input content inactive for its intended malicious purpose while not interfering with an intended use of the input content.

According to another embodiment, a method of disarming malicious code in a computer system includes receiving input content that includes a plurality of data units having a bit value, automatically applying a bit depth alteration model to the input content for altering a depth of the bit value of at least a portion of the data units so as to render any malicious code included in the plurality of data units inactive for its intended malicious purpose, and creating new content reflecting the application of the bit depth alteration model to the input content. The bit depth alteration model may alter a depth of the bit value of a data unit without changing the bit value of the data unit.

According to another embodiment, a method for creating a reconstructed file in a computer system includes determining a file format associated with a received input file, parsing the input file into one or more objects based on the file format, determining a specification associated with the file format of the input file, determining a current version of the specification exists, wherein the current version of the specification is different from the specification associated with the file format of the input file, and reconfiguring a layout of the input file to create a reconstructed file, wherein the reconstructed file is configured according to the current version of the specification.

According to another embodiment, a method of disarming malicious code includes receiving an input file including input content, determining a file format of the input file, and rendering any malicious code included in the input content inactive for its intended malicious purpose according to a file-format specific content alteration model applied to the input content to create a modified input file.

According to another embodiment, a method of disarming malicious code in a received input file includes parsing the input file into one or more objects based on a format of the input file, wherein at least one object includes data indicative of a printer setting, and reconfiguring a layout of the input file including the one or more objects to create a reconstructed file, the reconstructed file preserving the data of the at least one object including data indicative of a printer setting.

According to another embodiment, a method of disarming malicious code includes parsing an input file into one or more objects based on a format specification associated with the input file, modifying at least a portion of digital values of at least one object of the one or more objects to create a corresponding modified object, and reconfiguring a layout of the input file, including the corresponding modified object(s), to create a reconstructed file.

According to another embodiment, a method of disarming malicious code includes receiving input content intended for a recipient in a network, determining one or more policies based on a characteristics of the input content, an identity of a sender of the input content, and an identity of the intended recipient, and processing the input content to create modified input content according to the determined one or more policies, wherein the modified input content is configured to disarm or remove any malicious content included in the input content.

According to another embodiment, a method for verifying any malicious code included in accessed input content is disarmed in modified input content includes determining that the input content includes malicious code, modifying at least a portion of digital values of the input content to create modified input content configured to disarm malicious code included in the accessed input content, analyzing the modified input content according to a behavior-based malware detection algorithm, and when no suspicious activity is detected, generating a report indicating at least one change in a digital value of the original input content that caused the malicious code to be disarmed.

In accordance with additional embodiments of the present disclosure, a computer-readable medium is disclosed that stores instructions that, when executed by a processor(s), causes the processor(s) to perform operations consistent with one or more disclosed methods.

In accordance with additional embodiments of the present disclosure, a system is disclosed including a memory device storing a set of instructions, and a processor configured to execute the set of instructions to perform operations consistent with one or more disclosed methods.

It is to be understood that both the foregoing general description and the following detailed description are by example and explanatory only, and are not restrictive of the disclosed embodiments, as claimed.

BRIEF DESCRIPTION OF THE DRAWINGS

The subject matter regarded as the invention is particularly pointed out and distinctly claimed in the concluding portion of the specification. The disclosed principles, however, both as to organization and method of operation, together with objects, features, and advantages thereof, may best be understood by reference to the following detailed description when read with the accompanying drawings in which:

Figure 1:
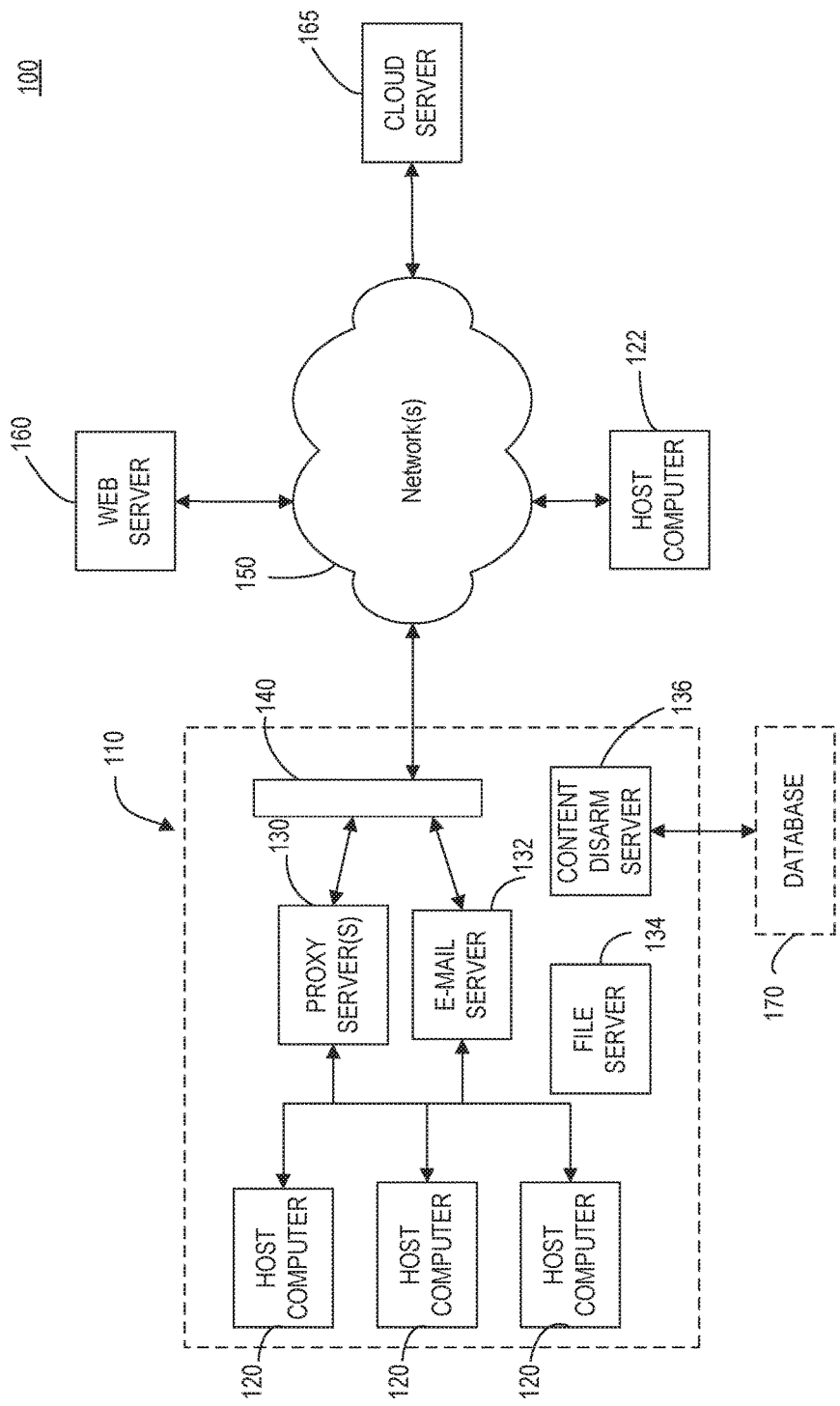
FIG. 1 is a schematic block diagram of an example computing environment consistent with the disclosed embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence. Additionally, some of the described embodiments or elements thereof can occur or be performed simultaneously, at the same point in time, or concurrently.

As explained above, one technique hackers use to obtain control of a victim computer or computing environment is through the execution of malicious code at the victim computer or computing environment. One tool used by hackers, for which some of the example embodiments are directed, is the embedding of malicious shellcode in media content or a file of media content file type, such as an image, audio, video, or multimedia file type. The example embodiments, however, are also applicable to other non-media content and non-media content file types that encode data in a binary data format or other format that allows a binary data block to be embedded in them such that they may include encoded malicious shellcode. Some example embodiments are also applicable generally to disarming malicious code (in any form) including in input content of any format or a particular format.

Another technique hackers use to obtain control of a victim computer or computing environment is through the execution of malicious active content. Active content, as this term is used throughout this disclosure, refers to any content embedded in a document that can configured to carry out an action or trigger an action, and includes common forms such as word processing and spreadsheet macros, formulas, scripts etc. An action can include any executable operation performed within or initiated by the rendering application. Active content is distinct from other "passive content" that is rendered by the application to form the document itself.

Malicious code or malicious content, as these terms are interchangeably used throughout this disclosure, refers to any content or code or instructions intended for a malicious purpose or configured to perform or intended to perform any surreptitious or malicious task, often unwanted and unknown to a user, including tasks, for example, to take control of a computer, obtain data from a computer etc. In some embodiments, suspicious content may also refer to malicious content or potentially malicious content. Examples of malicious code or malicious content include malware. Malware-based attacks pose significant risks to computer systems. Malware includes, for example, any malicious content, code, scripts, active content, or software designed or intended to damage, disable, or take control over a computer or computer system. Examples of malware include computer viruses, worms, trojan horses, ransomware, spyware, adware, shellcode, etc. Malware may be received into a computer system in various ways, commonly through electronic communications such as email (and its attachments) and downloads from websites.

Some hackers aim to exploit specific computer application or operating system vulnerabilities to enable successful execution of malicious code. One of ordinary skill in the art would understand that hackers implement many different and evolving techniques to execute malicious code, and that the disclosed embodiments include general principles aimed to disarm or prevent the intended execution of malicious code in input content or an input file regardless of the particular process or techniques a hacker has implemented in the design of the malicious code. In the example embodiments, to disarm malicious content may generally refer to rendering inactive, any code included in the input content that is intended for a malicious purpose.

The disclosed embodiments may implement techniques for disarming, sanitizing, or otherwise preventing malicious content from entering or affecting a computer system via received electronic content. In the disclosed embodiments, any (or all) input content received by a computer system may be modified or transformed to thereby generate modified input content in which any malicious code included in the input content is excluded, disarmed, rendered inactive or otherwise prevented from causing its intended malicious effects. The modified input content may then be sent to an intended recipient instead of the original input content or until the original input content may be deemed safe for releasing to the intended recipient. In some embodiments, the original input content may be stored in a protective storage area and thus may be considered to be quarantined in the computer system, such that any malicious content in the received input content is unable to attack the computer system.

Accordingly, the disclosed embodiments provide advantages over techniques for identifying or disarming malicious code, including zero-day exploits, which rely on detection of a known malware signature or detection of suspicious behavior. That is, the disclosed embodiments can disarm any malicious code included in input content without relying on signature-based or behavior-based malware detection techniques or any knowledge of a computer vulnerability or other hacking technique.

Although example embodiments need not first detect suspicious content or malicious content to disarm any malicious code included in input content, in some embodiments, upon identifying suspicious or malicious content, the disclosed embodiments may render any malicious code that may be included in the input content inactive for its intended malicious purpose. In some embodiments, suspicious content may also refer potentially malicious content or content that is later determined to be malicious or have a malicious purpose. Additionally, in some embodiments it may be advantageous to quarantine or otherwise block or prevent an intended recipient from accessing any input content that has been determined to include suspicious or malicious code.

The disclosed embodiments also implement techniques for tracking received input content or other types of content received by the computer system, and associating the content (or copies or characteristics thereof) with any respective generated modified content that may be passed on to an intended recipient. The original content may be quarantined in the computer system or otherwise prevented from being received or accessed by an intended recipient, so that malicious content that may be included in the content is unable to infect the computer system. Because the disclosed embodiments may associate received or accessed input content with respective modified content, the disclosed techniques also enable a computer system to produce the original input content upon demand, if needed, such as with respect to a legal proceeding or for any other purpose for which the original input content is requested. The disclosed embodiments may also provide functionality for making the original content available based on one or more policies or upon determining that the original input content is unlikely to include malicious code.

The disclosed embodiments may be associated with or provided as part of a data sanitization or CDR process for sanitizing or modifying electronic content, including electronic mail or files or documents or web content received at a victim computer or a computer system, such as via e-mail or downloaded from the web, etc. The disclosed embodiments may be associated with or provided as part of a data sanitization or CDR process for sanitizing or modifying electronic content, including electronic mail or files or documents or web content received at a victim computer or a computer system, such as via e-mail or downloaded from the web, etc. The disclosed embodiments may implement any one or more of several CDR techniques applied to received content based on the type of content, for example, or other factors. Some example CDR techniques that may be implemented together with the disclosed embodiments include document reformatting or document layout reconstruction techniques, such as those disclosed in U.S. Pat. No. 9,047,293, for example, the content of which is expressly incorporated herein by reference, as well as the altering of digital content techniques of copending U.S. patent application Ser. Nos. 15/441,860 and 15/441,904, filed Feb. 24, 2017, the contents of which are also expressly incorporated herein by reference. Additional CDR techniques that may be implemented together with the disclosed embodiments include the particular techniques for protecting systems from active content such as those disclosed in U.S. Pat. No. 9,858,424, as well as the particular techniques for protecting systems from malicious content included in protected content, such as those disclosed in U.S. patent application Ser. No. 15/926,484, filed Mar. 20, 2018, as well as the particular techniques for protecting systems from malicious content included in digitally signed content, such as those disclosed in U.S. patent application Ser. No. 15/795,021, filed Oct. 26, 2017. The disclosed embodiments may also include aspects for determining the effectiveness of the disclosed CDR techniques, such as those disclosed in U.S. patent application Ser. No. 15/672,037, filed Aug. 8, 2017. Additional aspects of the embodiments disclosed in the aforementioned patents and applications may also be included in the example embodiments herein. The contents of each of the aforementioned patents and patent applications are expressly incorporated herein by reference in its entirety.

The disclosed embodiments may be implemented with respect to any malicious content (or suspicious content) included in or identified in a document, file, or other received or input content, without regard to whether the content or document itself is deemed suspicious in advance or before the sanitization is performed. Suspicious content may or may not include malicious content. Suspicious content refers, for example, to a situation where input content may potentially or more likely include malicious content, such as when the received content comes from or is associated with an untrusted source. Content may be deemed suspicious based on one or more characteristics of the received input content itself or the manner in which it is received as well as other factors that alone or together may cause suspicion. One example of a characteristic associated with the input content refers to an authorship property associated with the input content. For example, the property may identify an author of the input content and the system determines whether the author property matches the source from which the input content was received and if there is no match then the system marks the input content as suspicious.

The disclosed embodiments may implement one or more CDR processes to generate the modified input content (for disarming any malicious content) without regard to whether malicious content is detected in the input content and without regard to whether the original input content is even analyzed by one or more malware detection techniques (i.e. without applying a malware detection algorithm to the input content). That is, it is not necessary to first detect any malicious or suspicious content in the input content to disarm the malicious content. The content disarming or sanitization techniques of the disclosed embodiments thus may prevent malware infection without malware detection. In some embodiments, however, one or more malware detection techniques may be implemented together with the exemplary embodiments in association with receiving input content and generating modified input content, but knowledge or awareness of suspected malicious or suspicious content is not required to disarm any malicious content that may be included in the input content.

Although example embodiments need not first detect suspicious or malicious received content or any suspicious or malicious content embedded in the received content, in some embodiments, upon identifying suspicious or malicious content, the disclosed processes are performed to disable any such malicious content included in input content. Additionally, in some embodiments, if malicious content is identified, the example embodiments may include functionality for removing or destroying such input content or embedded content that is known to be malicious, in lieu of the disclosed disarming processes. In some embodiments, any received content determined to include malicious content may be quarantined or blocked, so as not to be accessed by an intended recipient altogether. The example embodiments may be configurable based on one or more policies instructing how received content and any malicious content embedded therein is to be processed for suspicious or malicious content based on a set of known factors, some of which may be enterprise specific. Thus, the example embodiments for disarming malicious content are not limited to any enterprise computing environment or implementation, and can be implemented as a standalone solution or in combination as a suite of solutions, and can be customized according to preferences of a computing environment. In some embodiments, one or more malware detection techniques may be implemented without generating modified input content.

Received content or input content according to the disclosed embodiments may include any form of electronic content, including a file, document, an e-mail, etc., or other objects that may be run, processed, opened or executed by an application or operating system of the victim computer or computing device. Malicious content can be embedded among seemingly legitimate received content or input content. A file including embedded or encoded malicious content may be an input file or document that is accessed by a computing system by any number of means, such as by importing locally via an external storage device, downloading or otherwise receiving from a remote webserver, file server, or content server, for example, or from receiving as an e-mail or via e-mail or any other means for accessing or receiving a file or file-like input content. An input file may be a file received or requested by a user of a computing system or other files accessed by processes or other applications executed on a computing system that may not necessarily be received or requested by a user of the computing system. An input file according to the disclosed embodiments may include any file or file-like content, such as an embedded object or script, that is processed, run, opened or executed by an application or operating system of a computing system. Input content may include electronic mail, for example, or streamed content or other content. Thus, while some embodiments of the present disclosure refer to an input file or document, the disclosed techniques are also applicable to objects within or embedded in an input file or to input content generally, without consideration as to whether it can be characterized as a file, document, or object.

Reference is now made to FIG. 1, which is a block diagram of an example computing environment 100, consistent with example embodiments of the present disclosure. As shown, system 100 may include a plurality of computing systems interconnected via one or more networks 150. A first network 110 may be configured as a private network. The first network 110 may include a plurality of host computers 120, one or more proxy servers 130, one or more e-mail servers 132, one or more file servers 134, a content disarm server 136, and a firewall 140. In some embodiments, first network 110 may optionally include a database 170, which may be part of or collocated with other elements of network 110 or otherwise connected to network 110, such as via content disarm server 136, as shown for example. Any of proxy server 130, e-mail server 132, or firewall 140 may be considered an edge or gateway network device that interfaces with a second network, such as network 150. In some embodiments, content disarm server 136 may be configured as an edge or gateway device. When either of these elements is configured to implement one or more security operations for network 110, it may be referred to as a security gateway device. Host computers 120 and other computing devices of first network 110 may be capable of communicating with one or more web servers 160, cloud servers and other host computers 122 via one or more additional networks 150.

Networks 110 and 150 may comprise any type of computer networking arrangement used to exchange data among a plurality of computing components and systems. Network 110 may include a single local area network or a plurality of distributed interconnected networks and may be associated with a firm or organization, or a cloud storage service. The interconnected computing systems of network 110 may be within a single building, for example, or distributed throughout the United States and globally. Network 110, thus, may include one or more private data networks, a virtual private network using a public network, one or more LANs or WANs, and/or any other suitable combination of one or more types of networks, secured or unsecured.

Network(s) 150 may comprise any type of computer networking arrangement for facilitating communication between devices of the first network 110 and other distributed computing components such as web servers 160, cloud servers 165, or other host computers 122. Web servers 160 and cloud servers 165 may include any configuration of one or more servers or server systems interconnected with network 150 for facilitating communications and transmission of content or other data to the plurality of computing systems interconnected via network 150. In some embodiments, cloud servers 165 may include any configuration of one or more servers or server systems providing content or other data specifically for the computing components of network 110. Network 150 may include the Internet, a private data network, a virtual private network using a public network, a Wi-Fi network, a LAN or WAN network, and/or other suitable connections that may enable information exchange among various components of system 100. Network 150 may also include a public switched telephone network ("PSTN") and/or a wireless cellular network.

Host computers 120 and 122 may include any type of computing system configured for communicating within network 110 and/or network 150. Host computers 120, 122 may include, for example, a desktop computer, laptop computer, tablet, smartphone and any other network connected device such as a server, server system, printer, as well as other networking components.

File server 134 may include one or more file servers, which may refer to any type of computing component or system for managing files and other data for network 110. In some embodiments, file server 134 may include a storage area network comprising one or more servers or databases, or other configurations known in the art.

Content disarm server 136 may include one or more dedicated servers or server systems or other computing components or systems for performing aspects of the example processes including disarming and modifying input content. Accordingly, content disarm server 136 may be configured to perform aspects of a CDR solution, as well as perform other known malware mitigation techniques. Content disarm server 136 may be provided as part of network 110, as shown, or may be accessible to other computing components of network 110 via network 150, for example. In some embodiments, some or all of the functionality attributed to content disarm server 136 may be performed in a host computer 120. Content disarm server 136 may be in communication with any of the computing components of first network 110, and may function as an intermediary system to receive input content, including input electronic files and web content, from proxy server 130, e-mail server 132, file server 134, host computer 120, or firewall 140 and return, forward, or store a modified input file or modified input content according to the example embodiments. In some embodiments, content disarm server 136 may be configured as a security gateway and/or an edge device to intercept electronic communications entering a network.

Content disarm server 136 may also be configured to perform one or more malware detection algorithms, such as a blacklist or signature-based malware detection algorithm, or other known behavior-based algorithms or techniques for detecting malicious activity in a monitored run environment, such as a "sandbox," for example Accordingly, content disarm server 136 may include or may have access to one or more databases of malware signatures or behavioral characteristics, or one or more blacklists of known malicious URLs, or other similar lists of information (e.g., IP addresses, hostnames, domains, etc.) associated with malicious activity. Content disarm server 136 may also access one or more other service providers that perform one or more malware detection algorithms as a service. In some embodiments, one or more malware detection algorithms may be implemented together with the disclosed techniques to detect any malicious content included in input content. For example, one or more malware detection algorithms may be implemented to first screen input content for known malicious content, whereby the example embodiments are then implemented to disarm any malicious content that may have been included in the input content and that may not have been detected by the one or more malware detection algorithms. Likewise, content disarm server 136 may also be configured to perform one or more algorithms on received input content for identifying suspicious content.

In some embodiments, content disarm server 136 and or file server 134 may include a dedicated repository for storing original input content (and/or characteristics thereof) (protected or otherwise) received by content disarm server 136. The dedicated repository may be restricted from general access by users or computers of network 110. The dedicated repository may be a protected storage or storage area that may prevent any malicious content stored therein from attacking other computing devices of the computer system. In some embodiments, all or select original input content (protected or otherwise) may be stored in the dedicated repository for a predetermined period of time or according to a policy of a network administrator, for example. In some embodiments, characteristics associated with the original input content, such as a hash of an input content file, or a URL of requested web content, or other identifiers, etc., may be stored in addition to or instead of the original input content. In those embodiments where the original input content is protected, the protected original content may be stored in addition to or instead of any subsequently unprotected original input content.

Proxy server 130 may include one or more proxy servers, which may refer to any type of computing component or system for handling communication requests between one or more interconnected computing devices of network 110. In some embodiments, proxy server 130 may be configured as one or more edge servers positioned between a private network of first network 110, for example, and public network 150.

E-mail server 132 may include one or more e-mail servers, which may refer to any type of computing component or system for handling electronic mail communications between one or more interconnected computing devices of network 110 and other devices external to network 110. In some embodiments, e-mail server 132 may be configured as one or more edge servers positioned between a private network of first network 110, for example, and public network 150.

First network 110 may also include one or more firewalls 140, implemented according to any known firewall configuration for controlling communication traffic between first network 110 and network 150. In some embodiments, firewall 140 may include an edge firewall configured to filter communications entering and leaving first network 110. Firewall 140 may be positioned between network 150 and one or more of proxy server 130 and e-mail server 132. In the embodiment shown, proxy server 130, e-mail server 132 and firewall 140 are positioned within first network 110, however, other configurations of network 110 are contemplated by the present disclosure. For example, in another embodiment, one or more of the proxy server 130, e-mail server 132 and firewall 140 may be provided external to the first network 110. Any other suitable arrangement is also contemplated. Additionally, other networking components, not shown, may be implemented as part of first network 110 or external to network 110 for facilitating communications within the first network 110 and with other external networks, such as network 150.

In some embodiments, computing environment 100 may include a database 170. In some embodiments, database 170 may be part of network 110. In some embodiments, database 170 may be outside of network 110, but otherwise made accessible to network 110. Although not shown, database 170 may also be accessible via network 150. In the disclosed embodiments, database 170 may include any database configurations or technology and may be configured for storing any information described herein that may be accessed for performing the disclosed techniques. For example, in some embodiments, database 170 may be configured for storing one or more records associated with malware signatures or behavioral characteristics, or one or more blacklists of known malicious URLs, or other similar lists of information (e.g., IP addresses, hostnames, domains, etc.) associated with malicious activity. In some embodiments, database 170 may be configured for storing one or more specifications of a plurality of file formats. Database 170 may also be configured for storing one or more configuration files or other records used to enforce or implement one or more policies for received input content. Other uses of database 170 may be apparent from the disclosed example embodiments.

The processes of the example embodiments may be implemented at any one of the computing devices or systems shown in FIG. 1, including host computer 120, 122, proxy server 130, e-mail server 132, file server 134, content disarm server 136, firewall 140, or cloud server 165.

Figure 2:
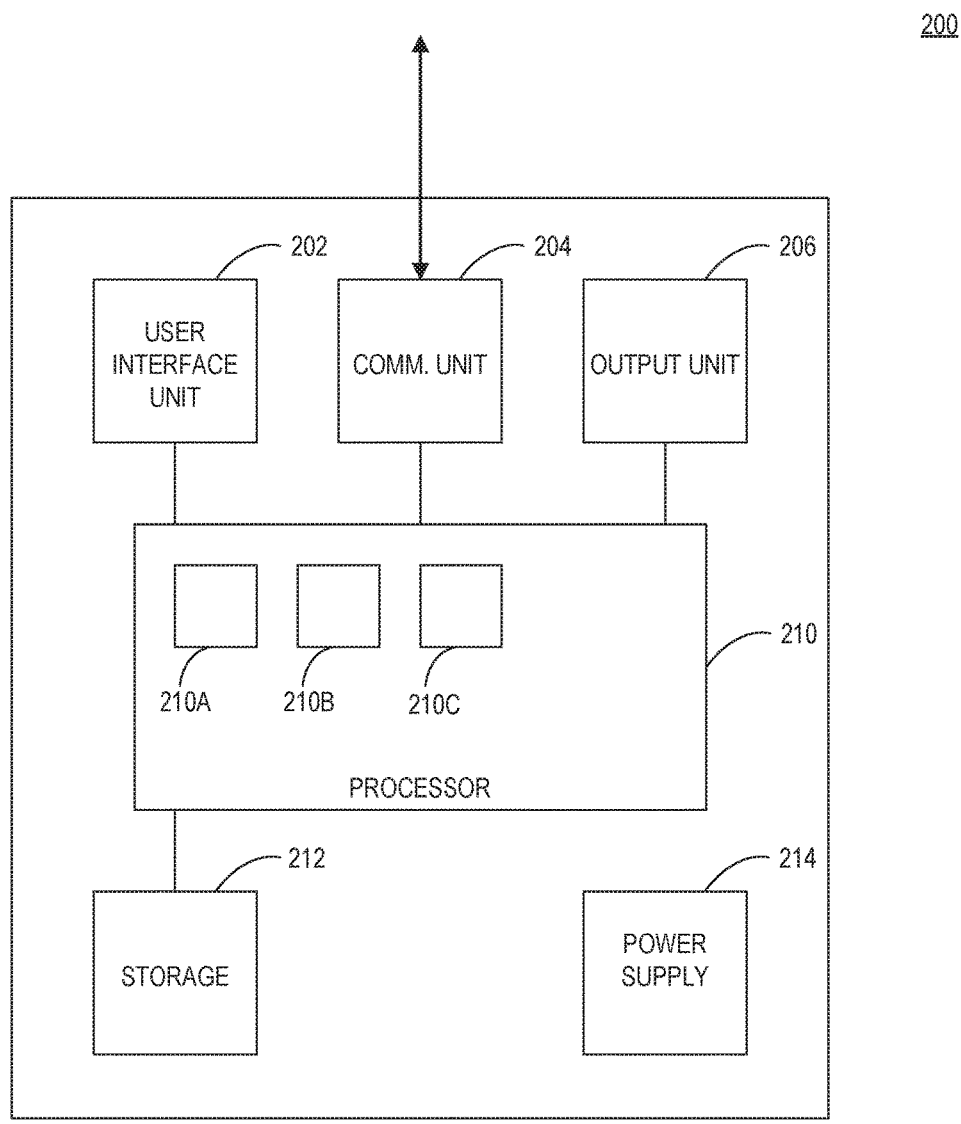
FIG. 2 is a schematic block diagram of an example computing system adapted to perform aspects of the disclosed embodiments.

Reference is now made to FIG. 2, which is a schematic block diagram of an example computing system 200 adapted to perform aspects of the disclosed embodiments. According to the example embodiments, computing system 200 may be embodied in one or more computing components of computing environment 100. For example, computing system 200 may be provided as part of host computer 120,122, proxy server 130, e-mail server 132, file server 134, content disarm server 136, or cloud server 165, for example. In some embodiments, computing system 200 may not include each element or unit depicted in FIG. 2. Additionally, one of ordinary skill in the art would understand that the elements or units depicted in FIG. 2 are examples only and a computing system according to the example embodiments may include additional or alternative elements than those shown.

Computing system 200 may include a controller or processor 210, a user interface unit 202, communication unit 204, output unit 206, storage unit 212 and power supply 214. Controller/processor 210 may be, for example, a central processing unit processor (CPU), a chip or any suitable computing or computational device. Controller/processor 210 may be programmed or otherwise configured to carry out aspects of the disclosed embodiments.

Controller/processor 210 may include a memory unit 210A, which may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable computer-readable memory units or storage units. Memory unit 210A may be or may include a plurality of possibly different memory units.

Controller/processor 210 may further comprise executable code 210B which may be any executable code or instructions, e.g., an application, a program, a process, task or script. Executable code 210B may be executed by controller 210 possibly under control of operating system 210C. For example, executable code 210B may be an application that when operating performs one or more aspects of the example embodiments. Executable code 210B may also include one or more applications configured to render input content, so as to open, read, edit, and otherwise interact with the rendered content. Examples of a rendering application include one of various Microsoft® Office® suite of applications, a PDF reader application or any other conventional application for opening conventional electronic documents, as well as a web browser for accessing web content.

User interface unit 202 may be any interface enabling a user to control, tune and monitor the operation of computing system 200, including a keyboard, touch screen, pointing device, screen, and audio device such as loudspeaker or earphones.

Communication unit 204 may be any communication supporting unit for communicating across a network that enables transferring, i.e. transmitting and receiving, digital and/or analog data, including communicating over wired and/or wireless communication channels according to any known format. Communication unit 204 may include one or more interfaces known in the art for communicating via local (e.g., first network 110) or remote networks (e.g., network 150) and or for transmitting or receiving data via an external, connectable storage element or storage medium.

Output unit 206 may be any visual and/or aural output device adapted to present user-perceptible content to a user, such as media content. Output unit 206 may be configured to display web content or, for example, to display images embodied in image files, to play audio embodied in audio files and present and play video embodied in video files. Output unit 206 may comprise a screen, projector, personal projector and the like, for presenting image and/or video content to a user. Output unit 206 may comprise a loudspeaker, earphone and other audio playing devices adapted to present audio content to a user.

Storage unit 212 may be or may include, for example, a hard disk drive, a floppy disk drive, a Compact Disk (CD) drive, a CD-Recordable (CD-R) drive, solid state drive (SSD), solid state (SD) card, a Blu-ray disk (BD), a universal serial bus (USB) device or other suitable removable and/or fixed storage unit. Data or content, including user-perceptible content may be stored in storage unit 212 and may be loaded from storage 212 into memory unit 210A where it may be processed by controller/processor 210. For example, memory 210A may be a non-volatile memory having the storage capacity of storage unit 212.

Power supply 214 may include one or more conventional elements for providing power to computing system 200 including an internal battery or unit for receiving power from an external power supply, as is understood by one of ordinary skill in the art.

Disarming Malicious Content Using a Data Value Alteration Model

Figure 3:
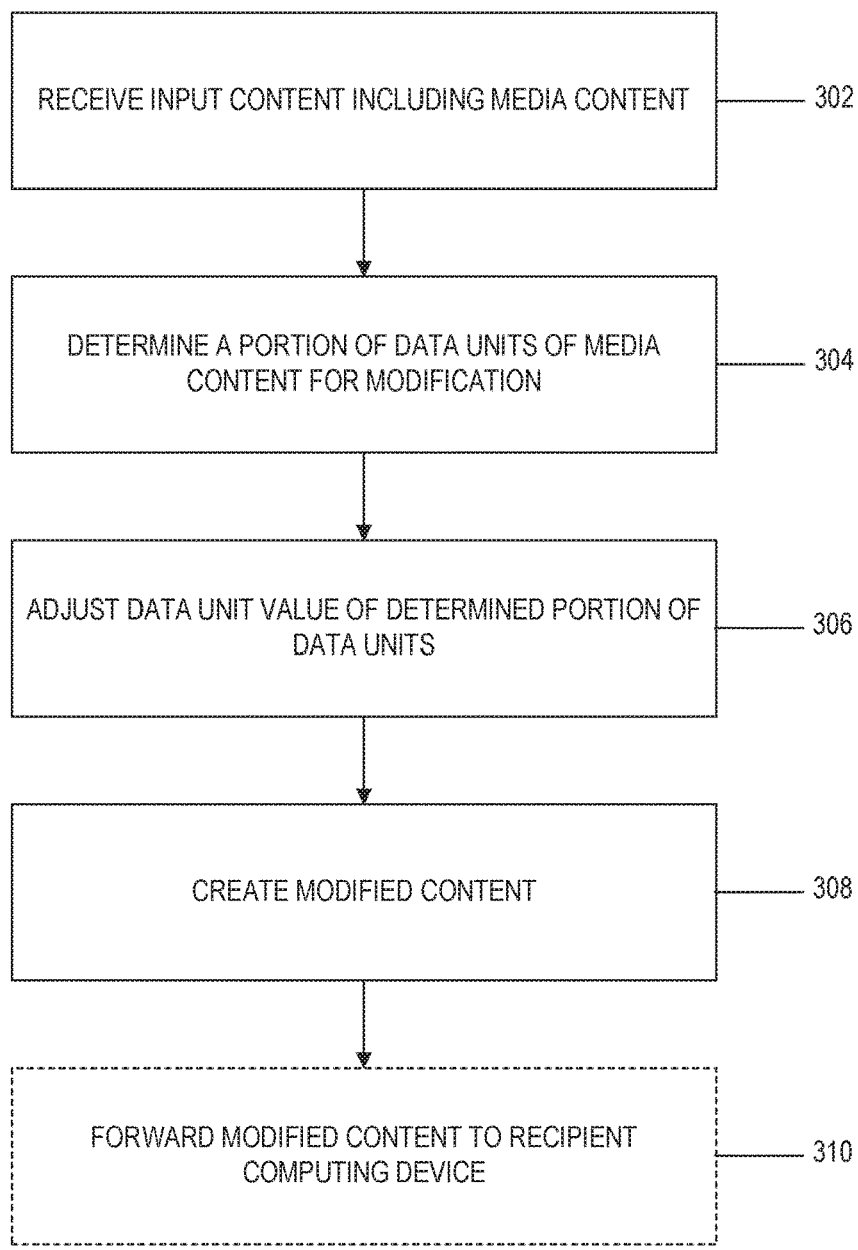
FIG. 3 is a flowchart of an example process for modifying input content to disarm malicious content according to a data value alteration model, consistent with the disclosed embodiments.

Reference is now made to FIG. 3, which is a flowchart of an example process for modifying input content, which in some embodiments may include an input file, consistent with the disclosed embodiments. According to the example embodiments, process 300 includes use of a data value alteration model that may be implemented to disarm malicious content or aspects of malicious content encoded in one or more data units of input content. In some embodiments, process 300 may be directed to disarming malicious content in the form of shellcode.

According to an example embodiment, a processor of a computing system may automatically apply a data value alteration model to the input content for altering select data values within the input content and output new content reflecting an application of the data value alteration model to the input content. The data value alteration model renders any malicious code included in the input content inactive for its intended malicious purpose without regard to any structure or format used to encapsulate the input content. That is the data value alteration model may be applied to input content without changing a structure, format or other specification for the input content. Additionally, the data value alteration model is determined such that a change to even a part of any malicious code included in the input content could render the malicious code inactive for its intended malicious purpose. In some embodiments, a malware detection algorithm may be applied to the new content reflecting an application of the data value alteration model to the input content to confirm the applied data value alteration model rendered any malicious code included in the input content inactive for its intended malicious purpose.

According to an example embodiment, malicious code, such as shellcode, in an input file or input content may be disarmed by applying intentional "noise" to the input file according to a data value alteration model, such as by changing the data unit values of at least some of the data units of the original input file to thereby create a modified input file. According to other embodiments for which a lossy compression is applicable for the specific format of the input file, the input file may be re-compressed to create a modified input file. The disclosed embodiments thereby change the bit or byte level representation of the content of the input file, such as an image, audio or video, but do so in a way intended to preserve a user's perceptibility of the content and not to prevent or interfere with an intended use of the content. As a result, at least some aspects of any malicious shellcode that may have been embedded in legitimate content data will have changed in the modified input file and will no longer be operational as intended, while a user's perception of the modified content, whether an image, an audio output or a video clip, will be largely unchanged. In some embodiments, the added "noise" may be added to randomly selected data units to eliminate any replay attack, to thwart crafty hackers, and so that any perceptible changes in the modified content to the user, whether visual and/or aural, may be minimal or negligible and at least will not prevent or interfere with an intended use of the content.

Upon opening, loading, playing, or otherwise accessing the modified input file, the changed/disarmed shellcode in the modified input file will contain a non-valid processor instruction(s) and/or illogical execution flow. Attempts at running or executing the disarmed shellcode will result in a processor exception and process termination, which will prevent a successful attack. While aspects of the example embodiments are described herein below as applied to an image file format, the example embodiments may be applied, with the apparent changes, to other media content file formats, such as image files (in any known format), audio files (in any known format) and video files (in any known format).

Referring back to FIG. 3, at operation 302 of process 300, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. In some embodiments, for example, the input content is received by a host computer 120, 122 that may be operated by an end-user. In other embodiments, the input content may be intended for host computer 120, 122 (or requested by host computer 120, 122) and is received by an intermediary computing system, such as proxy server 130, e-mail server 132, or firewall 140. In some embodiments, the input content may be received by a file server 134 or cloud server 165. Additionally, or alternatively, the input content may be received or accessed by content disarm server 136, from any of the computing components within network 110 or in communication with network 110.

The input content may be received or accessed by computing system 200 by any means known in the art, including such as by importing locally via an external storage device, downloading or otherwise receiving from a remote web-server, file server, or content server, or cloud server for example, or by receiving via e-mail or any other means for accessing or receiving a file or file-like content.

The input content may include one or more data units having a value representing media content. Media content may include any user-perceptible content including image data, video data, or audio data. In some embodiments, the media content may include content adapted to be presented, i.e. shown and/or played, to a human, such as a user of a computing system. In other embodiments, the media content may not be configured for presentation to a user. The input content may be in the form of a file configured according to any known file type associated with media content or known or suspected to include data elements of media content.

Throughout this disclosure, a data unit may refer to a portion of media content included in input content or an input file. A data unit may include, for example, portions of an image file, of an audio file and/or of a video file that includes media content of the input file. The media content may be displayable image/video content and/or playable audio/video content. In an image file, for example, a pixel or pixel value may be considered a data unit. In an audio file a sequence of bits representing a short playable audio stream (e.g., as long as 1 ms) may be considered a data unit. And in a video file, in a similar manner, a sequence of bits representing a small portion of a video frame, and/or a sequence of bits representing a short playable audio stream of the video file, may be considered a data unit.

According to some embodiments, one or more rules may be applied by the receiving computing system (or other intermediary computing system) to received input content or files according to known techniques for identifying trusted or potentially suspicious input files or otherwise suspicious content. For example, a preliminary analysis of an input file may include determining the source of the input file, the file type, file structure, the process accessing the file, or any other characteristics associated with the input file that may enable a determination as to a potential for an input file to include malicious content or malicious shellcode, for example. A preliminary analysis is optional, but in some embodiments it may be useful to first screen an input file for content or characteristics known or suspected to be associated with malicious content or activity or otherwise suspicious content. In the example embodiments, however, any malicious code included in the input content can be rendered inactive for its intended malicious purpose without having first detected possible or suspected malicious or suspicious content. In some embodiments, the disclosed techniques may be performed when one or more malware detection techniques do not identify suspicious content or suspected malicious content in received input content. Additionally, in some embodiments, upon identifying suspicious or malicious content, the disclosed processes are run to render any malicious code that may be included in the input content inactive for its intended malicious purpose. One or more other known content screening or analysis techniques may be implemented in addition to the example embodiments.

In an example embodiment, an input file may be suspected to include shellcode, either based on a preliminary analysis of the input file or based on some other characteristic of the input file. For example, in some embodiments, an input file of a predetermined file type may automatically be deemed suspicious or suspected to include shellcode. The predetermined file type may include one or more file types associated with media content or capable of including media content. Additionally or alternatively, an input file may include any file of predetermined file type or other characteristic whether suspected to include shellcode or not. In some embodiments, each input file may be treated as potentially including shellcode, whether or not a preliminary analysis of the input file is also performed.

As part of operation 304, computing system 200 may execute a program or instructions or otherwise perform a process to determine a portion of data units of input content to be modified according to the example embodiments. In some embodiments, computing system 200 reads or parses the data units of the input content in a process without invoking an execution engine such as application software of the computing system 200 for rendering the input content. That is, in the example embodiments, computing system 200 does not render the input content, as such rendering of input content may result in triggering execution of malicious code. In an example embodiment, input content may include one or more input files or objects etc. In such an embodiment, each distinct file, object, or content of the received input content may be parsed one by one in separate iterative processes to disarm any malicious code included in received input content. This may help prevent staged shellcode attacks that may rely, for example, on an auxiliary input file or input content.

In some embodiments, the determined portion of data units may include those data units representing media content of an input file. This may be determined based on a file type or structure of the input file or by other means for identifying the data units of the payload or content of the input file, as distinguished from a header, instructions, or other data ancillary to the media content of the input file. In some embodiments each data unit representing media content or payload content of an input file may be included in the portion of data units to be modified. In other embodiments, predetermined portions or subsets of the data units of the input file may be determined for modification. And in some embodiments, the portions of data units may be determined randomly or pseudo-randomly. A random or pseudo-random number generator, as is commonly known in the art may be implemented to determine the portion of data units. Other techniques that appear random-like, or for which a pattern is not readily identifiable or detectable and not frequently repeatable may be used for determining the data units for modification. The predetermined portions may be based on a file type or other characteristic of the input content, input file or media content included therein. Additionally or alternatively, the method for determining the portion of data units may be based on a file type or other characteristic of the input file or media content, such as the encoding specified for the media content. Additionally, the number or proportion of determined data units of the input file to be modified may be based on a file type, size, or other characteristics of the input content, input file or media content included therein.

As part of operation 306, computing system 200 may adjust a data unit value of the portion of data units determined in operation 304. In the example embodiments, the data unit value may include a byte value or binary value represented by a bit or string of bits. The data unit value may encode information corresponding to an aspect of media content, such as a pixel value for image data, or a short (e.g., 1 ms) stream or sample of audio data including a frequency component, for example. In some embodiments, the aspect of media content encoded by a data unit value may correspond to user-perceptible content. In the example embodiments, an adjustment of the data unit value may include a binary change in the data unit value of a data unit. An adjustment of the data unit values may be uniformly performed on the determined portion of data units. Alternatively, the data unit values for individual data units or groups of data units may be performed individually and may include an adjustment different than other data units.

Operations 304 and/or 306 can be implemented as a data value alteration model that selects the data units for alteration or modification and determines by what amount or value (such as a binary value) the selected data unit values are to altered. Selection of the data units and the alteration value can be performed according to an algorithm, consistent with the disclosed embodiments.

In an example embodiment, input content may include an input file of an image type or a file including image data, and the data units of the media content (i.e., image data) of the input file include a binary value representative of a pixel value of the image data. In the example embodiment, a data unit value (i.e., binary representation of pixel value) of at least some of the data units is modified, adjusted, or changed. Thus, in a sense, in an example embodiment micro changes or "noise" may be applied to at least portions of the image data of the input file. The amount of noise (e.g., the number of pixels of image data whose value is changed), may be predetermined or based on one or more characteristics of the input file, as well as other factors detailed below according to an example data value alteration model. Likewise, the effect of the adjustment of the data unit value (e.g., the degree of change in intensity or color of a pixel), may also be predetermined or based on one or more characteristics of the input file, as well as other factors detailed below according to an example data value alteration model.

As part of operation 308, computing system 200 creates modified content, which may include a modified input file. The modified content may be created by adjusting the data unit values of the determined portion of data units in any manner. The modified content includes new content reflecting the application of a data value alteration model to the input content. In some embodiments, the modified content may be created by substituting the adjusted data unit values of the determined portion of data units with the adjusted data unit values of the respective data units. In some embodiments, the data unit value of the determined portion of data units of a received input file may be overwritten by the adjusted data unit value. In other embodiments, a modified file or modified content may otherwise be created to include the adjusted data unit value in place of the data unit values of the respective determined portion of data units. In some embodiments, the modified content may be included in a reconstructed file in which aspects other than the media content of the input content or input file may also be modified or changed. For example, a header of an input file may be modified in a reconstructed file. A reconstructed file including the modified content may be encoded or compressed or the modified content alone may be encoded or compressed. Other changes to a structure, layout, or format of input content may also be implemented in a reconstructed file.

As part of optional operation 310, modified content or a modified file may be forwarded to a recipient computing device such as host computer 120,122 or a file server 134 or other computing device of computing environment 100. Operation 310 may be performed in those embodiments where process 300 is performed by a computing device or system other than an intended recipient of the input content, for example. In embodiments where process 300 is performed at a host computer 120, 122, for example, operation 310 may not be performed. Additionally, in some embodiments, modified content may be forwarded to one or more other computing devices or systems intermediate or alternative to an intended recipient computing device. In the example embodiments, the modified content may be presented (e.g., played or displayed) at the recipient computing device to a human user, or may otherwise be accessed, opened, processed, stored, etc. at the recipient computing device by the user or other process executing at the recipient computing device.

Shellcode embedded in an input file, such as an image file, an audio file, or a video file, according to some embodiments, may be unnoticeable when/if the image or other media content of that file is presented to a user (visually and/or audibly). Indeed, hackers have been known to encode shellcode in the data units of an input file that is not easily detectable, if at all, by a user in user-perceptible media content. In many cases, the input file appears to be a legitimate media content file and is usable or operable as a legitimate content file. Yet, as long as shellcode remains embedded or encoded in the data units of an input file it may be activated or executed by an application process of computing system 200. For example, in some embodiments, any embedded shellcode may be executed when an input file is loaded by a browser application for web browsing in case of an image file, or loaded by a media player for playing or viewing an audio or video file, etc.

But, if the value of even one bit of a data unit of encoded shellcode or a sequence of shellcode is changed, the integrity of the shellcode can be breached, and the shellcode can be inactive or disarmed, meaning rendered inoperative or unable to take control over a computing system or perform other function as intended by the attacker. While a location of shellcode in the input file, e.g., the one or more data units of the input file including encoded shellcode, typically is not known and may not be detectable, there is a chance that randomly or pseudo-randomly selected data units (e.g., pixels) from the data units of the input file (e.g., all pixels of an image) may include at least one data unit, the value of which includes an encoded part of the shellcode. One of ordinary skill in the art would understand that, as part of operation 304, as the percent or proportion of randomly selected data units (e.g., pixels) increases, the likelihood that at least one of the selected data units includes encoded shellcode improves, even if the shellcode is encoded in only a relatively few data units.

As part of operation 304, according to an example embodiment, a number of data units or a proportion of data units may be determined for modification based on a desired amount of noise to be applied to an input file. Noise in this context means visual distortion, but the level is so minute that it cannot realistically be perceived by a typical observer. While altering a greater number or proportion of data units may improve the ability to disarm any encoded shellcode, applying too much "noise" to the input file (e.g., image file) may result in noticeable degradations or modifications of the user-perceptible content of the input file when/if the modified file is presented to a user.

In some embodiments, each input file or each input file of a predetermined type, etc., or all input content or input content having certain characteristics that is received by a computing system 200 may be processed according to an example process 300, including those input files and input content that do not contain any encoded shellcode nor are suspected contain any shellcode. In some embodiments, one or more malware detection algorithms may first be applied to input content and process 300 is performed only if no suspicious activity is detected. This is advantageous because the example process 300 does not assume that any input file is safe or trusted, based on a preliminary analysis of the input file (if performed) or otherwise. This improves the likelihood of disarming malicious shellcode including crafty attacks or exploits that are not easily detectable or not yet known (e.g., zero day exploits). But if computing system 200 of an example embodiment creates a modified file for each input file or those input files of predetermined type etc., even for completely legitimate or innocuous input files, it may be desirable or required in some computing environments that the modified file be free of noticeable degradation. This may be desirable so as not to impede usability of the input files by end users. In other words, according to this example, it may be undesirable to create a modified file if the media content (e.g., image) of the resulting modified file is degraded or modified too far from the image of the original input file such that it results in a noticeable difference by the average user or it is unacceptable according to an intended use of the input file. This may be true, even if the example process 300 succeeds in disarming any embedded/encoded shellcode in the original input file. Thus, in some embodiments, aspects of the example process 300 may be tailored to realize a balance between effectiveness in disarming shellcode and usability of a created modified file. In some embodiments, it is desirable to disarm any malicious code included in input content without interfering with an intended use of the input content, such as by not preventing use of the input content for its intended purpose. In some embodiments, an intended use of the input content will not be interfered with when no noticeable change or only a slight noticeable change is perceptible in the modified content when, for example, viewed on the computer and/or accessed via in an application executing on the computer.

An example process 300 can be applied to disarm shellcode encoded in an input file of image file formats such as .BMP, .PNG and .JPG with results that may be satisfactory to an end user or organization operating a network 110, for example. The tailoring of certain aspects of an example process have been determined to reliably disarm encoded shellcode while resulting in a modified file or modified content for which the applied noise in a modified image is hardly noticeable to the average user, if at all.

In some example embodiments, a probable likelihood of disarming malicious code in input content will depend on the length of the shellcode encoded in the input content. In some embodiments, a data value alteration model will apply noise randomly (or pseudo-randomly) to X percent of data units (e.g., the pixels of an image) may result in a reasonable probability that at least one data unit encoding embedded shellcode of Y length (e.g., the number of data units including encoded shellcode) may be modified, where X>=1/Y. For example, in some embodiments, randomly or pseudo-randomly selecting 1 percent of data units (e.g. 1 byte for every 100 bytes) will result in reasonable likelihood of modifying shellcode of 100 byte length (Y). For some shellcode, modification of just one bit of the encoded shellcode may disarm the shellcode.

The manner for adjusting a data unit value, as part of operation 306, for the portion of data units determined in operation 304 may also be performed to achieve desired results. As part of operation 306 of an example embodiment, a data unit value of a randomly selected data unit may be adjusted by the following example modification. In this example, a data unit represents a pixel value of a pixel of an image of the input file. The pixel value (e.g., data unit value) may be represented with an RGB value as is known in the art. In other embodiments, a pixel value of an image may be represented in other formats specific to an image type or file type, for example. In an example embodiment, the RGB value $X_{(m;n)}$, $Y_{(m;n)}$, $Z_{(m;n)}$, respectively, of a data unit of an input file (e.g., original pixel $P_{(m;n)}$) may be changed according to the following formula $X_{(m;n)} \pm i$, $Y_{(m;n)} \pm j$, $Z_{(m;n)} \pm k$, resulting in an adjusted value of modified pixel $P \bmod_{(m;n)}$. The adjusted value corresponds to a binary data unit value, which may replace the respective data unit value in the modified file, as part of operation 308. The value of the RGB color modifiers i, j, k may vary. Yet to disarm most shellcode there may be no need to apply colors modifiers i, j, k, of a value greater than 1. Modifiers i, j, k, having a value higher than 5 may create a noticeable and/or undesirable change in the modified image of a modified file, without any added level of assurance for disarming shellcode. Thus, in an example embodiment, the expression that applies for the level of adjustment to a data unit value of each of a randomly (or pseudo-randomly) selected data unit or pixels $P(m;n)=\{r;g;b\}_{(m;n)}$ in an image array M:N according to an example data value alteration model will be:

$$P(\bmod)_{(i;j)} = \{r \pm i; g \pm j; b \pm k\} \{0 \le (i,j,k) < 5\}$$

In an example embodiment, each of the color modifiers i, j, k, need not be modified. In other words, it may be desirable to alter only two of the base color modifiers, j, k, or even only one of them. Thus, in some embodiments, only one of the color modifiers i, j, k, may be adjusted. While such adjustment or modification may limit any noticeable change in a modified file by an observer, it may carry risk. For example, some shellcodes may be encoded in only certain data unit bits that represent a certain color of the base colors RGB. Thus, an embodiment that adjusts only the j modifier, for example, may be ineffective against a shellcode encoded in the i or k representative bits of the data unit, for example.

For this reason, it may be desirable in the example embodiments to determine not only the portion of data units in a random-like manner, but also to adjust the data unit values in a random-like manner as well. Such an embodiment may prevent the crafty hacker form cleverly developing a shellcode to account for a systematic modification of an input file.

Process 300 has many goals, one being a high probability of disarming encoded shellcode without knowing its location (e.g., the encoded data units) in an input file and/or its size (e.g. length or number of encoded data units). Thus, an example embodiment aims to adjust a data unit value of as many data units as practicable. It may be preferred from a security viewpoint, for example, to adjust the value of each data unit of an input file (e.g., the value of all of the pixels of an image file), yet, this may cause a noticeable, undesirable and/or unacceptable change to the input file. A modified file may include a modified image, for example, that may be unacceptable for its intended use when presented to a user for example. Unacceptability may be determined objectively based on a comparison of an image of the original input file, for example. Accordingly, it may be desirable to adjust only some or a portion of data units of the input file. However, in some example embodiments unacceptability of a modified file for an intended use may not depend on an objective comparison of the input file and a modified file. This is because subtle changes can be made to input content that although may be noticeable in a side by side comparison, will not interfere with the intended use of the input content.

In the example embodiments, in order to address a concern of an undesirable or unacceptable modification of an input file, it may be advantageous to apply a minimal possible modification adjustment to the data unit value, e.g., the digital representation of a pixel value, for each data unit determined in operation 304, which in some embodiments may include each data unit of the input file. For example, assuming a pixel Pix(i,j) in location (i, j) is represented by the digital value of its R, G, B base colors so that $Pix_{(i,j)} = (r_{(i,j)}, g_{(i,j)}, b_{(i,j)})$, a minimal change of the color representation value may be applied to all of the image pixels, so that for an image of the size M×N every pixel $Pix_{(i,j)}$ {0≤i≤M−1; 0≤j≤N−1} the original pixel colors values may be changed as follows:

$$[r_{(i,j)}, g_{(i,j)}, b_{(i,j)}] \Rightarrow [r_{(i,j)} \pm 1, g_{(i,j)} \pm 1, b_{(i,j)} \pm 1]$$

For a graphical representation of 8 bits per color, the above adjustment format will change the combined color value by 1/256 of the entire intensity range of each base color. For some images of an input file, such small amount of modification may not be noticeable when the image of a modified file is presented to a user. Such change of the colors of the data units of the entire input file is likely to be much smaller than the difference between the way an image is presented on a first display device and the way the same image is presented on another display device, merely due to the difference in the representation of a certain pixel on the two different display devices when their digital value is the same. Moreover, the example modification may be less noticeable than modifications applied to only some pixels, because the modification to the entire image does not contain 'singular' locations in the image since a data unit value of all of the pixels are adjusted.

Thus, according to some embodiments, in order to ensure that at least one byte of any shellcode in an input image file, if present, will be changed and thus the shellcode will be disarmed, it may be preferred to modify each or substantially all of the data units of the input image file. Additionally, in order to minimize a magnitude of perceptible change of an image of a modified input file, the magnitude of change to be applied to each data unit or pixels may be ±1.

In the example embodiments, a computer program adapted to perform the steps and operations according to example process 300, may be stored in a non-transitory storage medium, such as memory 210A (FIG. 2). The computer program may be configured such that when it is executed by a processor, such as processor 210 (FIG. 2) of a computing system 200, wherever situated in the computing environment 100, it enables the processor to perform aspects of the example process 300 for modifying input content to disarm any shellcode that may be encoded in the input content. As described above, the example process 300 may be performed by any computing component or system of components in computing environment 100 for modifying an input content or an input file at one or more nodes in network 110. In some embodiments, example process 300 may be performed on any input content entering network 110 (e.g., via e-mail, download, upload or file transfer etc.), whether via network 150 or on a local host computer 120, for example. In some embodiments, example process 300 may be performed by a computing element of cloud server 165, for example, to disarm any malicious code included in content uploaded to the cloud server 165, for storage for example.

One of ordinary skill in the art would understand that the example embodiments described above pertaining to an image file are by example only. The example embodiments described above for disarming shellcode embedded in an input image file may be similarly applied for disarming shellcode embedded in input audio file or input video file, or other input file types, with necessary changes for processing the different input file types. For example, an input audio file sampled at 44,100 Hz rate and 24-bit sampling depth contains 44,100 samples at 24-bit resolution for each second of the sampled audio. Modifying an input audio file that may contain encoded shellcode, according to the example process 300, may be similarly performed for the data units (e.g., audio samples) of the input audio file. In some embodiments, for example, a data unit value of some or each audio sample of the input audio file may be altered by a binary value of "1." Such an alteration will change the tone represented by that data unit value by less than 1/8,000,000 of the original tone. Such a change is not likely to be noticeable to a listener of the modified file.

Adaptive Adjustment of a Data Value Alteration Model

The above embodiments include aspects for creating modified content while not substantially interfering with an intended use of the input content. As mentioned above, the suitability of the modified content may in some examples be determined based on perceptible inspection of the modified content. For example, in some embodiments, suitability of the modified content for its intended purpose may be determined upon inspection by a user (e.g. intended recipient or computer operator) or by a trained machine. The example embodiments include a process 400 for creating adjusted modified content. Process 400 provides functionality for adjusting one or more parameters of an applied data value alteration model to create adjusted modified input content that may or may not be more suitable for an intended purpose. The example embodiments are useful not only for potentially improving the perceptibility of modified content. In some embodiments, for example, one or more parameters of an applied data value alteration model may be adjusted to create adjusted modified input that includes even greater or more significant data value alterations, perhaps as a weighting factor to prioritize efficacy of the underlying disarming techniques over perceptibility of the input content.

Aspects of process 400 may be controlled or effected by an end user of a host computer 120 or operator of a network 110, for example. In some embodiments, functionality may be included that enables the end user or operator to perceive the media content of a modified file, such as by viewing an image file or listening to an audio file. If the end user or operator perceives distortions in the modified file, the end user or operator may be provided with additional functionality for adjusting one or more parameters of a data value alteration model associated with performing process 300, such as a parameter dictating the number of data units to be modified, how the value of the data units are to be adjusted, or how the portion of data units is determined. In some embodiments, a trained machine or a program or other process executed on the computing system 200 may be configured to identify changes or distortions in the modified file without input from an end user or operator. Thus, in some embodiments, aspects for altering data unit values may be iteratively and adaptively performed to achieve desired functionality. In some embodiments, computing system 200 may be configured to learn and adjust over time one or more parameters for creating a modified file (or an adjusted modified file), which may be based one or more characteristics of an input file or other enterprise or user specific parameters, for example.

Figure 4:
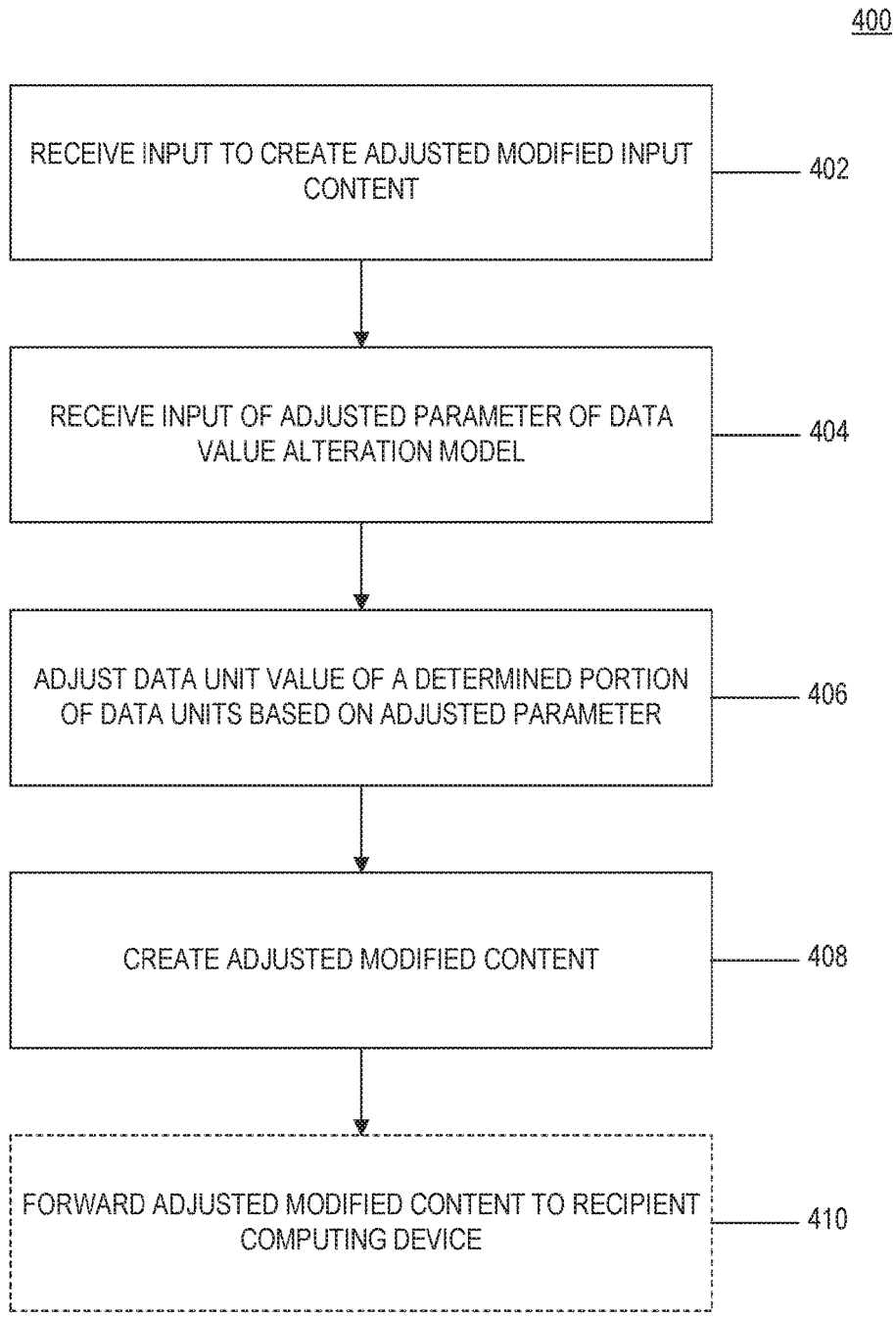
FIG. 4 is a flowchart of an example process for creating adjusted modified content, consistent with the disclosed embodiments.

Reference is now made to FIG. 4, which illustrates a flowchart for an example process 400 for creating adjusted modified content. In some embodiments, aspects of process 400 may be performed after operation 308 and/or 310, as described above with respect to FIG. 3.

At operation 402 of process 400, an input to create adjusted modified input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. The input may be received from an end user (e.g., an intended recipient of input content) via host computer 120, 122, for example. In some embodiments, the input may be received from a system operator or administrator of network 110. In some embodiments, the input may be received or accessed by computing system 200, such as the result of an automated machine analysis of the modified content created in operation 308, for example. The input may include a request to create adjusted modified input content, or otherwise may be indicative of a desire to create adjusted modified input content. In some embodiments, for example, an input may include information indicative of an end user's dissatisfaction with the modified content of operation 308 for its intended purpose, or other user sentiment or input indicative of a desire to create adjusted modified input content. In some embodiments, the input may include a signal or metric resulting from machine analysis of the modified content of operation 308, such as a comparison score, measure of distortion, etc. that may be indicative of a need or desire to create adjusted modified input content (e.g., the comparison score exceeds a predetermined suitability score, etc.).

At operation 404, computing system 202 may receive an input of an adjusted parameter of a data value alteration model. A data value alteration model may be one configured as detailed above with respect to FIG. 3, for example, or described elsewhere herein. In some embodiments, the input may include specific information for modifying a particular parameter and/or an amount or degree of change requested for a parameter. Example parameters may include the number or portion of data units to be modified, how the value of the data units are to be adjusted, or how the portion of data units is determined, or combinations of these. Other adjusted parameters may include any parameter for affecting a data value alteration model described above with respect to FIG. 3, as well as any other parameters of an example disarming process described elsewhere herein.

In some embodiments, the input may include other information from which an adjusted parameter of a data value alteration model may be determined. In some embodiments, the input received in operation 404 may include other information such as survey response information or a user comment or other metric provided by a user from which one or more parameters for adjusting may be determined. In some embodiments, the information may be based on a user's perception of the modified content created in operation 308, and/or an indicator of the nature of the intended use of the modified content, from which one or more parameters for adjustment may be determined. As detailed above, in some embodiments an adjustment parameter may be determined based on the quality or suitability of the modified content or a user's intended use, etc. In some embodiments, a user may be presented with an interface that provides functionality for a user to select a parameter for adjustment or a degree of adjustment. Although described herein with respect to a user input, the input received in operation 404 may include an input based on a machine analysis of the modified content.

As part of operation 406, computing system 200 may adjust a data unit value of a determined portion of data units based on one or more adjusted parameters. The adjusted parameters and their respective adjustment may be that input by a user or that determined by computing system 200 based on the input received in operation 404. In some embodiments, the adjusted parameters and their respective adjustment may be determined automatically based on the received input and to achieve a goal of network 110 and/or the intended recipient. Thus, in some embodiments, the adjusted parameters and their respective adjustment may reflect a policy choice of network 110 irrespective of the particular input received in operation 404 (e.g., prioritizing the disarming of potentially malicious content). The adjusting of a data unit value may be similar to that described above with respect to aspects of operation 304 and/or 306. The adjustment may be made to either the original input content received in operation 302 or the modified input content created in operation 308.

As part of operation 408, computing system 200 may create adjusted modified content. Creation of the adjusted modified content may be substantially similar to aspects described above with respect to operation 308, or other aspects similar to any of the disarming techniques described elsewhere herein.

As part of optional operation 410, computing system 200 may forward the adjusted modified content to a recipient computing device. Operation 410, and aspects and considerations thereof, may be substantially similar to aspects described above with respect to operation 310. In some embodiments, responsive to creation of adjusted modified content, process 400 may be repeated in one or more additional iterations for creating adjusted modified content, based on one or more considerations of a user or network 110.

While process 400 is described above in the context of following operation 308 and/or 310 (e.g. based on a perception of created modified content), process 400 may also be performed as a training operation to identify optimal or acceptable parameters for a desired goal and/or to train a data value alteration model to achieve desired efficacy and usability, etc. Process 400 may be repeated indefinitely to identify one or more parameters or combinations of parameters that achieve one or more desired goals. Process 400 may be performed for each of on one or more types or characteristics of input content to identify optimal or acceptable parameters for the various types or characteristics of input content.

In some embodiments, process 400 may be performed as a personal or custom operation requested by a user (e.g. intended recipient or network operator) to create adjusted modified input content. In some embodiments, a user may be presented an interface that enables the user to select one or more options from which custom or personalized adjusted parameters of a data value alteration model may be determined. The interface may be presented prior to making the input content or modified content available to the user, and may be part of a request to access input content. The interface may include a number of options or requests for input, from which one or more parameters may be configured or determined. The interface may be dynamic such that one or more parameters may be automatically controlled or changed based on user inputs or changes to one or more parameters. In some embodiments, a preview of modified content or adjusted modified content may be provided to simulate the effects of a data value alteration model on the input content. One or more parameters may then be determined based on the user input and/or other policies, for example.

Disarming Malicious Content Using a Bit Depth Alteration Model

Figure 5:
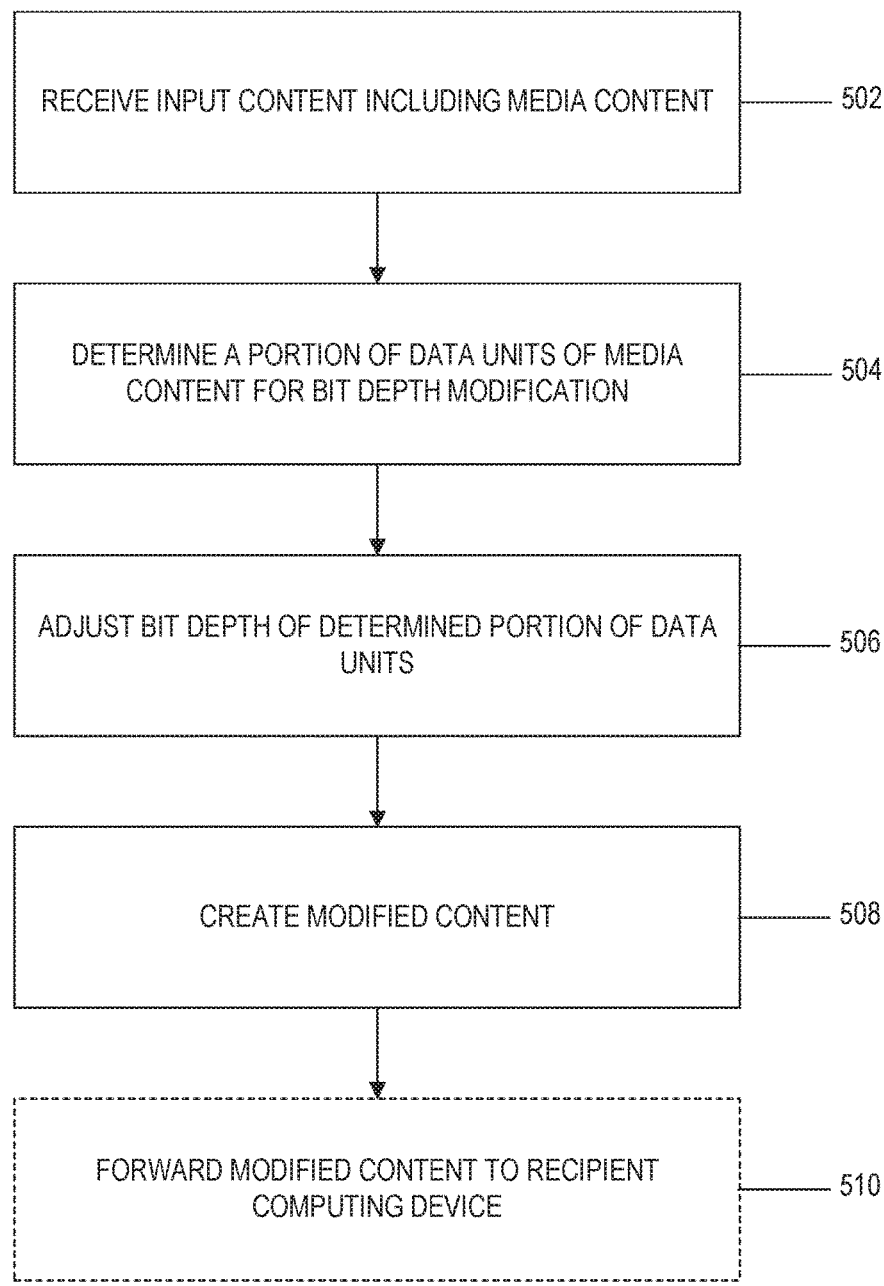
FIG. 5 is a flowchart of an example process for modifying input content, according to a bit depth alteration model, consistent with the disclosed embodiments.

Reference is now made to FIG. 5, which is a flowchart of an example process 500 for modifying input content based on a bit depth alteration model. According to the example embodiments, process 500 includes use of a bit depth alteration model that may be implemented to disarm malicious content or aspects of malicious content encoded in one or more data units of input content. Bit depth, according to the disclosed embodiments, may generally refer to the number of bits used to represent the information of a data unit. For example, in some embodiments depending on the nature of the input content, a bit depth may refer to the number of bits used to indicate the color of a single pixel, or the number of bits used for each color component of a single pixel. As another non-limiting example, a bit depth may refer to the number of bits of information used to encode each audio sample.

Many of the example implementation details referenced above with respect to process 300 may also be applicable to process 500 even if not expressly recited herein. Indeed, the discussion of process 500 focus on additional and alternative aspects for modifying content using a bit depth alteration model. Other aspects that may be part of an example implementation, although applicable, are excluded here for conciseness. One exception may include operation 306, which adjusts a data unit value of the determined portion of data units. Instead, process 500 adjusts a bit depth value of the determined portion of data units. In some embodiments, however, aspects of process 300 and aspects of process 500 may be performed together, such that for some data units both a data value alteration model of process 300 and a bit depth alteration model of process 500 may be applied. Furthermore, in some embodiments, some data units may be adjusted based on a data value alteration model of process 300 whereas other data units may be adjusted based on a bit depth alteration model of process 500. Accordingly, process 500 may be implemented in addition to or alternative to process 300 for any received input content.

According to an example embodiment, a processor of a computing system may automatically apply a bit depth alteration model to the input content for changing a depth (e.g. bit depth) of select data values (e.g. a portion of data units) within the input content and output new content reflecting an application of the bit depth alteration model to the input content. The bit depth alteration model may render any malicious code included in the input content inactive for its intended malicious purpose without regard to any structure or format used to encapsulate the input content. Additionally, the bit depth alteration model may be determined such that a change to even a part of any malicious code included in the input content could render the malicious code inactive for its intended malicious purpose. In some embodiments, a bit depth alteration model may be applied to the input content without applying a malware detection algorithm to the input content or without first detecting malicious content in the input content based on applying a malware detection algorithm.

According to an example embodiment, malicious code, such as shellcode, in an input file or input content may be disarmed by changing a bit depth of a select portion of data units of an input file according to a bit depth alteration model thereby creating a modified input file. By changing a bit depth of select data units, a digital value (or the information representing a digital value) is changed for the select data units, without necessarily changing the information represented by the digital value. In other words, an example bit depth alteration model may alter a depth of the bit value of a data unit without changing the bit value of the data unit. The example embodiments thereby change the depth of the bit or byte level representation of the content of the input file, such as an image, audio or video, and do so in a way intended to preserve a user's perceptibility of the content and not to prevent or interfere with an intended use of the content. As similarly described above with respect to process 300, if just one of the select data units was used to encode a portion of shellcode, such change in bit depth of the select data unit may disable or otherwise render the malicious code inactive for its intended malicious purpose.

Referring back to FIG. 5, at operation 502 of process 500, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. The input content may be the same as input content received in operation 302 detailed above, and may be received in the same manner as described above.

As part of operation 504, computing system 200 may execute a program or instructions or otherwise perform a process to determine a portion of data units of input content of which a bit depth is to be modified according to the example embodiments. In some embodiments, the determined portion of data units may include each data unit, or a subset of data units, or include those data units representing media content of an input file or those data units representing particular aspects of media content or those having a particular bit depth, etc. This may be determined based on a file type or structure of the input file or by other means for identifying the data units of the payload or content of the input file, as distinguished from a header, instructions, or other data ancillary to the media content of the input file. In some embodiments each data unit representing media content or payload content of an input file may be included in the portion of data units to be modified. In other embodiments, predetermined portions or subsets of the data units of the input file may be determined for modification. And in some embodiments, the portions of data units may be determined randomly or pseudo-randomly. A random or pseudo-random number generator, as is commonly known in the art may be implemented to determine the portion of data units. Other techniques that appear random-like, or for which a pattern is not readily identifiable or detectable and not frequently repeatable may be used for determining the data units for modification.

As similarly described with respect to process 300, (e.g., operation 304), the predetermined portions may be determined in operation 504 based on a file type or other characteristic of the input content, input file or media content included therein. Additionally or alternatively, the method or technique for determining the portion of data units may be based on a file type or other characteristic of the input file or media content, such as the encoding specified for the media content. Additionally, the number or proportion of determined data units of the input file to be modified may be based on a file type, size, or other characteristics of the input content, input file or media content included therein. As mentioned above, in some embodiments, the portion of data units for bit depth modification may include a subset of data units that are not selected for data unit value modification with respect to process 300 and/or may include those data units that are also determined in operation 304.

As part of operation 506, computing system 200 may adjust a bit depth of each data unit of the portion of data units determined in operation 504. In an example embodiment, a data unit includes a byte value or binary value represented by a bit depth including a bit or string of bits. The data unit may represent a value, based on the bit depth, that may encode information corresponding to an aspect of media content, such as a pixel value for image data, or a short (e.g., 1 ms) stream or sample of audio data including a frequency component, for example. In some embodiments, the aspect of media content encoded by a data unit value may correspond to user-perceptible content. In the example embodiments, an adjustment of the bit depth of a data unit may include a binary change in the data unit bits, without necessarily changing the encoded bit value.

In other words, in some embodiments, a bit depth for a data unit may be increased to require a greater number of bits to represent the same bit value. In some embodiments, an example bit depth alteration model may convert a 1 bit value of a determined data unit to an 8 bit representation of the 1 bit value of the data unit. In some embodiments, a bit depth for one or more data units may also be reduced, as similarly performed by compression techniques. In some embodiments, any data units selected for a decrease in bit depth may be determined based on one or more characteristics of the input content or the representative data unit values of the select data units. Other example alterations are contemplated herein. A bit depth adjustment of the data units may be uniformly performed on the determined portion of data units. Alternatively, the bit depth adjustment for individual data units or groups of data units may be performed individually and may include a bit depth adjustment different than other data units. In some embodiments, an example bit depth alteration model may be represented by an applied bit depth mask representative of bit depth alterations performed for the determined portion of data units.

Operations 504 and/or 506 can be implemented as a bit depth alteration model that selects the data units for alteration or modification and determines by what bit depth the selected data unit is to be altered. Selection of the data units and the bit depth alteration can be performed according to an algorithm, consistent with the disclosed embodiments. In some embodiments, a bit depth alteration model implemented in operations 504 and/or 506 may be determined or based on an additionally applied data value alteration model described above in FIGS. 3 and 4, and/or any other changes to input content described elsewhere herein.

As part of operation 508, computing system 200 creates modified content, which may include a modified input file. Aspects of operation 508 may be substantially the same as those described above with respect to operation 308. In some embodiments, for example, modified content may be created by substituting the bit depths of the determined portion of data units with adjusted binary data based on the adjusted bit depth of the respective data units, or by any other techniques described above with respect to operation 308 or as described elsewhere herein.

As mentioned above, in some embodiments, the underlying value of the data unit remains unchanged, whereas only the number of bits used to represent the value has changed. The modified content includes new content reflecting the application of the bit depth alteration model to the input content. In some embodiments, the data unit values of the determined portion of data units of a received input file may be overwritten by the bit depth adjusted data unit value. In other embodiments, a modified file or modified content may otherwise be created to include the adjusted data units in place of the data unit values of the respective determined portion of data units. In some embodiments, the modified content may be included in a reconstructed file in which aspects other than the media content of the input content or input file may also be modified or changed. For example, in some embodiments a data value alteration model may also be applied to the input content as described above with respect to FIG. 3 or FIG. 4. Additionally, a header of an input file may be modified in a reconstructed file. A reconstructed file including the modified content may be encoded or compressed or the modified content alone may be encoded or compressed. Other changes to a structure, layout, or format of input content may also be implemented in a reconstructed file. Other changes may also be applied to the input content consistent with any one or more of the additional techniques described elsewhere herein.

As part of optional operation 510, modified content or a modified file may be forwarded to a recipient computing device such as host computer 120,122 or a file server 134 or other computing device of computing environment 100. Operation 510 may be substantially the same as operation 310, detailed above.

Figure 6:
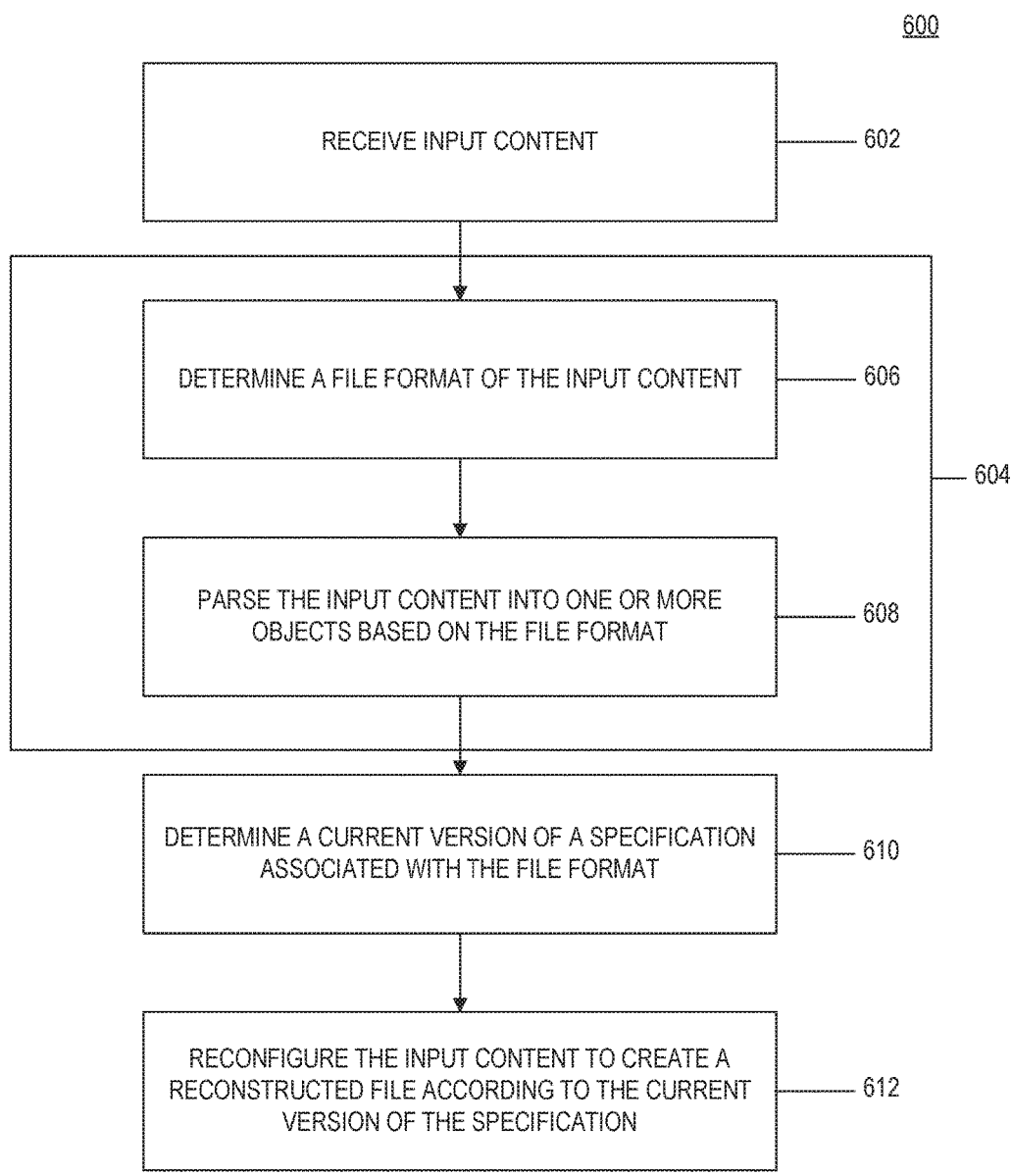
FIG. 6 is a flowchart of an example process for creating a reconstructed file according to a current version of a file format specification, consistent with the disclosed embodiments.

Disarming Malicious Content in Input Content According to a Current Specification As shown in FIG. 6, the example embodiments include a process 600 for disarming malicious content or aspects of malicious content encoded in one or more data units of input content, based on a file reconstruction technique. In some embodiments, process 600 includes functionality for reconfiguring an input file to create a reconstructed file, wherein the reconstructed file is configured according to a current file format specification. The current file format specification may be a more current file format specification of the file format of a received input file, or of a different file format than the received input file. In the example embodiments, process 600 may be performed in addition to or alternative to any of the disarming techniques detailed above and elsewhere herein.

Some malicious code or malicious content may be configured to target a vulnerability in a file format or a vulnerability in a rendering application based on a file format. The vulnerability may be a particular known vulnerability. A file format, as used herein, may generally describe a way that information is encoded and arranged for storage or transmission as a file. A file format may include a specification that details the requirements to be met for a file to be properly configured according to the file format. In some embodiments, a specification may define how a file element or object should be represented at a bit level and/or a document level. In some embodiments, a specification may include requirements for valid ranges of data that may represent one or more filed elements or objects. Over time, as vulnerabilities in a file format may be detected or new capabilities may be added (sometimes to increase security), for example, a file format may be updated as defined in an updated file format specification. At any time there may be one or more versions of a file format specification, one of them being a current or more current version of the specification than the other versions. Additionally at any time, input content of a file format may be configured according to any one of the versions of the specification.

In the example embodiments, it may be generally assumed that a current or more current version of the specification is likely to be the more secure version of the specification (e.g., defines a more secure file format that protects against known vulnerabilities). In other words, input content that is configured according to the more current version of a specification may be considered to be a safer file format that aids computer systems for disarming attacks. Additionally, some current or updated or patched operating systems or content rendering applications may no longer be compatible with certain older (e.g., less secure) specification versions. Thus, in some embodiments, an intended recipient executing a less secure version of a rendering application or operating system may be required to update an application or operating system on host machine 120, 122, for example, to render modified content that has been created according to a current format specification version. Thus, example embodiments that reconfigure an input file to create a reconstructed file according to a current file format specification may provide increased security to computing systems.

Referring back to FIG. 6, as part of operation 602, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example. Aspects of operation 602 may be substantially the same as those described above with respect to operation 302 (FIG. 3).

Computing system 200 may perform one or more operations for analyzing the received input content (operation 604). Operation 604 may include a first sub-step 606 for determining a file format of the input content, which may include one or more sub-operations. In some embodiments, for example, a file format may be determined based on a representation of a type associated with the format of the input file. A type may be determined based on a filename extension of the received input content that indicates one or more possible file formats of the input file. In some embodiments a file format may be determined based on internal metadata included inside the input file. The internal metadata may include a header, for example, or other indicia that may indicate a file format. In some embodiments, analysis of the content (e.g., elements or objects) or layout of the input content may provide an indication of the possible file format. In some embodiments, the file format may also be determined based on external metadata that may be received in associated with the input content or otherwise referenced by the received input content. In some embodiments, a file format may be based on a lookup in a database or other data structure that stores indicia or information associated with each of a plurality of file types or file formats, which may be referenced to determine a possible file format of the received input content. The example embodiments are not limited by any particular technique for determining a file format of the input content. In some embodiments, if a possible file format cannot be determined, the received input content may be designated as potentially malicious and/or quarantined and/or otherwise be prevented from being access by an intended recipient of the input content.

Operation 604 may include a second sub-step 608 to parse the input file into one or more elements or objects. The one or more objects may be parsed based on an analysis of the content or structure of the received input content and/or based on the possible file format identified or determined in operation 606. Upon parsing the input content into one or more objects, as part of operation 604, computing system 200 may perform additional operations for analyzing the one or more objects, and/or the input content as a whole. In some embodiments, one or more of the objects, or each object, may be analyzed to determine whether the object complies with the possible file format identified in operation 606 or any other file format accepted by network 110. An object may be considered as specification compliant if it follows or is consistent with the definition of the specification associated with a file format. In some embodiments, it may be determined whether the input content or any object therein deviates from a known specification associated with the file format determined in operation 606. In some embodiments, it may be determined whether any deviation is consistent with a predetermined acceptable deviation for the known specification. In some embodiments a predetermined acceptable deviation may be determined based on whether a degree of the determined deviation exceeds a predetermined threshold (e.g., such that at least about 80% of the parsed objects are specification compliant or within acceptable deviations). In some embodiments, when a determined deviation is not consistent with an acceptable deviation (e.g., it exceeds an acceptable threshold), computing system 200 may designate the input content as potentially malicious and/or may quarantine and/or otherwise block or prevent the input content from being accessed by an intended recipient of the input content. In some embodiments, a notification may be generated and/or sent to a user (e.g., intended recipient or network operator) indicating that the input content is not consistent or compliant with a known specification.

In some embodiments, it may also be determined whether the format or structure of the input content and/or the objects thereof corresponds to a filename extension or other indicia indicative of a purported file format or representation of a file format. In some embodiments, when the content or structure of the input content is not consistent with a purported file format (e.g., based on a filename extension or other metadata) then the received input content may be designated as potentially malicious and/or quarantined and/or otherwise blocked or prevented from being accessed by an intended recipient of the input content. In some embodiments, a notification may be generated and/or sent to a user (e.g., intended recipient or network operator) indicating that the input content is not consistent or compliant with a represented or purported file format.

As part of operation 604, computing system 200 may determine whether the received input content meets a threshold for which it may not be readily apparent that the input content contains malicious content. In some embodiments, for example, if analysis of the input content indicates that the received input content may be potentially malicious, process 600 may end after operation 604. If, however, the received input content has not been designated as potentially malicious as a result of operation 604, process 600 may proceed to operation 610 whereby computing system 200 determines a current version of a specification associated with a file format.

In some embodiments, computer system 200 may reference a database or data structure that stores a plurality of file format specifications and/or references to a plurality of file format specifications. The database or data structure may be managed and/or provided by network 110, or a third party service that may be accessible via an application programming interface (API) for example. In some embodiments, the database or data structure may include each published (or otherwise accessible) specification for each of a plurality of file formats. In some embodiments, the plurality of file formats may include only those file formats accepted by network 110. As part of operation 610, computing system 200 may determine a current version of a specification associated with the possible file format identified in operation 604/606. In some embodiments, computing system 200 may determine a current version of a specification associated with a related file format, or a file format to which the input content may be translatable to without preventing an intended use of the input content.

In the example embodiments, the current version of the specification may be presumed to define a more secure version of a file format and/or may define a file format configurable to prevent attacks based on one or more known vulnerabilities. In some embodiments, the current version of a specification determined in operation 610 may be a current or most updated version of a specification that is known to computing system 200 and/or made accessible to computing system 200. In some embodiments, a current version of a specification may be determined based on one or more unique characteristics of the received input content or a policy of network 110, for example.

Computing system 200 may reconfigure the input content to create a reconstructed file. The reconstructed file may be configured to comply with the current version of the file format specification determined in operation 610. In some embodiments, the one or more parsed objects may be reconfigured or reconstructed to form a reconstructed file that is compliant with the current version of the specification. In some embodiments, those objects that may not be compliant with a file format specification may be discarded and/or replaced. In some embodiments, operation 612 may include an intermediate reconfiguration step to convert the input content to an intermediate file format and then back to a file format associated with the input content, or any additional techniques described in U.S. Pat. No. 9,047,293, the contents of which are expressly incorporated herein by reference in its entirety. In some embodiments, the reconstructed file may include additional or alternative objects that may be needed to comply with the current version of the specification. In some embodiments, the nature of the reconstructed input content may disarm or otherwise affect an intended operation of any malicious content that may be included in the received input content.

Following operation 612, the reconstructed file optionally may be forwarded to an intended recipient, as similarly described above with respect to operation 310, etc. Execution of process 600 may be performed based on any considerations generally described herein and in addition to any of the other techniques described in the example embodiments.

Disarming Malicious Content in Input Content of a Specific File Format

In an example embodiment, reconfiguration of input content to create a reconstructed file (e.g., operation 612 of process 600) may be performed in a manner specific to a particular file format. To reconfigure the input content, computing system 200 may perform one or more operations as part of a file-format specific content alteration model. In some embodiments, operations 604-612 may be configurable based on one more file-format specific content alteration models, each according to one or more particular file formats. In some embodiments, as part of operation 608, the input content may be parsed into one or more objects based on a file-format specific content alteration model. Aspects of the analysis of operation 604 may also be based on a file-format specific content alteration model. Additionally, aspects of operation 612, such as the manner in which the input content is reconfigured and/or a format of a reconstructed file, may also be based on a file-format specific content alteration model. Examples of a file-format specific content alteration model include a binary format specific content alteration model, an XML-format specific content alteration model, and an instruction format specific content alteration model.

Figure 7:
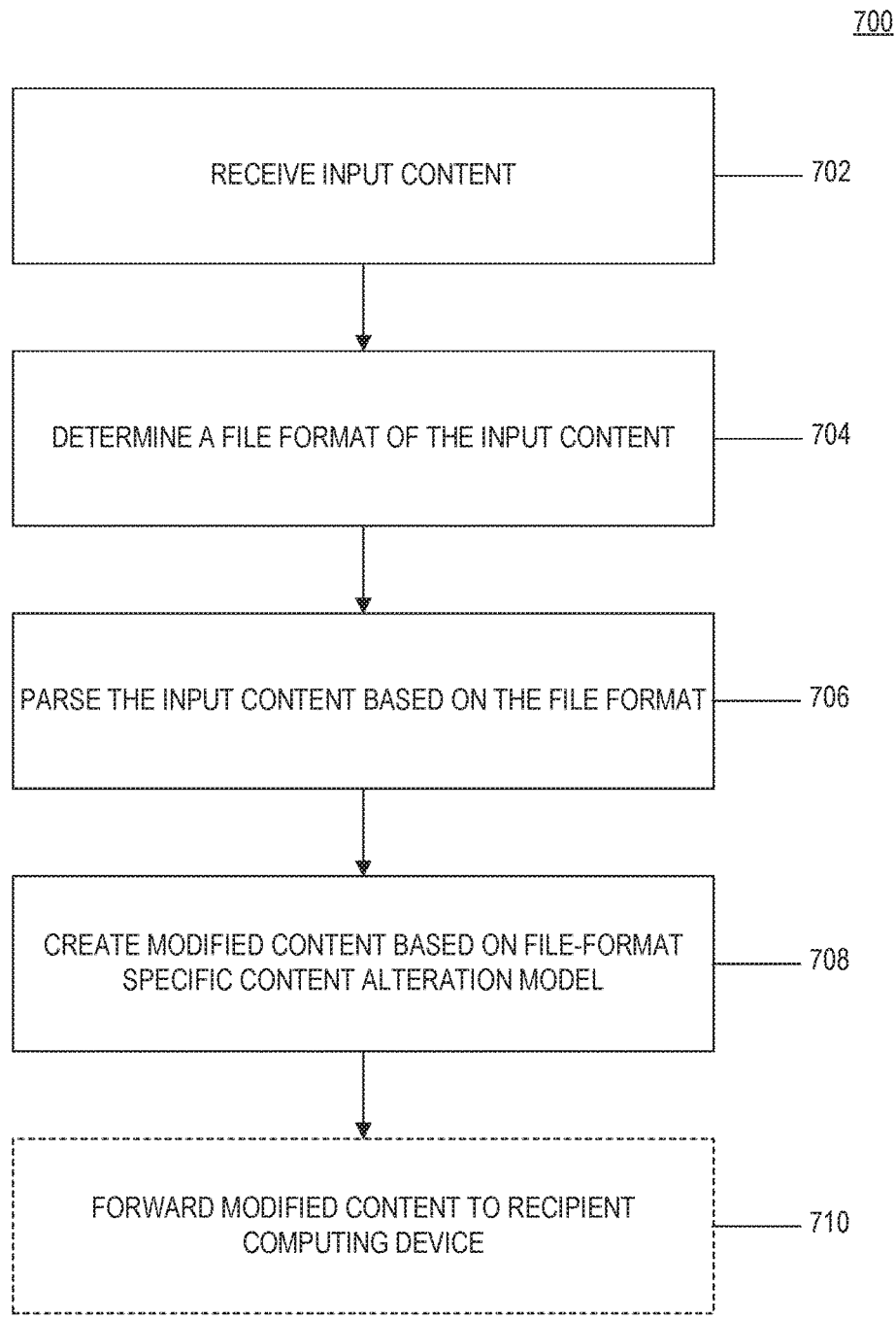
FIG. 7 is a flowchart of an example process for modifying input content to disarm malicious content according to a file-format specific content alteration model, consistent with the disclosed embodiments.

An example process 700 for disarming malicious code that may be included in the input content based on a file-format specific content alteration model is illustrated in FIG. 7. Process 700 may be performed by a computing system 200 in addition to or as an alternative to any example disarming process disclosed herein for generating a modified and/or reconstructed input file.

As shown in FIG. 7, at operation 702, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example Aspects of operation 702 may be substantially the same as those described above with respect to operation 302, 502 or 602, for example.

At operation 704, computing system 200 may analyze the received input content to determine a file format of the input content. Aspects of operation 704 may be substantially the same as those described above with respect to operation 606. Other aspects of operation 604 may also be included as part of operation 704, such as the functionality for designating the received input content as potentially malicious when the file format of the input content may not be determined or when a purported file format of the input content is not consistent with other characteristics of the input content.

At operation 706, computing system 200 may parse the input content based on the file format determined in operation 704. In some embodiments, the input content may be parsed based on a file-format specific content alteration model. The input content may be parsed into one or more logical elements or objects or instructions based on the determined file format and/or a file-format specific content alteration model.

At operation 708, computing system 200 may create modified content based on a file-format specific content alteration model that is applied to the input content. In the example embodiments, a file-format specific content alteration model is configured to disarm malicious code or malicious content included in the input content by applying one or more adjustments, modifications, or changes to the elements or objects of the input content or by applying one or more adjustments, modifications, reorganizations, etc. to a layout or configuration of the input content. In some embodiments, for example, a file-format specific content alteration model may include a binary file format specific content alteration model. Examples of a binary file format include those represented by a filename extension such as .doc, .xls and .pdf, for example, as well as many others. An example binary format specific content alteration model may reconfigure a layout of the input content or input file to create a reconstructed file, as similar described above with respect to operation 612, for example.

As described throughout this disclosure, the one or more changes to the input content and/or its layout or configuration is configured to disarm or otherwise prevent a malicious attack based on any malicious content that may be included in the input content.

At optional operation 710, the modified content may be forwarded to a recipient computing device. Aspects of operation 710 may be substantially the same as those described above with respect to operations 310, 410, or 510.

Figure 8:
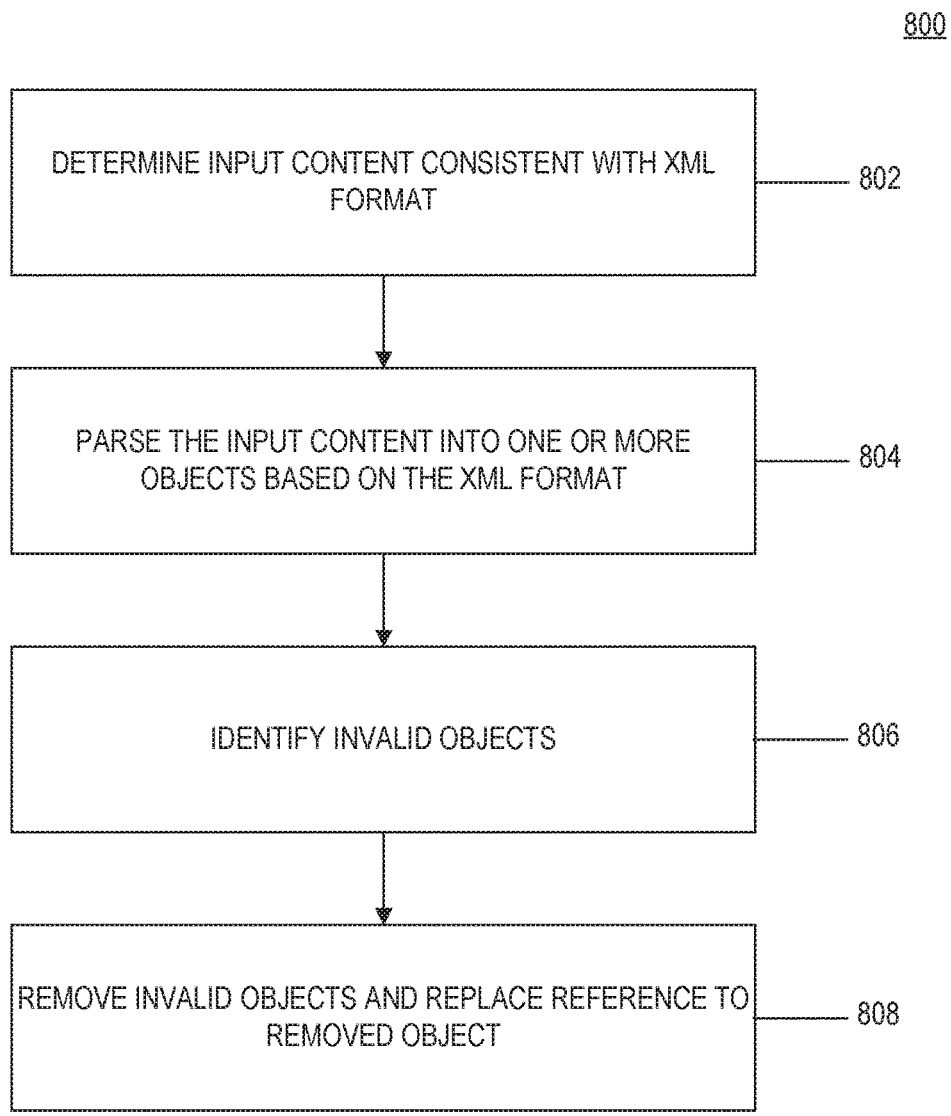
FIG. 8 is a flowchart of an example process for modifying content according to a XML format specific content alteration model, consistent with the disclosed embodiments.

FIG. 8 illustrates a process 800 that includes functionality for disarming malicious code that may be included in the input content based on a XML-format specific content alteration model. Process 800 may be provided as part of any example disarming process disclosed herein for generating a modified and/or reconstructed input file. For example, process 800 may be performed responsive to receiving input content according to any operations 302, 402, 502, 602 and 702, detailed above, or any example process described herein.

At operation 802, computing system 200 may determine a file format of the input content and may determine that the file format is consistent with an Extensible Markup Language (XML) type file format. Aspects of operation 802 may be substantially similar to that described above in operation 704 and/or operation 606. In some embodiments, an XML file format may be determined based on a filename extension of the input content including .docx or 0.3 mf, for example, or any other filename extension indicative of an XML based file format. Computing system 200 may also determine that the input content is of a format consistent with an XML format based on an analysis of the input content and any other techniques, such as those described above with respect to operation 606.

At operation 804, computing system 200 may parse the input content into one or more objects based on an XML format specification and/or a XML-format specific content alteration model. Aspects for parsing the input content in operation 804 may be substantially similar to those described above with respect to operations 706 and 608.

As part of operation 806, computing system 200 may analyze the input content and/or the one or more parsed objects to determine whether the objects are consistent with a specification associated with an XML format. For example, in some embodiments, computing system 200 may analyze the one or more objects according to an XML Schema associated with the determined XML format and identify any invalid objects based on the XML Schema. An XML Schema generally describes the structure of an XML document, as well as constraints and requirements. In some embodiments, computing system 200 may compare a value of the each of the one or more objects with an acceptable value or range of values defined by the XML Schema. In some embodiments, the comparison may be made based on a current version of the XML Schema. In some embodiments, aspects of operation 806 may include additional aspects substantially similar to those detailed above with respect to operation 604, such as those pertaining to determining whether a value of the one or more objects is within an acceptable deviation of a requirement of the XML Schema, for example.

As part of operation 808, computing system 200 may remove any object that is determined to be invalid based on an analysis of the one or more objects. In some embodiments, the input content may be analyzed to identify each link or reference to a removed object. Additionally, computing system 200 may replace or remove any identified links or references to the removed object. In some embodiments, computing system 200 may replace one or more identified links or references to the removed object with a reference having an artificial data value. As detailed above, aspects of operation 808 may be performed as part operation 708 to create modified content or a modified file based on an XML-format specific content alteration model. The artificial data value may be configured such that usability of the modified content is not prevented for an intended purpose, as described elsewhere herein. For example, in some embodiments, the artificial data value is configured to preserve an integrity of a format of the modified content or modified file.

Figure 9:
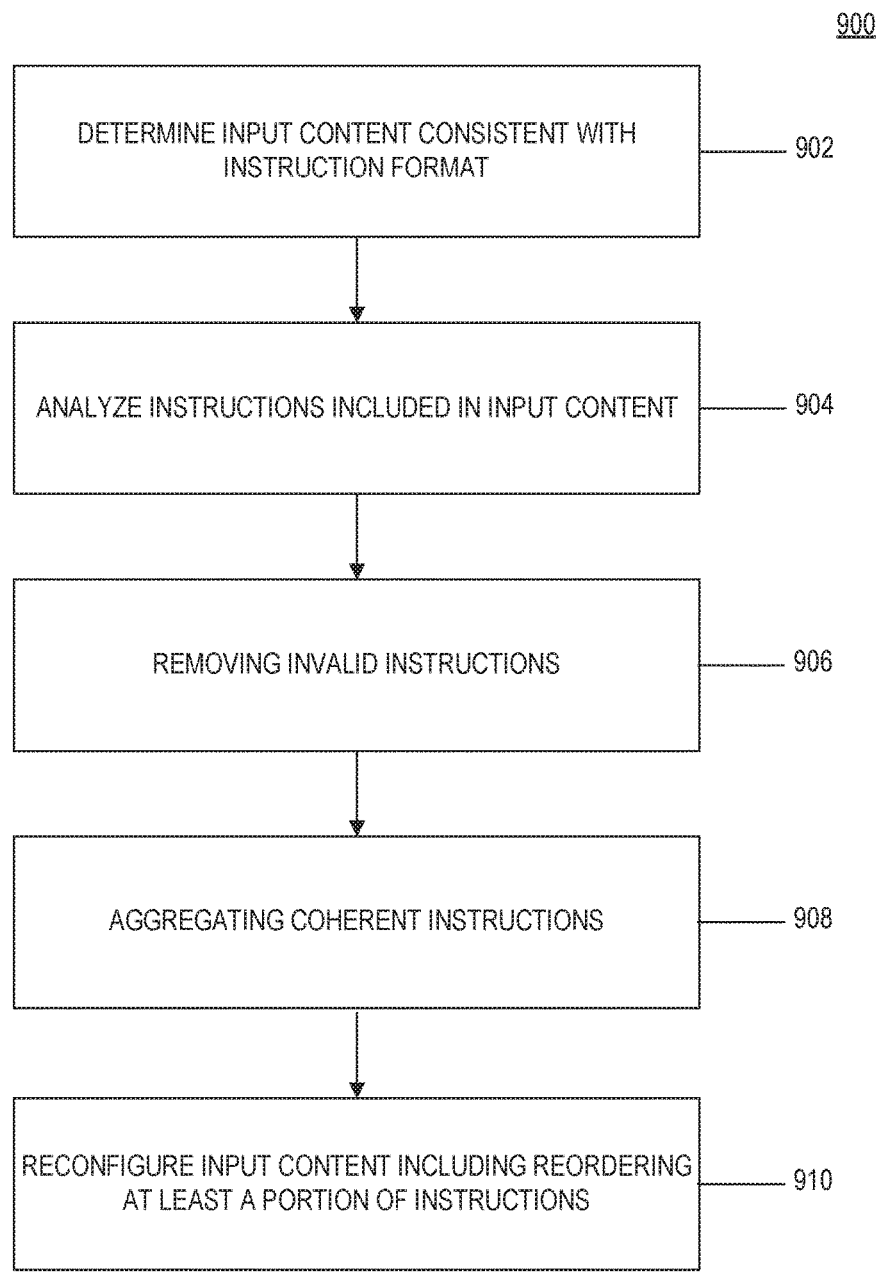
FIG. 9 is a flowchart of an example process for modifying input content, according an instruction format specific content alteration model, consistent with the disclosed embodiments.

FIG. 9 illustrates a process 900 that includes functionality for disarming malicious code that may be included in the input content based on an instruction-format specific content alteration model. Process 900 may be provided as part of any example disarming process disclosed herein for generating a modified and/or reconstructed input file. For example, process 900 may be performed responsive to receiving input content according to any operations 302, 402, 502, 602 and 702, detailed above, or any example process described herein.

At operation 902, computing system 200 may determine a file format of the input content and may determine that the file format is consistent with an instruction type file format. Aspects of operation 902 may be substantially similar to that described above in operation 704 and/or operation 606. In some embodiments, an instruction type file format may be determined based on a filename extension of the input content including .wmf or .dxf, for example, or any other filename extension indicative of an instruction type file format. Computing system 200 may also determine that the input content is of a format consistent with an instruction type format based on an analysis of the input content and any other techniques, such as those described above with respect to operation 606. An instruction type file format, as this term is used herein, may generally include any format that is based on or includes requirements for encoded instructions, operations, or commands for rendering the input content.

At operation 904, computing system 200 may identify and analyze the instructions, operations or commands included in the input content. The identification and analysis may be based on a particular instruction format determined in operation 902.

At operation 906, computing system 200 may remove any invalid instructions based on the identification and analysis of operation 904. A determination of an invalid instruction may be based on a comparison of the argument or value of the instruction to accepted arguments or values of instructions according to the determined instruction format of the input content.

At operation 908, computing system 200 may also aggregate any two or more instructions that are determined to be coherent instructions. Coherent instructions, as this term is used herein, may generally refer to two or more instructions whose relative order is required to achieve a desired rendering of the input content. In other words, two or more instructions that cannot be reordered in the input content without affecting a rendering of the input content may be determined to be coherent instructions.

At operation 910, computing system 200 may reconfigure the input content to create modified content or a modified content file. Thus, aspects of operation 910 may be performed as part operation 708 to create modified content or a modified file based on an instruction-format specific content alteration model. As part of operation 910, computing system 200 may reconfigure a layout of the input content according to an instruction-format specific content alteration model. As part of the instruction-format specific content alteration model, at least a portion of the instructions included in the input content may be reordered. In some embodiments, however, the order of those instructions determined to be coherent instructions in operation 908 may be preserved so as not to adversely affect a rendering of the modified content. In other words, in some embodiments, the respective order of one or more aggregated coherent instructions may be presented such that the modified content may be used by an intended recipient consistent with the intended purpose of the input content, as described elsewhere herein.

Disarming Malicious Content While Preserving Printer Driver Functionality

Commonly, input files or input content may include metadata or objects with information indicative of print settings or printer driver settings that recommend or encourage appropriate printing of the input file. Such print settings provide convenience for an end user or intended recipient, but some techniques for addressing potentially malicious instructions may remove or render unusable such printer settings. The example embodiments, however, include functionality for disarming malicious content in input content according to any one or more disarming techniques while preserving valid print settings identified in received input content.

Figure 10:
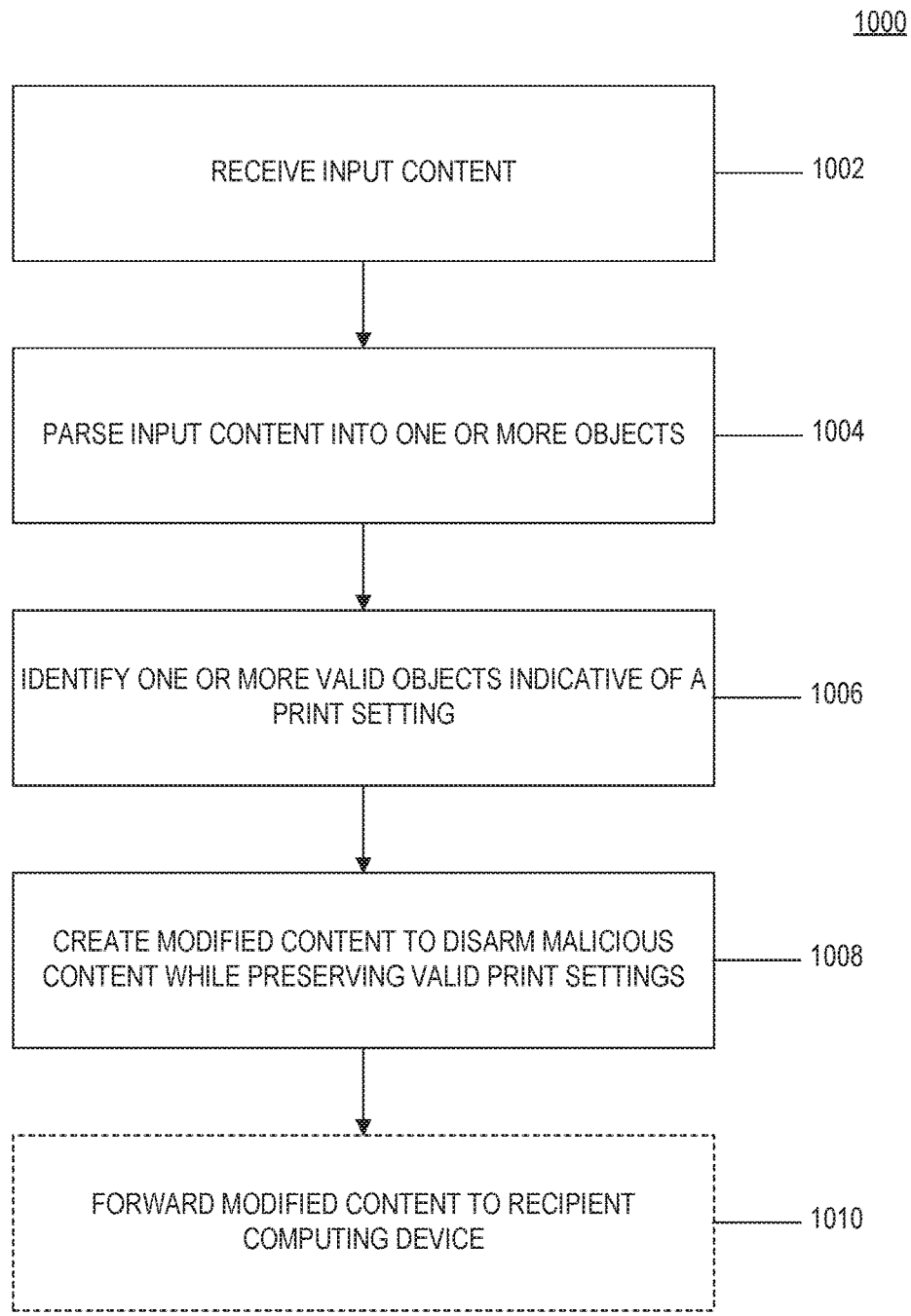
FIG. 10 is a flowchart of an example process for creating modified content to disarm malicious content while preserving valid print settings, consistent with the disclosed embodiments.

An example process 1000 for disarming malicious code that may be included in the input content while preserving valid print settings is illustrated in FIG. 10. Process 1000, or aspects thereof, may be performed by a computing system 200 in addition to or as an alternative to or as part of any example disarming process disclosed herein for generating a modified and/or reconstructed input file.

As shown in FIG. 10, at operation 1002, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example Aspects of operation 1002 may be substantially the same as those described above with respect to operation 302, 502, 602, or 702 for example.

At operation 1004, computing system 200 may analyze the received input content and parse it into one or more objects. Aspects of operation 1004 may be substantially the same as those described above with respect to operations, 604, 606, and 608. For example, as part of operation 1004, computing system 200 may determine a file format of the input content and may then parse the input content based on a determined file format, as similarly described above with respect to process 700. In some embodiments, the input content may be parsed based on a file-format specific content alteration model. The input content may be parsed into one or more logical elements or objects or instructions based on the determined file format and/or a file-format specific content alteration model.

At operation 1006, computing system 200 may analyze the parsed objects and identify one or more objects indicative of a print setting. The one or more objects may be identified based on included data or information indicative of a print setting. Example data indicative of a print setting may include print driver instructions configured for instructing the printing of the content according to one or more printer settings. Example data may also include virtual print settings configured for instructing the conversion of the input content to a format different than the format of the input content, (e.g., print to .pdf settings).

As part of operation 1006, computing system 200 may further analyze the identified one or more objects determined to include data indicative of a print setting and determine the validity of the one or more objects. For example, in some embodiments, computing system 200 may analyze each data value of the one or more identified objects and determine whether the data values include acceptable values. In some embodiments, computing system 200 may determine acceptable print setting values based on a specification associated with a format of the input content, for example, as similarly described above with respect to operation 604. In some embodiments, computing system 200 may compare the identified data values and the determined acceptable values defined by a specification associated with a format of the input content.

At operation 1008, computing system 200 may create modified content while preserving any valid print settings. Operation 1008 may implement any technique for disarming malicious content. In some embodiments, for example, aspects of operation 1008 may be substantially similar to operations 308, 508, 612, 708, etc. In some embodiments, any data values not consistent with an acceptable print setting value may be removed from the input content. Additionally, any object or data value not indicative of a requirement of a print setting field according to the format specification may also be removed from the input content. In some embodiments, if deemed necessary based on a file format of the input content, computing system 200 may replace the removed objects with artificial data values so as to maintain usability of the input content (e.g. by preserving a layout or structure requirement of the format specification) . In the example embodiments, the modified content is configured to disarm malicious code or malicious content included in the input content by applying one or more adjustments, modifications, or changes to the elements or objects of the input content or by applying one or more adjustments, modifications, reorganizations, etc. to a layout or configuration of the input content. As part of operation 1008, however, the functionality of the one or more of those objects determined to include valid print settings may be preserved. In other words, in some embodiments, no changes may be made to the valid print setting objects or any layout changes that may affect the functionality of the print settings may be avoided. In some embodiments, the modified content includes a reconstructed file and computing system 200, as part of operation 1008, may analyze the reconstructed file to verify that the format of the reconstructed file is consistent with a format specification and that the print setting functionality has not been materially altered.

As described throughout this disclosure, the one or more changes to the input content and/or its layout or configuration is configured to disarm or otherwise prevent a malicious attack based on any malicious content that may be included in the input content.

At optional operation 1010, the modified content may be forwarded to a recipient computing device. Aspects of operation 1010 may be substantially the same as those described above with respect to operations 310, 410, 510 and 710, etc.

Disarming Malicious Content Using Iterative Disarming Techniques

The above disclosure details several example techniques for disarming malicious content in a computer system. In the example embodiments, any one or more of the malicious code disarming techniques detailed herein may be combined for processing input content. The combination of disarming techniques may depend on a file type or file format or other characterization of elements or objects included in the input content, for example. In some embodiments, for example, an input file may be of a particular format suitable for a particular disarming technique and may include one or more objects suitable for a different disarming technique. The example embodiments provide functionality for performing two or more distinct disarming techniques particularly tailored for disarming malicious code that may be included in two or more aspects of a single input content. An example process 1100 for disarming malicious code in a computer system using two or more techniques is illustrated in FIG. 11.

Process 1100, or aspects thereof, may be performed by a computing system 200 in addition to or as an alternative to or as part of any example disarming process disclosed herein for generating a modified and/or reconstructed input file.

Figure 11:
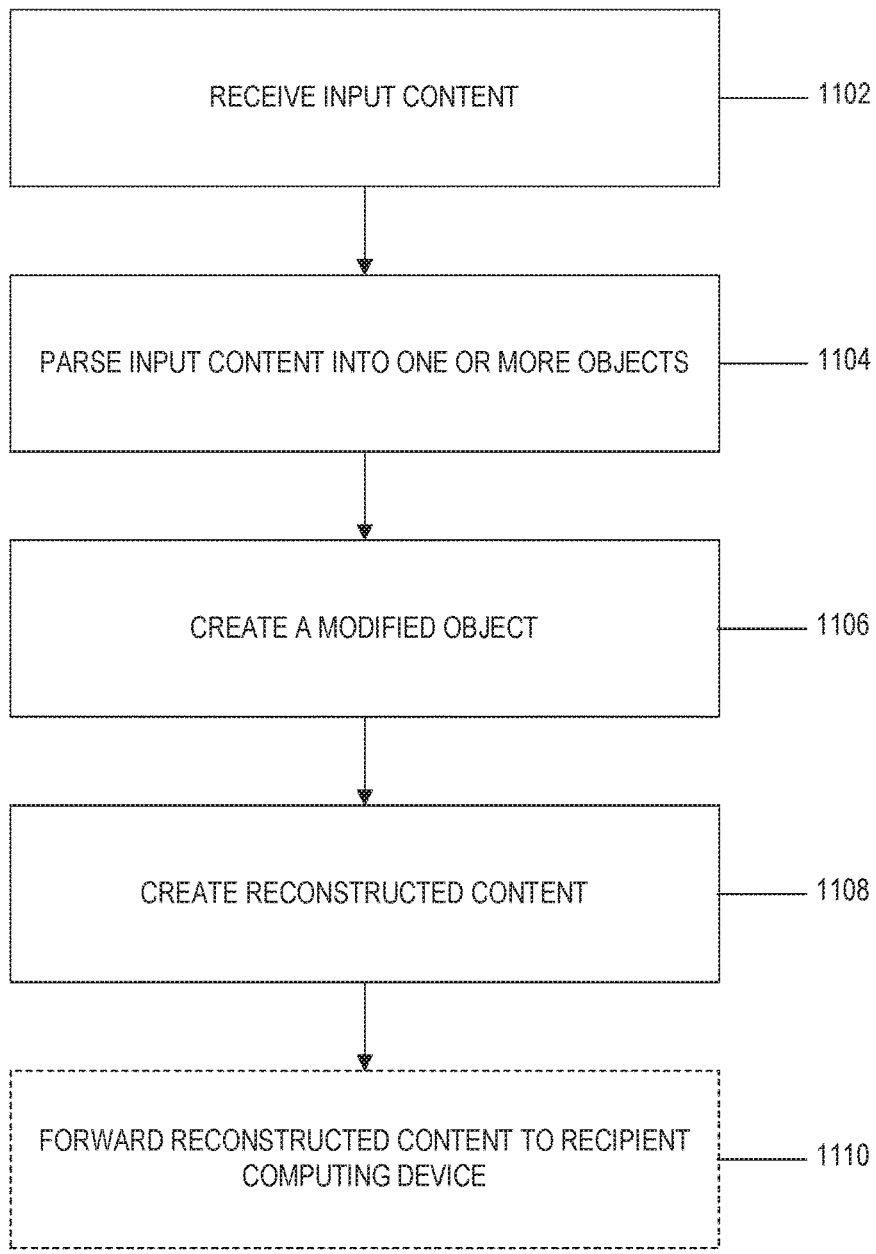
FIG. 11 is a flowchart of an example process for modifying input content to disarm malicious content, consistent with the disclosed embodiments.

As shown in FIG. 11, at operation 1102, input content may be received or accessed by a computing system, such as computing system 200, which may be included in any of the computing elements in computing environment 100, including host computer 120, 122, proxy server 130, e-mail server 132, file server 134, content disarm server 136 or cloud server 165, for example Aspects of operation 1102 may be substantially the same as those described above with respect to operation 302, 502, 602, 702, or 1002 for example.

At operation 1104, computing system 200 may analyze the received input content and parse it into one or more objects. Aspects of operation 1104 may be substantially the same as those described above with respect to operations, 604, 606, and 608, or any of operations 706, 804, or 1004. For example, as part of operation 1104, computing system 200 may determine a file format of the input content and may then parse the input content based on the determined file format, as similarly described above with respect to process 700. In some embodiments, the input content may be parsed based on a file-format specific content alteration model. The input content may be parsed into one or more logical elements or objects or instructions based on the determined file format (e.g., based on a specification associated with the file format) and/or a file-format specific content alteration model, and/or based on any other characteristics of input content or characteristics of objects included in the input content. The one or more objects may also be analyzed to identify any invalid objects. In some embodiments, for example, the one or more objects may be analyzed to identify any digital values that are not consistent with a specification of the determined file format, or any other structural anomalies, for example, as similarly described above with respect to operation 604. In some embodiments, computing system 200 may compare the identified data values and the determined acceptable values defined by a specification associated with a format of the input content, and may remove or replace any invalid objects, as described elsewhere herein.

At operation 1106, computing system 200 may create a modified object. In some embodiments, a modified object may be created corresponding to each object of the one or more objects. In some embodiments, a modified object may be created for only a single object, or a subset of objects. In some embodiments, a determination as to which objects to modify may be based on the nature of the input content and or characteristics of the objects. For example, in some embodiments, the one or more objects may be analyzed and those objects including digital values representative of media content may be selected for modifying. In some embodiments, for example, the one or more objects may correspond to an image embedded in the input content.

As part of operation 1106, computing system 200 may create a modified object based on any of the example techniques for creating a modified object or a modified file described herein. In an example embodiment, the modification may be performed in a manner for rendering any malicious code included in the object inactive for its intended malicious purpose. In some embodiments, for example, computing system 200 may modify at least a portion of digital values of each object of which a determination has been made to create a modified object. Such modifications may be based on a data value alteration model for altering select data values within the at least one object. Thus, in an example embodiment, aspects for modifying at least a portion of an object may be substantially similar to operations 304, 306, and 308. In some embodiments, computing system 200 may adjust a bit depth of at least a portion of the digital values of an object according to a bit depth alteration model, as similarly described with respect to operations 504, 506, and 508. As described with respect to operations 300 and 500, the modified objects may be created to disarm any malicious code that may be included in the object without interfering with an intended use of the object.

At operation 1108, computing system 200 may reconfigure the one or more objects and modified objects and/or a layout of the one or more objects including the modified objects to create reconstructed content or a reconstructed file. As part of operation 1108, computing system 200 may implement any technique for reconfiguring a layout of the input file. In some embodiments, for example, aspects of operation 1108 may be substantially similar to aspects of operation 612. In some embodiments, the layout of the input content is reconfigured to interfere with or prevent execution of any malicious code that may be included in the input content, as similarly described above with respect to process 600, and elsewhere herein.

In some embodiments, as part of operation 1108 (or as part of operation 1104 or 1106), computing system 200 may analyze the one or more parsed objects to determine whether any two or more objects are substantially the same. Two objects having corresponding digital values may be determined to be substantially the same. For any two or more objects determined to be substantially the same, computing system 200 may select any one object of the two or more substantially the same objects for modification in operation

1106. The other substantially same object(s) may be removed and replaced with a pointer or reference to the modified substantially same object. In some embodiments, if deemed necessary based on a file format of the input content, computing system 200 may also replace the removed objects with artificial data values so as to maintain usability of the input content (e.g. by preserving a layout or structure requirement of the format specification).

In some embodiments, the reconstructed content includes a reconstructed file and computing system 200 (e.g., as part of operation 1008) may analyze the reconstructed file to verify that the format of the reconstructed file is consistent with a format specification and remains usable by an intended recipient.

As described throughout this disclosure, the one or more changes to an object included in the input content and/or reconfiguration of a layout or configuration of the input file is configured to disarm or otherwise prevent a malicious attack based on any malicious content that may be included in the input content. The example embodiments thus include functionality for rendering any malicious code in the input content inactive for its intended malicious purpose, whether the malicious code resides in multiple objects within the input content (e.g., thereby exploiting a vulnerability in the layout of the file) or within a single object, such as an image embedded in the input content, for example.

At optional operation 1110, the reconstructed content may be forwarded to a recipient computing device. Aspects of operation 1110 may be substantially the same as those described above with respect to operations 310, 410, 510, 710, and 1010, etc.

Disarming Malicious Content Based on Hierarchical Computer System Policies

As detail above, each of the example embodiments may be configurable based on one or more policies instructing how received content and any malicious content embedded therein is to be processed. Processing of input content may be based on a number of known factors, some of which may be enterprise specific. Thus, the example embodiments for disarming malicious content are not limited to any particular enterprise computing environment or implementation, and can be implemented as a standalone solution or in combination as a suite of solutions, and can be customized according to preferences of a computing environment. An example embodiment includes techniques for disarming malicious code in received input content according to a hierarchical policy-based implementation. In some embodiments, a system administrator may be provided with capabilities to adjust policy rules and data filters, based on end user needs and/or network or enterprise requirements. The example embodiments may include global policy rules that may be generally applicable to all users of a network. The example embodiments may also include user (or user group) specific rules that may provide greater or fewer restrictions. Other policies may be tailored for specific file types, size limits, and/or combinations of intended recipient and identified sender.

Figure 12:
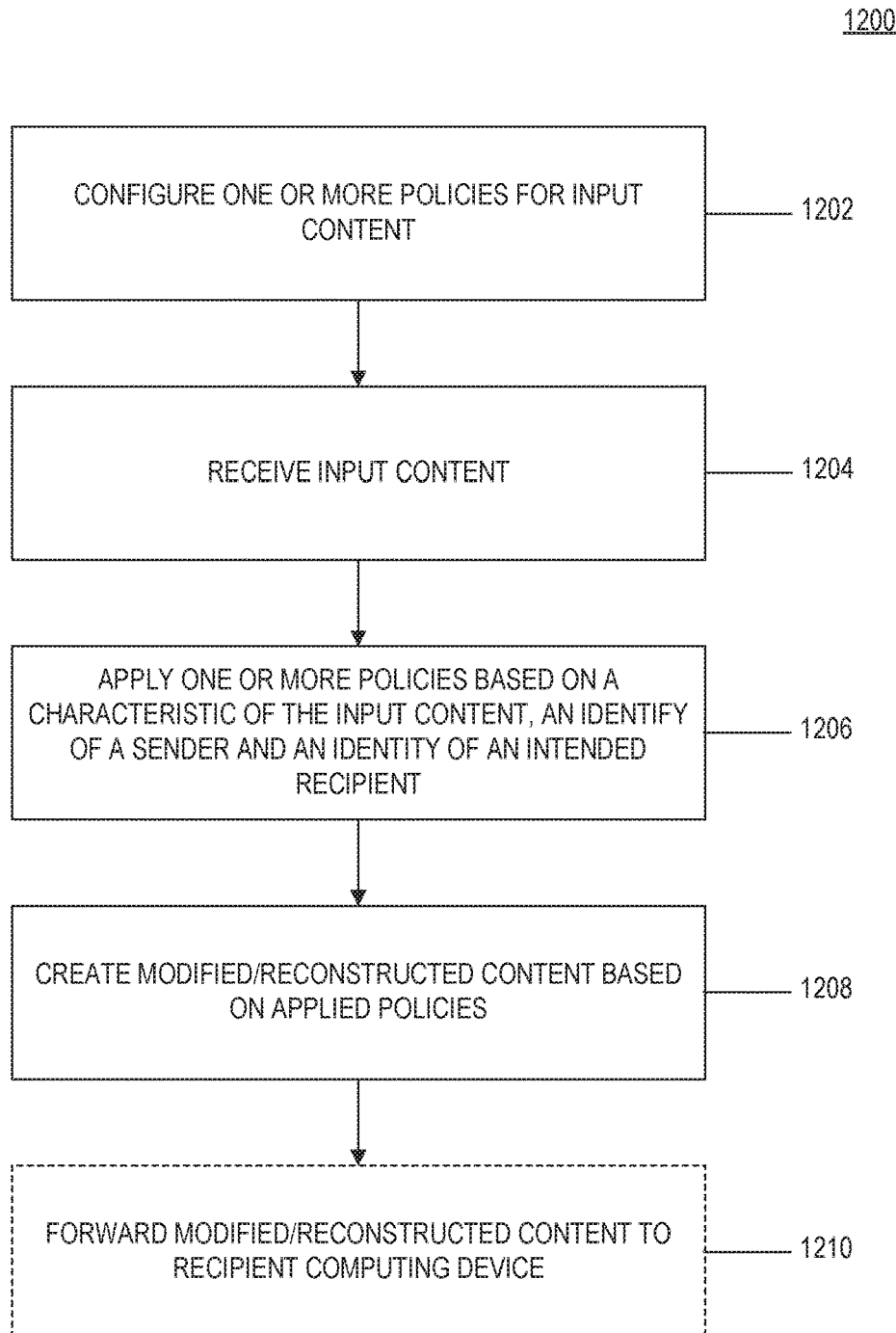
FIG. 12 is a flowchart of an example process for creating modified content according to hierarchical network policies, consistent with the disclosed embodiments.

An example process 1200 for disarming malicious code according to hierarchical network policies is illustrated in FIG. 12. At operation 1202, as shown, a computing system 200 may configure one or more policies to be applied to input content received into network 110 at any one or more computing elements included therein. As part of operation 1202, one or more policies may be initially configured as a default policy. As part of operation 1202, a system administrator may be provided with functionality (e.g. through a graphical user interface (GUI) or an application program interface (API)) for configuring one or more policies to be applied to input content.

In some embodiments, the one or more policies may include a rule applicable for each input content received by the network or computing system. In some embodiments, the one or more policies may include a rule associated with each input content intended for a particular recipient. In some embodiments, the one or more policies may include a rule associated with input content intended for a defined group of recipients, with which an intended recipient may be associated with. In some embodiments, the one or more policies may include a rule associated with a characteristic of input content, such as a particular file type, file format, and/or a content type. In some embodiments, the one or more policies may include a rule associated with an identity of a sender of the input content or an identified domain associated with the sender of the input content. In the example embodiments, the one or more policies may be hierarchically applied, such as according to a prioritization of policies, for example.

In the example embodiments, the one or more policies may define how or whether to apply one or more of the example malicious code disarming techniques described herein. Additionally, the one or more policies may define additional parameters to be implemented as part of any one or more of the example malicious code disarming techniques described herein.

As part of operation 1204, computing system 200 may receive input content. Aspects of operation 1204 may be substantially the same as those described above with respect to operation 302, 502, 602, 702, 1002, or 1102, for example.

As part of operation 1206, computing system may identify and/or apply one or more policies (e.g., those configured as part of operation 1202) to the received input content. The one or more policies may be hierarchically applied (e.g., according to a predetermined prioritization scheme) based on a characteristic of the input content, an identity (or domain) of the sender, and an identity of an intended recipient. As part of operation 1206, computing system 200 may access a database (e.g. database 170), that may include one or more configuration files. The configuration files may specify one or more policies, and may be specific to network 110 or a particular user, such as an intended recipient. Computing system 200 may access the database 170 to determine the one or more policies and a prioritization associated with each policy.

As part of operation 1208, computing system 200 may create modified or reconstructed content based on the identified or applied one or more policies. In some embodiments, the modified or reconstructed content may be created based on any one or more of the disarming techniques detailed above, such as those described with respect to FIGS. 3-11, or those described elsewhere herein. In some embodiments, the one or more policies may determine whether the input content is to be processed at all. In some embodiments, it may be advantageous to automatically quarantine input content received from senders (or domains) known to be associated with malicious content. In some embodiments, it may also be advantageous to allow certain file types to be received by an intended recipient, without applying one or more disarming techniques that may otherwise be performed for the input content, etc. Such allowed file types may correspond to a file type commonly accessed by the intended recipient to perform enterprise specific operations, for example Numerous other predetermined policies are contemplated by this disclosure, some of which may be specific to an enterprise need, for example.

As part of optional operation 1210, the modified or reconstructed content may be forwarded to a recipient computing device. Aspects of operation 1210 may be substantially the same as those described above with respect to operations 310, 410, 510, 710, 1010, and 1110, etc.

Providing a Fastlane for Disarming Malicious Content in Input Content

An example embodiment is provided for facilitating access of received content (both original received input content and modified input content) by an intended recipient, while implementing one or more malicious content disarming techniques. Some malware detection and/or disarming techniques, as part of a gateway for receiving content, for example, tend to balance effectiveness in identifying or disarming malware with the delay and inconvenience presented to a user for not being able to immediately access received content intended for the user. Example embodiments for providing improved access to received content are illustrated with respect to FIGS. 13 and 14.

Figure 13:
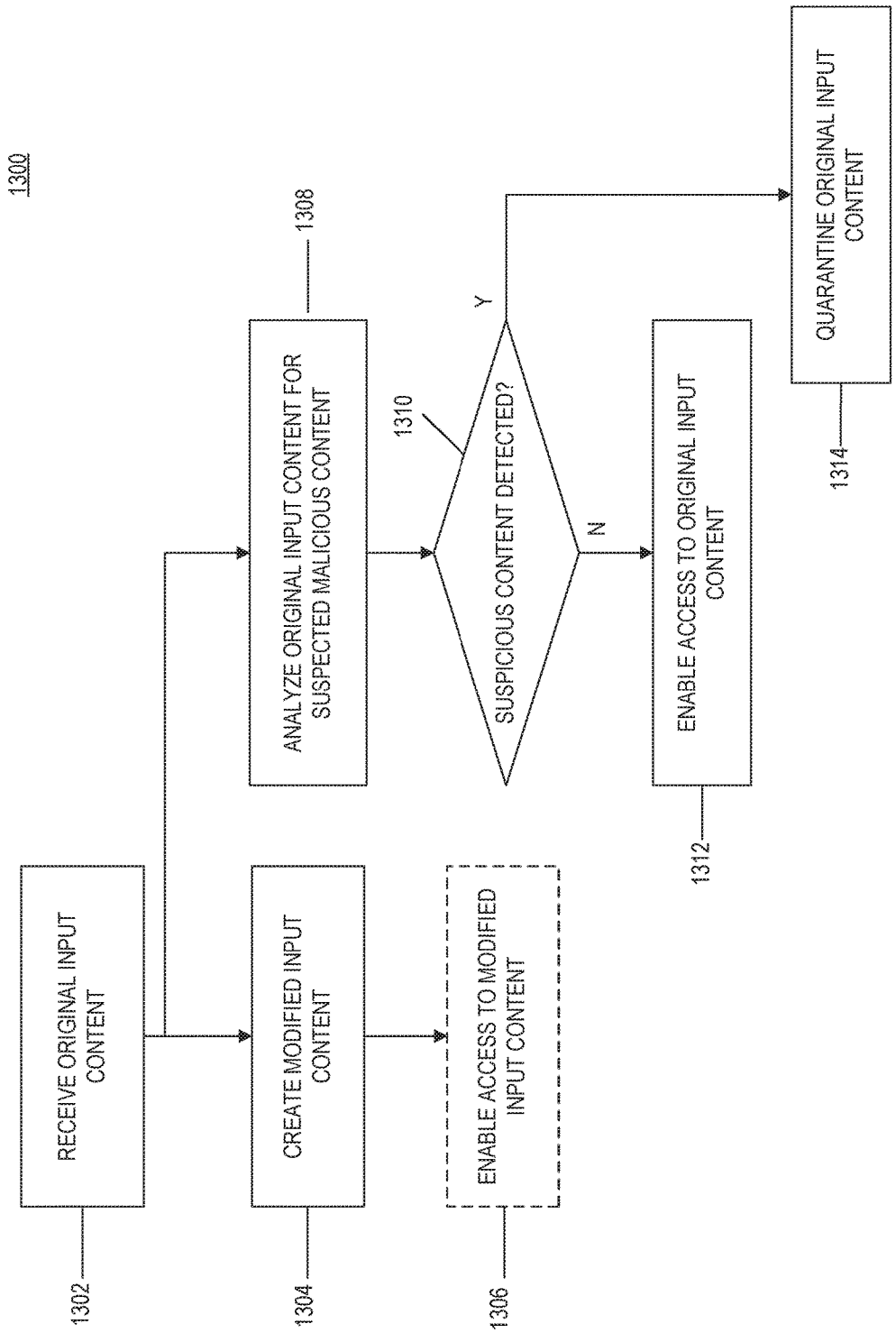
FIG. 13 is a flowchart of an example process for modifying input content to disarm malicious content, consistent with the disclosed embodiments.

Process 1300, as shown in FIG. 13, may improve an end user experience by automatically creating modified content to disarm any malicious code included in the input content, while analyzing the input content for suspected malicious content. In some embodiments, these operations may be performed in parallel.

As part of operation 1302, computing system 200 may receive input content, as similarly describe above with respect to operations 302, 502, 602, 702, 1002, 1102, and 1204, etc. Responsive to receiving the input content, computing system 200 may, as part of operation 1304, create modified input content. In some embodiments, computing system may automatically create modified content. In some embodiments, the modifying may be performed based on a configurable parameter associated with the intended recipient. An example parameter may indicate a rule that the intended recipient is to access modified input content. In some embodiments, the parameter may be configurable by the intended recipient. In some embodiments, modified content may not be created when the parameter indicates a rule that the intended recipient is to access input content (e.g. the original input content).

Aspects of 1304 may include any one or more aspects of a malicious content disarming technique described herein. For example, in some embodiments, computing system 200 may adjust or modify a digital value of at least a portion of data units of the input content to create modified input content that is configured to disarm malicious code included in the original input content, as described above with respect to process 300 and/or 400. In some embodiments, the modified input content may be of the same type as the received input content. For example, in some embodiments, the modified input content may be created without regard to any structure used to encapsulate the input content.

As detailed throughout, the one or more malicious content disarming techniques are configured to disarm any malicious content included in the received content. Accordingly, responsive to creating modified content, in some embodiments, computing system 200, as part of operation 1306 may enable access to modified input content. In some embodiments, the modified content may be forwarded to an intended recipient or otherwise made accessible, as similarly described above with respect to operation 310, for example.

As part of operation 1304, computing system 200 may associate the modified input content with the received original input content. In some embodiments, all or certain types of the received original input content, a copy thereof, or other characteristic (e.g., a hash, URL, any other identifier, etc.) of the original input content may be stored and/or logged in a dedicated repository or protected storage area, such as part of file server 134, content disarm server 136, cloud server 165, or one or more other databases or storage systems. Once created as a result of operation 1304, the created modified input content may be stored or indexed together with the original received original input content in the document repository or protected storage area, or otherwise associated with the original input content. The modified input content created for each of the stored and logged original input content may be associated with the original input content according to any number of techniques available in the art. For example, the modified input content or an identifier of the created modified input content may be stored in association with the original input content or otherwise linked with the original input content. Other techniques are contemplated that generally establish an association between an original input content and a modified input content.

Additionally, as part of operation 1308, computing system 200 may analyze the received input content for any suspected malicious content. Computing system 200 may analyze the input content using one or more malware detection techniques, including signature-based and behavior-based techniques, as described elsewhere herein. In some embodiments, it may be advantages to analyze the original content in a monitored run environment so as to observe any suspicious or malicious activity performed as a result of any potentially malicious content being included in the input content. In some embodiments, operation 1308 may be automatically performed responsive to receiving input content in operation 1302. In some embodiments, aspects of operation 1308 may be performed in parallel with operation 1304.

In some embodiments, prior to operation 1304, computing system 200 may apply a malware detection algorithm to the received input content, and operation 1304 may only be performed if the malware detection algorithm does not detect malicious code in the input content. In some embodiments, the malware detection algorithm applied before operation 1304 may include a signature-based malware detection algorithm. The signature-based malware detection algorithm may include a first set of signatures of known malicious content. In some embodiments, the applied malware detection algorithm may be performed and/or configured to require relatively little time for analyzing the received input content, as compared to the analysis performed in operation 1308 described above, for example. Thus, in some embodiments, a malware detection algorithm applied in operation 1308 may include a behavior-based malware detection algorithm, that requires relatively more time and resources to perform the analysis. In some embodiments, a malware detection algorithm applied in operation 1308 may be a signature-based malware detection algorithm that applies a second set of signatures of known malicious content that may be different than the first set of signatures applied before operation 1304. In some embodiments, for example, the second set of signatures includes at least one signature not included in the first set of signatures. The second set of signatures may be more comprehensive, for example.

As part of operation 1310, computing system 200 may determine if any suspicious content is detected in the original input content. In some embodiments, aspects of operation 1310 may include determining whether any suspicious or malicious content is detected in a monitored run environment, for example. If no suspected malicious content is detected as part of operation 1310, then computing system 200, as part of operation 1312 may enable access to the original input content. In some embodiments, computing system 200 may be configured to automatically release the original input content or replace modified input content with the original content if or once the original input content is determined to be safe. In some embodiments, once the original content is determined to be safe or "trusted", the original input content may be automatically forwarded to the intended recipient or the intended recipient may otherwise be notified that the original input content is accessible to the intended recipient.

In some embodiments, enabling access to the input content may include replacing the modified input content with the input content. In some embodiments, for example, computing system 200 may replace a pointer to the modified input content in a file server with a pointer to corresponding input content. In some embodiments, the modified input content may be stored at an electronic mail server (e.g., 132) in association with an electronic mail of the intended recipient, and computing system 200 may replace the modified input content stored in association with the electronic mail with the input content, such that the input content is accessible to the intended recipient via the electronic mail server. In some embodiments, computing system 200 may provide a notification to the intended recipient indicating that the input content is accessible to the intended recipient. In some embodiments, the notification may include an electronic link to the input content. In some embodiments, computing system 200 may enable access to the input content by forwarding the input content in an electronic mail to the intended recipient.

If, however, as a result of operation 1310, suspected malicious activity is detected based on the analysis of the original input content, computing system 200, as part of operation 1314, may quarantine the original input content. In some embodiments, the original input content may be quarantined in a dedicated repository that may be isolated or otherwise secured or protected to prevent general access to the original input content stored therein and/or to prevent any malicious content that may be included in the original input content to affect other computing elements of a computer system. Thus, in the disclosed embodiments, the original input content may be quarantined such that it does not pose an active threat to a computer system. In some embodiments, however, the original content may be released (selectively or automatically) to certain users or intended recipients according to one or more policies of the computer system. Thus, by storing the original input content, an intended recipient or other user may be able to retrieve such original content at a later time if the original content is determined to be safe or "trusted" according to one or more procedures or policies.

Figure 14:
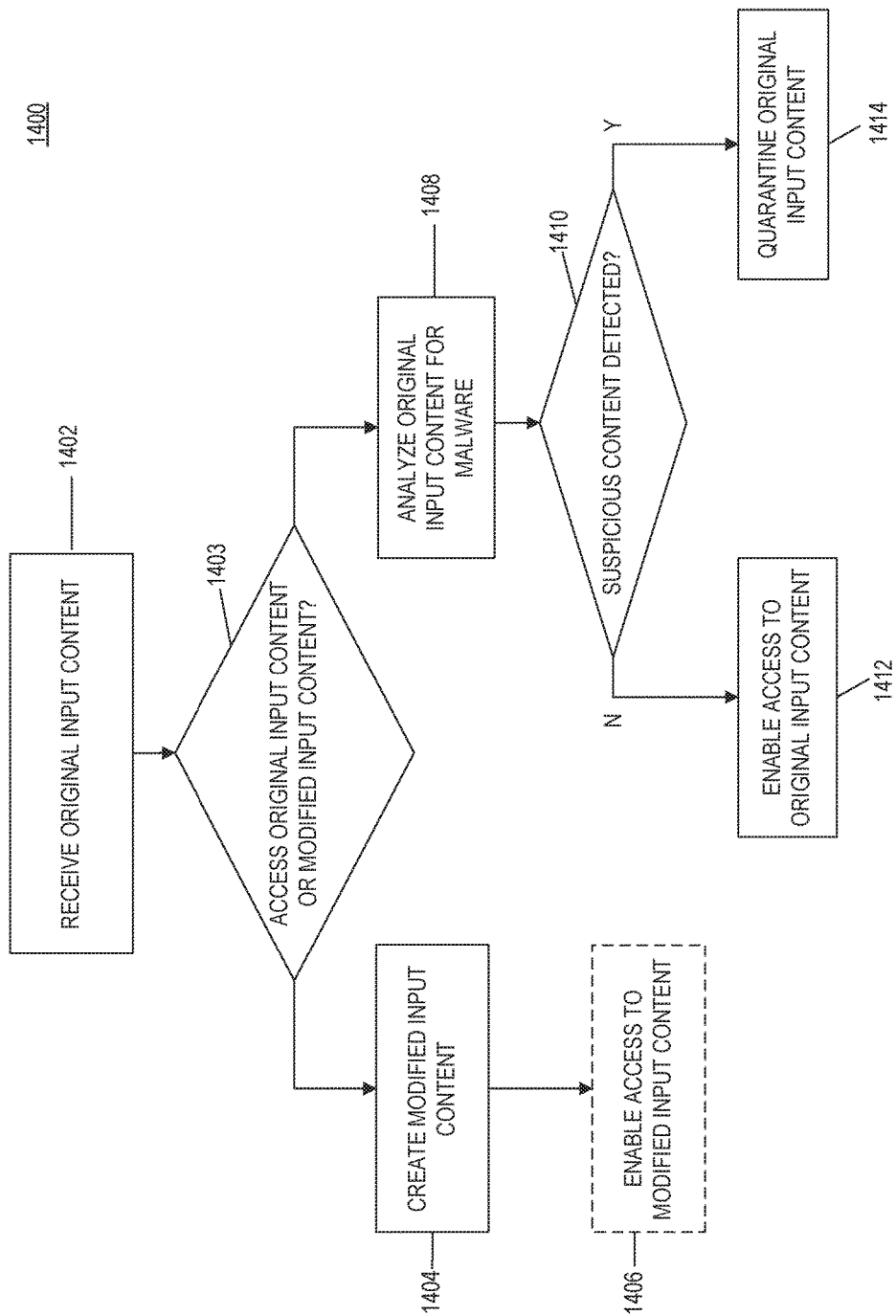
FIG. 14 is a flowchart of an example process for modifying input content to disarm malicious content, consistent with the disclosed embodiments.

FIG. 14 illustrates another example embodiment of a process 1400 for facilitating access to received input content. Aspects of process 1400 are substantially the same as those described above with respect to process 1300, and thus are not repeated herein.

Process 1400 may differ, however, in an additional operation 1403. As part of operation 1403, computing system 200 may determine whether to create modified input content. In some embodiments, for example, computing system 200 may determine one or more preferences of an intended recipient to determine whether to create modified input content. In some embodiments, the determination may be based on one or more characteristics of the input content, and/or one or more configurable parameters associated with an intended recipient, etc. In some embodiments, the configurable parameter may be predetermined.

In some embodiments, the determination may be based on an input received from an intended user. For example, in some embodiments, an intended recipient may be provided an opportunity to request to create modified input content, or to otherwise wait until access may be provided to the original input content. In some embodiments, the intended recipient may receive a notification requesting input whether the intended recipient prefers to access modified input content or original input content, or both. In some embodiments, for example, an intended recipient may prefer to wait until a determination may be made as to whether access to the original input content may be provided (e.g. whether the original input content may be determined to be safe or trusted as a result of operation 1408/1410). In some embodiments, if the intended recipient selects to access both modified input content and original input content, computing system may first perform aspects of operation 1404 (which may be substantially similar to operation 1304), and then perform aspects of operation 1408 (which may be substantially similar to operation 1308).

Disarming Malicious Content with Reliability Assurance

An example embodiment is also provided for assuring or verifying the effectiveness of one or more of the example disarming techniques disclosed herein. The example embodiment also includes capabilities for demonstrating the effectiveness of a disarming technique in preventing a potential attack on a computer system. In other words, the disclosed embodiments implement additional techniques for determining whether any malicious content identified in input content was or would be disarmed or otherwise neutralized in the modified input content that may be passed on to an intended recipient in a computer system.

Figure 15:
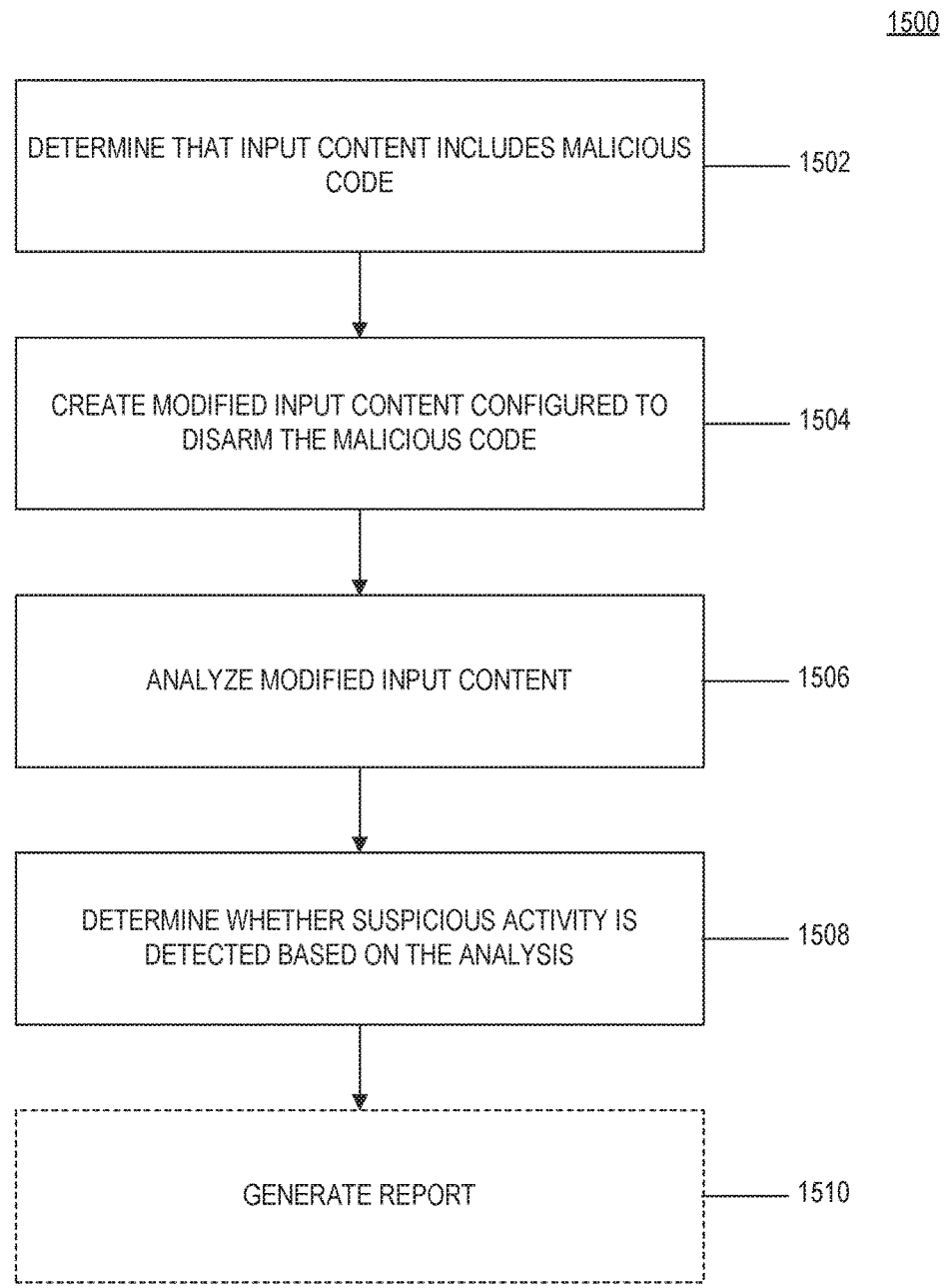
FIG. 15 is a flowchart of an example process for verifying effectiveness of a malicious content disarming technique.

An example process 1500 for assuring or verifying the effectiveness of an example disarming technique is illustrated in FIG. 15. As part of operation 1502, computing system 200 may determine that input content includes malicious code. Such a determination may be based on any one or more malware detection techniques, including use of a signature-based malware detection algorithm or a behavior based malware detection algorithm, as described above. A determination that input content includes malicious code may occur at any time. In some embodiments, such a determination may be made responsive to computing system 200 receiving input content, as similarly describe above with respect to operations 302, 502, 602, 702, 1002, 1102, 1204, 1302 and 1402, etc.

As part of operation 1504, computing system 200 may create modified or reconfigured input content configured to disarm any malicious code identified in operation 1502. In some embodiments, operation 1504 is performed responsive to identifying malicious content in the input content. In some embodiments, operation 1504 is performed automatically responsive to computing system 200 receiving the input content. In some embodiments, operation 1504 may be performed responsive to receiving an input or request via an interface. In some embodiments, an interface may be presented to a user (e.g. system administrator or intended recipient), the interface being configured to receive user input to request creation of modified input content. In some embodiments, the interface may be an application programming interface (API) that receives a request to create modified input content.

Aspects of operation 1504 may include any one or more of the example disarming techniques disclosed herein. For example, in some embodiments, computing system 200 may adjust or modify a digital value of at least a portion of data units of the input content to create modified input content that is configured to disarm malicious code included in the original input content, as described above with respect to process 300 and/or 400. Accordingly, in some embodiments, one or more parameters associated with modifying input content may be received by computing system 200 from a user or predetermined, such as being based on a machine learning model configured to generate modified content effective for disarming malicious content. In some embodiments, process 300 may be performed without considering a location of the malicious code determined to be included in the input content in operation 1502. Accordingly, in some embodiments, computing system 200 is able to determine the effectiveness of a disarming technique that is to be applied to input content without first determining the presence of malicious code in the input content.

As part of operation 1506, computing system 200 may analyze the modified input content to determine whether the modified input content effectively disarmed the included malicious content determined in operation 1502. In some embodiments, all or only some aspects of the original input content may be analyzed. In some embodiments, the modified input content is analyzed based on a malware detection algorithm. The malware detection algorithm implemented as part of operation 1506 may include any one or more techniques for analyzing content, such as signature-based malware detection techniques or behavioral-based malware detection techniques or blacklist-based techniques, and may implement any number of processes, such as a monitored run environment for analyzing input content and detecting malicious content included therein or malicious activity enabled thereby. In some embodiments, it may be advantageous to analyze the modified input content in a monitored run environment to verify that execution or rendering of the modified input content does not result in any malicious or suspicious activity.

As part of operation 1508 it may be determined whether the analyzed modified input content can be deemed or assumed to be safe or trusted or otherwise does not contain suspected malicious content that would be detectable by the malware detection algorithm. The determination may be based on the results of operation 1506. In some embodiments, the determination may be based on no suspicious activity being detected according to a behavior-based malware detection algorithm. If the determination deems the modified input content "safe" then process 1500 may end. In some embodiments, as part of operation 1510, computing system 200 may generate a report reflecting that no malicious content was identified in the modified input content and that the disarming technique implemented in operation 1504 is deemed effective. In some embodiments, the report may include a detailed report showing how the malware attack had been prevented. The report may include details concerning one or more portions of the original input content that contained the identified malicious content. The report may also indicate how the identified malicious content was disarmed. For example, in some embodiments, the report may include an indication of one or more modifications to the received original input content that effectively disarmed the malicious content included therein. The one or more modifications may include one or more changes to a digital value of the original input content, or one or more changes to a format or structure of the original input content. The one or more modifications may also include one or more aspects of the original input content that were removed, as well as any other modifications that may have disarmed the included malicious content. In some embodiments, a report may also include a comparison of the original input content and the modified input content. The comparison may include a perceptible aspect enabling a supervisor to perceive a degree of change in the modified input content.

If it is determined, as part of operation 1508, that the analyzed modified input content is not safe (e.g., it includes suspected malicious content), then operation 1504, 1506, and 1508 may be repeated until a disarming technique is identified that is proven effective for disarming the malicious code identified in operation 1502. In some embodiments, computing system 200 may update a data record identifying the disarming technique proven to be effective. In some embodiments, operations 1504, 1506, and 1508 may be repeated for several disarming techniques to identify multiple techniques that may have been proven effective. The updated data record may be implemented to further refine one or more disarming techniques, or associate a particular disarming technique with a type of the input content, for example. The updated record may provide feedback for one or more content modification techniques that can be used to update the content modification techniques to disarm similar attacks in the future.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. Thus, while certain features of the example embodiments have been illustrated and described herein, many modifications, substitutions, changes, and equivalents will be apparent to those of ordinary skill in the art. It is, therefore, to be understood that the appended claims are intended to cover all such modifications and changes as fall within the true spirit of the invention.

The claims are to be interpreted broadly based on the language used in the claims and not limited to examples described in the present specification, which are non-exclusive. For example, aspects of the disclosed embodiments are described as operations performed by a computing system, and one skilled in the art will appreciate that these aspects can be configured as a set of instructions stored on and executed from many types of tangible computer-readable media, such as secondary storage devices, like hard disks, floppy disks, or CD-ROM, or other forms of RAM or ROM.

What is claimed is:

1. A method for disarming malicious content in a computer system having a processor, the method comprising:
    accessing, by the computer system, input content intended for a recipient of a network;
    automatically modifying, by the processor, at least a portion of digital values of the input content to render any malicious code that may be included in the input content inactive for its intended malicious purpose without interfering with an intended use of the input content, the modified input content being of the same type as the accessed input content, wherein the automatically modifying at least a portion of digital values of the input content includes adjusting a bit depth of the portion of digital values;
enabling access to the modified input content by the intended recipient;
analyzing, by the processor, the input content according to at least one malware detection algorithm configured to detect malicious content; and
enabling access to the input content by the intended recipient when no malicious content is detected according to the at least one malware detection algorithm.

2. The method of claim 1, wherein the automatically modifying at least a portion of digital values of the input content renders inactive code included in the input content intended for malicious purpose without regard to any structure used to encapsulate the input content.

3. The method of claim 1, wherein the input content includes an input file of a file type indicative of at least one media content type.

4. The method of claim 1, wherein enabling access to the input content includes providing a notification to the intended recipient indicating that the input content is accessible to the intended recipient, the notification including an electronic link to the input content.

5. The method of claim 1, wherein enabling access to the input content includes forwarding the input content in an electronic mail to the intended recipient.

6. A non-transitory computer-readable medium comprising instructions that when executed by a processor are configured for carrying out the method of claim 1.

7. The method of claim 1, further comprising applying a signature-based malware detection algorithm to the input content, and automatically modifying at least a portion of digital values only if the signature-based malware detection algorithm does not detect malicious code in the input content.

8. The method of claim 7, wherein the at least one malware detection algorithm includes a behavior-based malware detection algorithm.

9. The method of claim 7, wherein the signature-based malware detection algorithm includes a first set of signatures of known malicious content, and the at least one malware detection algorithm is configured to evaluate the input content based on a second set of signatures of known malicious content.

10. The method of claim 9, wherein the second set of signatures includes at least one signature not included in the first set of signatures.

11. The method of claim 1, further comprising wherein the input content includes a plurality of data units having digital values representing media content, and wherein the at least a portion of digital values and an adjustment of the digital values are determined so as not to interfere with an intended use of the input content.

12. The method of claim 11, wherein the at least a portion of digital values are determined without knowing a location of data units in the input content including malicious code.

13. The method of claim 11, wherein the portion of digital values are determined randomly or pseudo-randomly based on a data value alteration model configured to disarm malicious code included in the input content.

14. The method of claim 13, wherein the data value alteration model is configured to determine the portion of digital values based on determining that at least one of the digital values of the portion is statistically likely to include any malicious code.

15. The method of claim 1, wherein enabling access to the input content includes replacing the modified input content with the input content.

16. The method of claim 15, wherein replacing the modified input content includes replacing a pointer to the modified input content in a file server with a pointer to corresponding input content.

17. The method of claim 15, comprising storing the modified input content at an electronic mail server in association with an electronic mail of the intended recipient, wherein replacing the modified input content includes replacing the modified input content stored in association with the electronic mail with the input content, such that the input content is accessible to the intended recipient via the electronic mail server.

18. The method of claim 1, wherein the automatically modifying is performed based on a configurable parameter associated with the intended recipient, the parameter indicating a rule that the intended recipient is to access the modified input content.

19. The method of claim 18, wherein the parameter is configurable by the intended recipient, and further wherein, the automatically modifying and enabling access to the modified input content is not performed when the parameter indicates a rule that the intended recipient is to access input content.

20. A method for disarming malicious content in a computer system having a processor, the method comprising:
accessing, by the computer system, input content intended for a recipient of a network;
enabling the intended recipient to select to access the input content or modified input content;
upon receipt of a request to access modified input content:
modifying, by the processor, at least a portion of digital values of the input content to render any malicious code that may be included in the input content inactive for malicious purpose without interfering with an intended use of the input content, the modified input content being of the same type as the accessed input content, wherein the automatically modifying at least a portion of digital values of the input content includes adjusting a bit depth of the portion of digital values; and
enabling access to the modified input content by the intended recipient;
upon receipt of a request to access the input content:
analyzing, by the processor, the input content according to at least one malware detection algorithm configured to detect malicious content; and
enabling access to the input content by the intended recipient when no malicious content is detected according to the at least one malware detection algorithm.

21. A non-transitory computer-readable medium comprising instructions that when executed by a processor are configured for carrying out the method of claim 20.

22. The method of claim 20, wherein enabling the intended recipient to select to access the input content or modified input content includes enabling selection to access both the input content and the modified input content, wherein upon receipt of a request to access both the input content and modified input content the method further comprises first performing the modifying to render inactive code that is included in the input content intended for malicious purpose and enabling access to the modified input content, then performing the analyzing and enabling access to the input content.

23. The method of claim 22, wherein upon receipt of a request to access both the input content and modified input content, the enabling access to the input content includes replacing the modified input content with the input content.

24. The method of claim 20, wherein the method comprises, before enabling the intended recipient to select to access the input content or modified input content, applying a signature-based malware detection algorithm to the input content, and enabling the intended recipient to select to access the input content only if the signature-based malware detection algorithm does not detect malicious code in the input content.

25. The method of claim 24, wherein the at least one malware detection algorithm includes a behavior-based malware detection algorithm.

26. A system for disarming malicious content, the system comprising:
   a memory device storing a set of instructions; and
   a processor configured to execute the set of instructions to:
      access input content intended for a recipient of a network;
      modify at least a portion of digital values of the input content to render any malicious code that may be included in the input content inactive for its intended malicious purpose without interfering with an intended use of the input content, the modified input content being of the same type as the accessed input content, wherein the automatically modifying at least a portion of digital values of the input content includes adjusting a bit depth of the portion of digital values;
      enable access to the modified input content by the intended recipient;
      analyze, by the processor, the input content according to at least one malware detection algorithm configured to detect malicious content; and
      enable access to the input content by the intended recipient when no malicious content is detected according to the at least one malware detection algorithm.

27. The system of claim 26, wherein the processor is configured to execute the set of instructions to modify the at least a portion of digital values of the input content based on a received request from the intended recipient to access modified input content.

28. The system of claim 26, wherein the processor is configured to execute the set of instructions to modify the at least a portion of digital values of the input content based on a configurable parameter associated with the intended recipient, the parameter indicating a rule that the intended recipient is to access the modified input content.

* * * * *